(12) United States Patent
Otsuka

(10) Patent No.: US 11,425,265 B2
(45) Date of Patent: Aug. 23, 2022

(54) IMAGE FORMING APPARATUS FOR DETERMINING AN END OF LIFE OF A FIXING APPARATUS BASED UPON OBTAINED MOTOR TORQUE

(71) Applicant: Konica Minolta, Inc., Tokyo (JP)

(72) Inventor: Yutaka Otsuka, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 78 days.

(21) Appl. No.: 16/997,131

(22) Filed: Aug. 19, 2020

(65) Prior Publication Data
US 2021/0067636 A1 Mar. 4, 2021

(30) Foreign Application Priority Data

Sep. 4, 2019 (JP) .............................. JP2019-161000
Sep. 4, 2019 (JP) .............................. JP2019-161001

(51) Int. Cl.
*H04N 1/00* (2006.01)
(52) U.S. Cl.
CPC ..... *H04N 1/00037* (2013.01); *H04N 1/00068* (2013.01); *H04N 1/00082* (2013.01)
(58) Field of Classification Search
CPC ................................................ H04N 1/00037
See application file for complete search history.

(56) References Cited

U.S. PATENT DOCUMENTS

| | | | | |
|---|---|---|---|---|
| 2011/0222875 | A1* | 9/2011 | Imada | G03G 15/2025 399/33 |
| 2018/0017915 | A1* | 1/2018 | Ishikawa | G03G 15/0189 |
| 2019/0265624 | A1* | 8/2019 | Sakai | G03G 15/55 |
| 2019/0344985 | A1* | 11/2019 | Aoki | G03G 15/553 |
| 2020/0409292 | A1* | 12/2020 | Fujimoto | G03G 15/2053 |

FOREIGN PATENT DOCUMENTS

| | | |
|---|---|---|
| JP | 2017138427 | 8/2017 |
| JP | 2018155850 | 10/2018 |

* cited by examiner

*Primary Examiner* — Benjamin O Dulaney
(74) *Attorney, Agent, or Firm* — BakerHostetler

(57) ABSTRACT

An image forming apparatus may include a pressurization member rotated by a motor in a direction of transportation in the fixing apparatus, of the recording material downstream in a transportation path, a fixing belt that forms, as being opposed to the pressurization member, a nip region where an unfixed image is fixed, the fixing belt being rotated as following rotation of the pressurization member, a support member that is arranged on an inner side of the fixing belt and slidably supports the fixing belt at a position opposed to the pressurization member against a pressure applied by the pressurization member, and a control unit that obtains torque at the time when the motor is driven each time a predetermined condition is satisfied, and determines that the fixing apparatus has reached the end of its life based on variation over time in obtained torque turning from increase to decrease.

19 Claims, 50 Drawing Sheets

IMAGE FORMING APPARATUS FOR DETERMINING AN END OF LIFE OF A
FIXING APPARATUS BASED UPON
OBTAINED MOTOR TORQUE

CROSS REFERENCE TO RELATED APPLICATIONS

This application claims priority to Japanese Patent Applications Nos. 2019-161000 and 2019-161001 filed on Sep. 4, 2019, the contents of which are incorporated herein by reference in their entireties.

BACKGROUND

Technological Field

The present disclosure relates to an image forming apparatus, an information processing system, and an information processing method.

Description of the Related Art

An electrophotographic image forming apparatus has widely been used. The electrophotographic image forming apparatus performs, as printing steps, steps of forming a toner image in accordance with an input image on a photoconductor, primarily transferring the toner image on the photoconductor to a transfer belt, secondarily transferring the toner image on the transfer belt to paper, and thermally fixing the toner image onto the paper by using a fixing apparatus.

The fixing apparatus is a consumable article. Therefore, in order to provide a user with a printed image of high quality in a stable manner, life of the fixing apparatus should be predicted and maintenance such as replacement of the fixing apparatus at appropriate timing should be done.

In conventionally determining the life of the fixing apparatus, a uniform running distance has been set based on results in prescribed evaluation of durability and the running distance has served as the basis for determination of arrival of the last stage of life in which maintenance should be done. In this case, however, even a still serviceable fixing apparatus has been determined as having reached the last stage of its life, which has led to inefficient use for a user.

As shown, for example, in Japanese Laid-Open Patent Publication No. 2017-138427, a technique for setting two threshold values for torque of drive load of a fixing apparatus and determining that the fixing apparatus has reached the end of its life when torque is equal to or higher than a larger threshold value of the two threshold values. Japanese Laid-Open Patent Publication No. 2018-155850 discloses a technique for determining whether or not a fixing apparatus is near the end of its life based on magnitude of load sensed by a current sensor.

SUMMARY

A sliding portion of the fixing apparatus may be worn by sliding rotation of a fixing belt. The fixing belt may be rotated as following a pressurization roller. Therefore, in order to maintain the number of rotations of the pressurization roller constant from a point of view of stable formation of an image, rotational torque of the pressurization roller should be increased.

With increase in rotational torque of the pressurization roller, however, when load imposed by sliding at the sliding portion of the fixing apparatus is higher than driving force transmitted from the pressurization roller to the fixing belt, slip occurs between the pressurization roller and the fixing belt, and consequently slip of paper in a nip region of the fixing apparatus tends to occur. In this case, a speed of paper at the time when the paper passes through the fixing apparatus is lower than a speed at the time when the paper passes through a transfer portion located upstream in the fixing apparatus. Consequently, an output image (a fixed image) is deteriorated.

From a point of view above, torque (torque of the pressurization roller) at which slip of paper is expected to occur may be determined in advance and set as a reference value (threshold value) for determination of life. Torque at the time of slip of paper, however, is varied also by a state of pressurization (load) by the pressurization roller. Therefore, it is difficult to uniquely determine the reference value.

Therefore, according to the conventional technique, the fixing apparatus has consequently been determined as having reached the end of its life in a stage quite earlier than the actual end of its life.

The present disclosure was made in view of the problems above, and provides an image forming apparatus, an information processing system, and an information processing method capable of achieving higher accuracy in determination of the end of life of a fixing apparatus.

To achieve at least one of the abovementioned objects, according to an aspect of the present disclosure, an image forming apparatus reflecting one aspect of the present disclosure that includes at least a fixing apparatus that fixes onto a recording material, an unfixed image on the recording material and forms an image on the recording material comprises a pressurization member that is rotated by a motor in a direction of transportation in the fixing apparatus, of the recording material downstream in a transportation path, a fixing belt that forms, as being opposed to the pressurization member, a nip region where the unfixed image is fixed, and is rotated as following rotation of the pressurization member, a support member that is arranged on an inner side of the fixing belt and slidably supports the fixing belt at a position opposed to the pressurization member against a pressure applied by the pressurization member, and a control unit that obtains torque of the motor at the time when the motor is driven each time a predetermined condition is satisfied, and determines that the fixing apparatus has reached the end of its life based on variation over time in obtained torque turning from increase to decrease.

To achieve at least one of the abovementioned objects, according to another aspect of the present disclosure, an information processing system reflecting another aspect of the present disclosure comprises an image forming apparatus that includes at least a fixing apparatus that fixes onto a recording material, an unfixed image on the recording material and forms an image on the recording material, and an information processing apparatus. The image forming apparatus includes a pressurization member that is rotated by a motor in a direction of transportation in the fixing apparatus, of the recording material downstream in a transportation path, a fixing belt that forms, as being opposed to the pressurization member, a nip region where the unfixed image is fixed, and is rotated as following rotation of the pressurization member, and a support member that is arranged on an inner side of the fixing belt and slidably supports the fixing belt at a position opposed to the pressurization member against a pressure applied by the pressurization member. The image forming apparatus detects torque of the motor at the time when the motor is driven. The information processing apparatus obtains from the image forming apparatus, torque at the time when the motor is driven each time a predetermined condition is satisfied. The information processing apparatus determines that the fixing apparatus has reached an end of its life based on variation over time in obtained torque turning from increase to decrease.

To achieve at least one of the abovementioned objects, according to yet another aspect of the present disclosure, an information processing method reflecting yet another aspect of the present disclosure is performed in an image forming apparatus that includes at least a fixing apparatus that fixes onto a recording material, an unfixed image on the recording material and forms an image on the recording material. The image forming apparatus includes a control unit, a pressurization member that is rotated by a motor in a direction of transportation in the fixing apparatus, of the recording material downstream in a transportation path, a fixing belt that forms, as being opposed to the pressurization member, a nip region where the unfixed image is fixed, and is rotated as following rotation of the pressurization member, and a support member that is arranged on an inner side of the fixing belt and slidably supports the fixing belt at a position opposed to the pressurization member against a pressure applied by the pressurization member. The information processing method includes obtaining, by the control unit, torque of the motor at the time when the motor is driven each time a predetermined condition is satisfied, and determining, by the control unit, that the fixing apparatus has reached an end of its life based on variation over time in obtained torque turning from increase to decrease.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure.

DETAILED DESCRIPTION OF EMBODIMENTS

Figure 1:
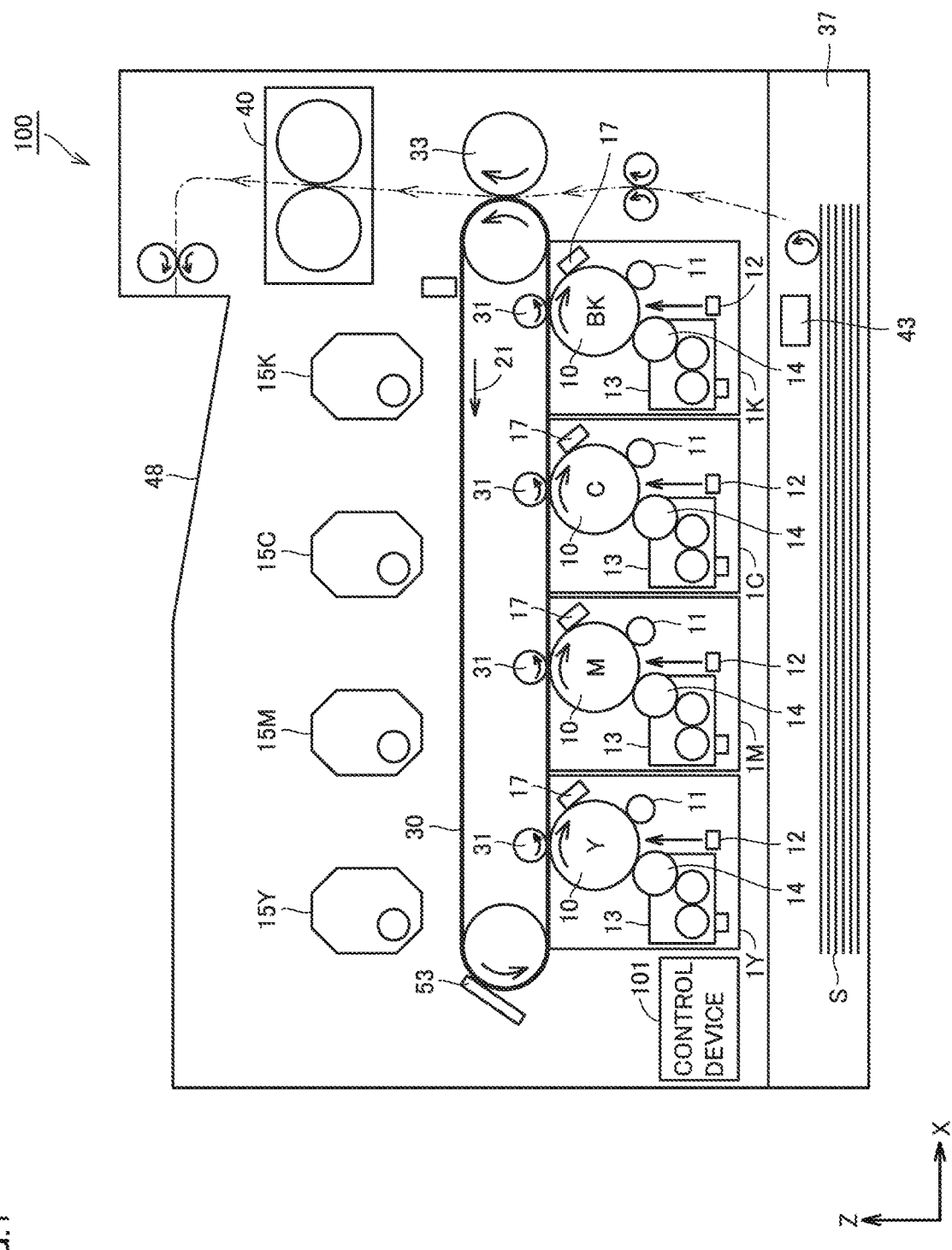
FIG. 1 is a diagram showing an exemplary configuration of an image forming apparatus.

Hereinafter, one or more embodiments of the present disclosure will be described with reference to the drawings. However, the scope of the disclosure is not limited to the disclosed embodiments.

An image forming apparatus in Embodiments 1 to 11 will be described below with reference to the drawings. When the number and an amount are mentioned in Embodiments 1 to 11 described below, the scope of the present disclosure is not necessarily limited to the number and the amount unless otherwise specified. The same or corresponding elements have the same reference numerals allotted and redundant description may not be repeated.

The drawings are not to scale, and for facilitating understanding of a structure, the drawings may be modified in scale for clarification of the structure. Each embodiment and each modification described below may selectively be combined as appropriate.

Though an image forming apparatus as a color printer will be described below, the image forming apparatus is not limited to the color printer. For example, the image forming apparatus may be a monochrome printer, a FAX, or a multi-functional peripheral (MFP) of the monochrome printer, the color printer, and the FAX.

<<Disclosure I>>

In the following, Embodiments 1 to 5 according to the present disclosure will be described with reference to torque Tq, average torque Tav as an average value of torque Tq, and moving average torque Tmav as a moving average value of average torque Tay. Details of torque will be described later.

For the sake of convenience of description, when torque Tq, average torque Tav, and moving average torque Tmav are not distinguished from one another, they are simply denoted as "torque Tg." Torque Tg is a concept that encompasses torque Tq, average torque Tav, and moving average torque Tmav.

Embodiment 1

<A. Overall Configuration>

FIG. 1 is a diagram showing an exemplary configuration of an image forming apparatus 100.

Image forming apparatus 100 includes imaging units 1Y, 1M, 1C, and 1K, an intermediate transfer belt 30 (a transfer target material), a primary transfer roller 31, a secondary transfer roller 33, a cassette 37, a fixing apparatus 40, a cleaning blade 53, and a control device 101.

A toner bottle 15Y that supplies yellow (Y) toner, a toner bottle 15M that supplies magenta (M) toner, a toner bottle 15C that supplies cyan (C) toner, and a toner bottle 15K that supplies black (BK) toner can be attached to image forming apparatus 100. Imaging unit 1Y forms a yellow (Y) toner image by receiving supply of toner from toner bottle 15Y. Imaging unit 1M forms a magenta (M) toner image by receiving supply of toner from toner bottle 15M. Imaging unit 1C forms a cyan (C) toner image by receiving supply of toner from toner bottle 15C. Imaging unit 1K forms a black (BK) toner image by receiving supply of toner from toner bottle 15K. Imaging units 1Y, 1M, 1C, and 1K are sequentially arranged along a direction of rotation of intermediate transfer belt 30.

Imaging units 1Y, 1M, 1C, and 1K each include a photoconductor 10, a charging roller 11, an exposure unit 12, a development device 13, and a cleaning blade 17. Imaging units 1Y, 1M, 1C, and 1K are attachable to and detachable from a main body of image forming apparatus 100.

Photoconductor 10 is an image carrier that carries a toner image. By way of example, a photoconductor drum on which surface a photosensitive layer is formed is employed as photoconductor 10.

Charging roller 11 evenly charges the surface of photoconductor 10. Exposure unit 12 emits laser beams to photoconductor 10 in response to a control signal from control device 101 and exposes the surface of photoconductor 10 in accordance with a designated image pattern. An electrostatic latent image in accordance with an input image is thus formed on photoconductor 10.

Development device 13 develops an electrostatic latent image with a developer containing toner, a carrier, and an additive. The developer is supplied from a toner bottle. Development device 13 includes a development roller 14. Development device 13 applies development bias to development roller 14 to cause toner to adhere to a surface of development roller 14. Development device 13 rotates development roller 14 and transfers toner from development roller 14 to photoconductor 10. A toner image in accordance with the electrostatic latent image is thus developed on the surface of photoconductor 10.

Photoconductor 10 and intermediate transfer belt 30 come in contact with each other in a portion where primary transfer roller 31 is provided. Prescribed transfer bias is applied to that portion of contact so as to transfer the toner image developed on photoconductor 10 to intermediate transfer belt 30. At this time, the yellow (Y) toner image, the magenta (M) toner image, the cyan (C) toner image, and the black (BK) toner image are sequentially superimposed and transferred to intermediate transfer belt 30. The color toner image is thus formed on intermediate transfer belt 30.

Cleaning blade 17 is pressed against photoconductor 10 and collects toner that remains on the surface of photoconductor 10 after transfer to intermediate transfer belt 30.

Cassette 37 is provided, for example, in a lower portion of image forming apparatus 100. Paper S (a transfer target medium) as a recording material is set in cassette 37. Paper S is sent one by one from cassette 37 to secondary transfer roller 33. Secondary transfer roller 33 transfers the toner image that has been transferred to intermediate transfer belt 30 to paper S. By synchronizing timing of feed and transportation of paper S with a position of the toner image on intermediate transfer belt 30, the toner image is transferred to an appropriate position on paper S. Thereafter, paper S is sent to fixing apparatus 40. Specifically, secondary transfer roller 33 transports paper S to fixing apparatus 40 at a predetermined speed. Secondary transfer roller 33 is rotationally driven by a not-shown driving apparatus.

Fixing apparatus 40 fixes an unfixed image on paper S onto the paper. Specifically, fixing apparatus 40 melts the toner image on paper S that passes through fixing apparatus 40 and fixes the toner image onto paper S. Thereafter, paper S is ejected to a tray 48. A specific configuration of fixing apparatus 40 will be described later.

Cleaning blade 53 is pressed against intermediate transfer belt 30 and collects toner that remains on intermediate transfer belt 30 after transfer of the toner image. Toner is transported by a transportation screw (not shown) and collected in a waste toner container (not shown).

Control device 101 controls operations of image forming apparatus 100. Control device 101 controls, for example, a motor for controlling rotation of photoconductor 10 and a motor for controlling rotation of primary transfer roller 31. Control device 101 controls operations of fixing apparatus 40. The motor is driven, for example, under pulse width modulation (PWM) control.

As set forth above, image forming apparatus 100 includes at least fixing apparatus 40 that fixes an unfixed image G on paper S (recording material) onto paper S and forms an image on paper S.

Figure 2:
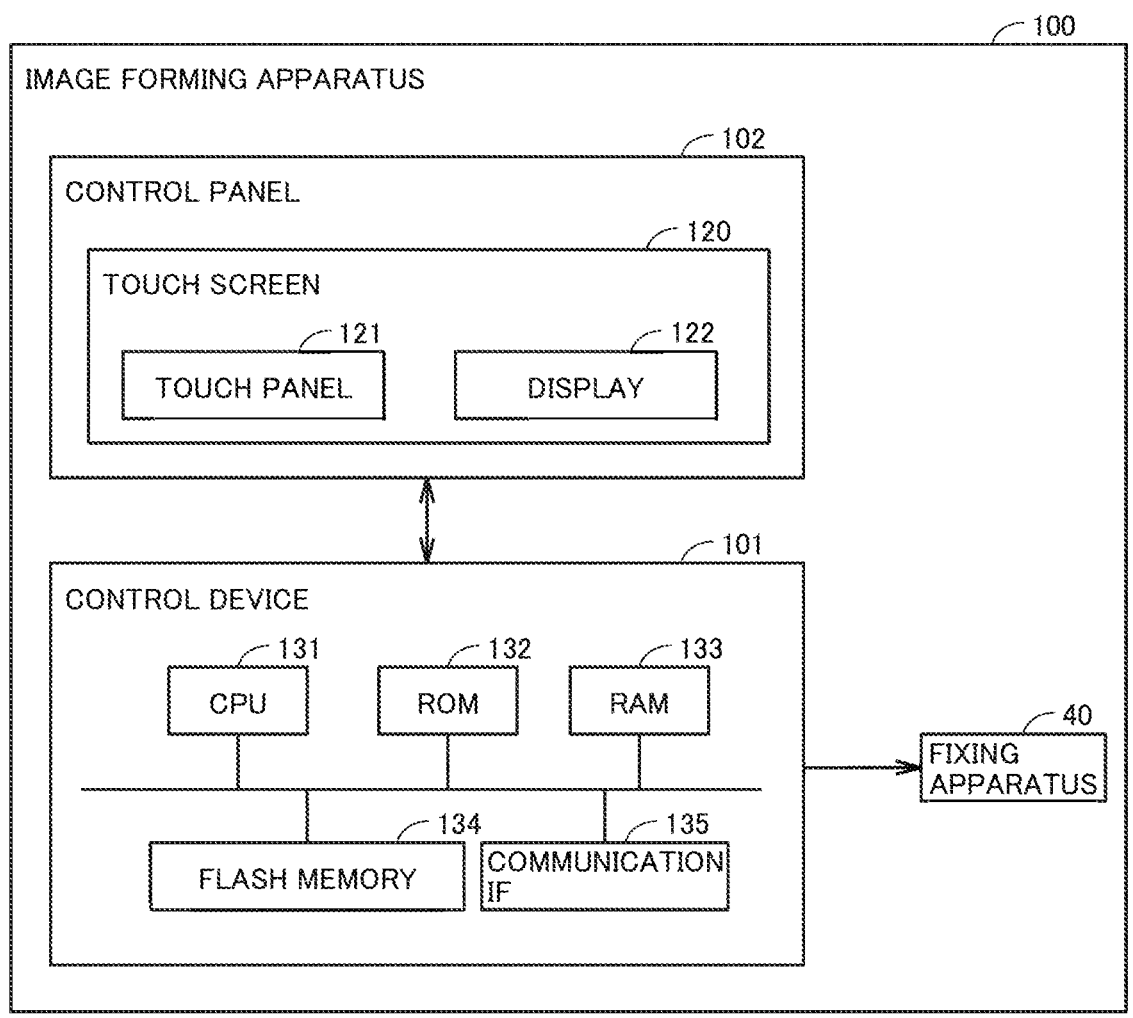
FIG. 2 is a block diagram for illustrating a hardware configuration of the image forming apparatus.

FIG. 2 is a block diagram for illustrating a hardware configuration of image forming apparatus 100.

Image forming apparatus 100 includes at least control device (control unit) 101, a control panel 102, and fixing apparatus 40.

Control panel 102 includes a touch screen 120. Touch screen 120 is constituted of a display 122 and a touch panel 121 arranged as superimposed on display 122.

Control device 101 includes a central processing unit (CPU) 131 representing an exemplary processor that executes a program, a read only memory (ROM) 132 that stores data in a non-volatile manner, a random access memory (RAM) 133 that stores data in a volatile manner, a flash memory 134, and a communication IF 135. Control device 101 can communicate with control panel 102 through communication IF 135.

Flash memory 134 is a non-volatile semiconductor memory. Flash memory 134 stores an operating system and various programs executed by CPU 131 and various types of contents and data. Flash memory 134 stores in a volatile manner, various types of data such as data generated by image forming apparatus 100 and data obtained from an apparatus outside image forming apparatus 100.

<B. Fixing Apparatus>

Figure 3:
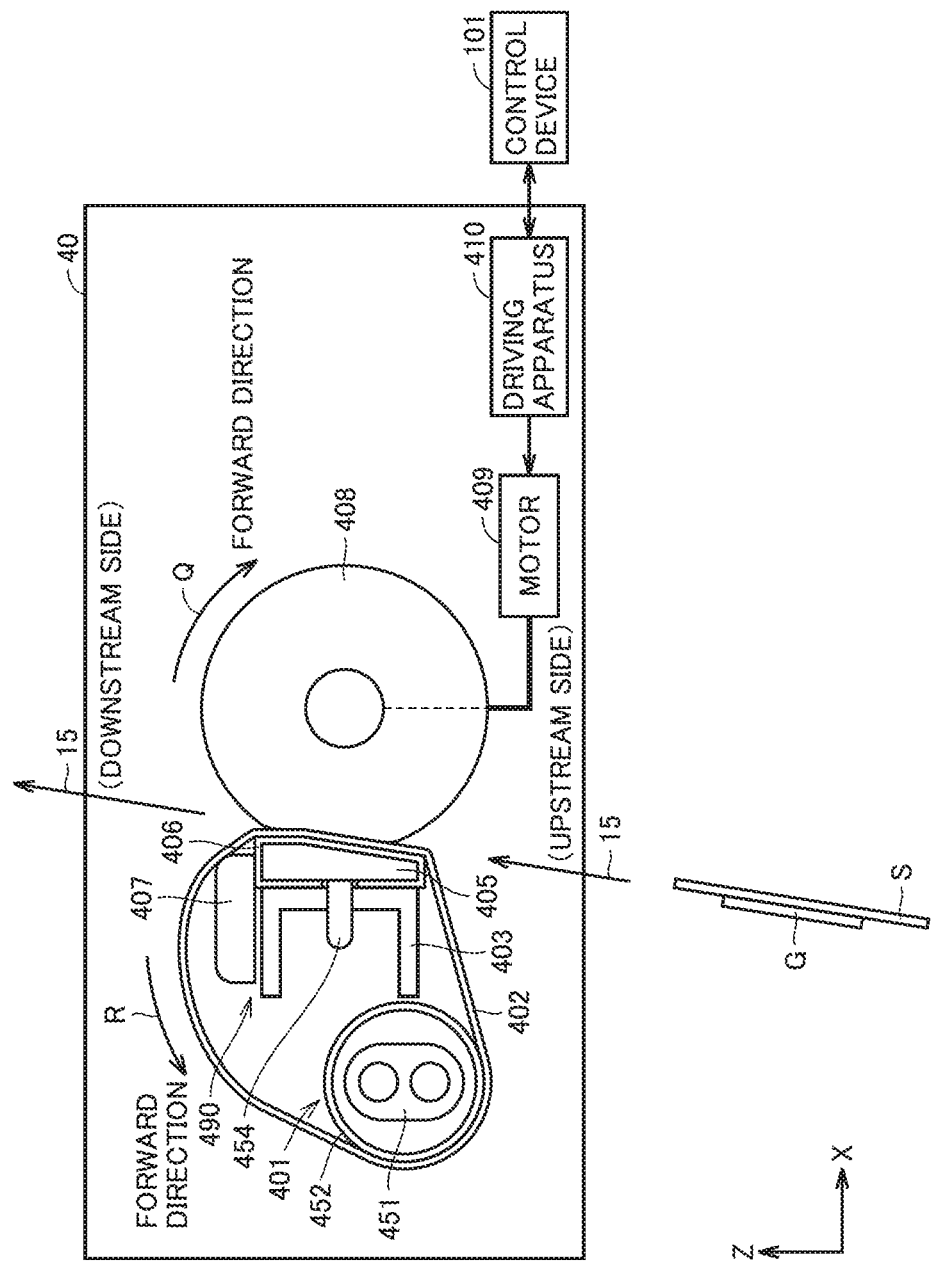
FIG. 3 is a diagram for illustrating a hardware configuration of a fixing apparatus.

FIG. 3 is a diagram for illustrating a hardware configuration of fixing apparatus 40.

Fixing apparatus 40 typically includes a heating member 401, a fixing belt 402, a fixing member (support member) 490, a pressurization roller (pressurization member) 408, a motor 409, and a driving apparatus (driving unit) 410.

Fixing member 490 is arranged on an inner side of fixing belt 402 and slidably supports fixing belt 402 at a position opposed to pressurization roller 408 against a pressure applied by pressurization roller 408. Specifically, fixing member 490 includes a holding member 403, a nip forming member 405, a sliding sheet 406, and a curvature providing member 407. Nip forming member 405 includes a coupling shaft 454.

Heating member 401 is a heat source that heats fixing belt 402. Heating member 401 includes a halogen heater 451 and a housing 452. Halogen heater 451 is provided in housing 452. Housing 452 is in contact with fixing belt 402 at its outer surface. Heating member 401 transmits heat generated by halogen heater 451 to fixing belt 402 through housing 452.

Halogen heater 451 is constituted of two heaters different in heat generation region in the present example. Housing 452 is a pipe made of aluminum or stainless steel and having a thickness approximately from 0.2 mm to 0.5 mm. An inner circumferential surface of housing 452 is painted black in order to enhance absorption of light generated by halogen heater 451. An outer circumferential surface of housing 452 is provided with a fluorine-based coating in order to prevent contamination.

In the present example, a configuration in which heating member 401 is not rotated even though fixing belt 402 is rotated is exemplified. Without being limited as such, heating member 401 may be rotated as following rotation of fixing belt 402.

Fixing belt 402 is an endless belt. Fixing belt 402 forms, as being opposed to pressurization roller 408, a nip region where unfixed image G is fixed, and is rotated as following rotation of pressurization roller 408. Specifically, fixing belt 402 is supported by fixing member 490 at a position opposed to pressurization roller 408 and fixes an unfixed image onto paper S between the fixing belt and pressurization roller 408. More specifically, fixing belt 402 is supported by nip forming member 405 and heating member 401 as being tensioned, and is rotated as following rotation of pressurization roller 408.

Fixing belt 402 is constituted of a base layer composed of a polyimide (PI) resin or nickel and having a thickness approximately from 50 μm to 100 μm, an elastic layer composed of silicone rubber and having a thickness approximately from 100 μm to 300 μm, and a fluorine-based release layer having a thickness approximately from 10 μm to 50 μm.

Specifically, fixing belt 402 includes a resilient layer on the base layer and includes the release layer on the resilient layer. The base layer comes in contact with the outer circumferential surface of housing 452 of heating member 401. The release layer comes in contact with the surface of pressurization roller 408 and paper S. More specifically, the release layer comes in contact with unfixed image G on paper S.

Holding member 403 holds nip forming member 405. Holding member 403 is made of a sheet metal in a bracket shape having a thickness of approximately 2 mm. Holding member 403 is provided with a hole at a position corresponding to coupling shaft 454 for fitting with coupling shaft 454 of nip forming member 405.

Nip forming member 405 forms the nip region between the nip forming member and pressurization roller 408. Nip forming member 405 is composed of a resin such as liquid crystal plastic (LCP). Coupling shaft 454 of nip forming member 405 protrudes toward a side opposite to the nip region. Sliding sheet 406 is wound around nip forming member 405.

Sliding sheet 406 as a sliding member is made of a glass cloth sheet covered with a fluorine resin excellent in slidability or a polytetrafluoroethylene (PTFE) sheet. As fixing belt 402 is rotated with sliding sheet 406 being sandwiched between nip forming member 405 and fixing belt 402, resistance at the time of sliding can be lowered. Fixing belt 402 can thus be rotated in a stable manner Sliding sheet 406 is provided with recesses having a depth approximately from 50 μm to 200 μm, in a surface in contact with fixing belt 402. Since an area of contact with fixing belt 402 can thus be decreased, resistance at the time of sliding can be lowered. Furthermore, by applying grease as a lubricant between fixing belt 402 and sliding sheet 406, resistance at the time of sliding is lowered.

In winding and fixing sliding sheet 406 around nip forming member 405, in order to fix the position of sliding sheet 406, a hole is provided at a position in sliding sheet 406 corresponding to coupling shaft 454 on each of an upstream side and a downstream side. Coupling shaft 454 passes through a through hole in sliding sheet 406 and a through hole in holding member 403. As pressing force is applied by pressurization roller 408 in this state, sliding sheet 406 is sandwiched between nip forming member 405 and holding member 403 with pressing force so that the position of sliding sheet 406 is held.

Curvature providing member 407 provides a curvature to a portion of fixing belt 402 that has passed through the nip region. Curvature providing member 407 is composed of a resin such as LCP, similarly to nip forming member 405.

Pressurization roller 408 is rotated in a direction of downstream transportation in fixing apparatus 40, of paper S (specifically, paper S transported from secondary transfer roller 33) through a transportation path. Pressurization roller 408 can be rotated in a forward direction (a direction shown with an arrow Q in the figure) in which paper S is transported from the upstream side to the downstream side through the transportation path and in a direction reverse thereto. When pressurization roller 408 is rotated in the forward direction, fixing belt 402 is also rotated in the forward direction (a direction shown with an arrow R in the figure). Since paper S is transported upward from below through the transportation path as shown with an arrow 15 in FIG. 3, the upstream side is located below and the downstream side is located above.

Though details will be described later in Disclosure II, pressurization roller 408 can be rotated at a rotation speed VH higher than a reference speed and a rotation speed VL lower than the reference speed. The rotation speed is determined by the number of rotations. A command for the number of rotations is sent from control device 101 to driving apparatus 410. By way of example, rotation speed VH is higher by three percent than the reference speed and rotation speed VL is lower by three percent than the reference speed.

Pressurization roller 408 is composed of silicone rubber having a diameter approximately from 20 mm to 40 mm. A surface of silicone rubber is covered with a fluorine-based tube in order to enhance releasability.

Driving apparatus 410 rotates motor 409. Driving apparatus 410 rotates motor 409 in the forward direction and the reverse direction in response to a command from control device 101.

Motor 409 rotates pressurization roller 408 in the forward direction (the direction shown with arrow Q) and the reverse direction based on a command from driving apparatus 410. Motor 409 is connected to a rotation shaft of pressurization roller 408 with a gear (not shown) being interposed.

Pressurization roller 408 is movable between a position (the position shown in FIG. 3) where the pressurization roller is in contact with fixing belt 402 and a prescribed position distant from fixing belt 402 (for example, a position to the right relative to the position of pressurization roller 408 in FIG. 3), by means of a not-shown moving mechanism, in response to an instruction from control device 101. In other words, pressurization roller 408 is moved between a position (the position shown in FIG. 3) where it rotates fixing belt 402 and a position where it does not rotate fixing belt 402.

Specifically, in forming an image, pressurization roller 408 is moved to a position where it comes in contact with fixing belt 402 as shown in FIG. 3. In this state, fixing member 490 is pressurized by pressurization roller 408 at a position where fixing belt 402 is supported. While an image is not formed, pressurization roller 408 is distant from fixing belt 402.

At least after warm-up of image forming apparatus 100 and after fixation onto the recording material, as shown in FIG. 3, pressurization roller 408 comes in contact with fixing belt 402. After warm-up of image forming apparatus 100 and after fixation onto paper S, paper S does not pass through fixing apparatus 40. That is, a state in which no paper is passing is set.

Figure 4:
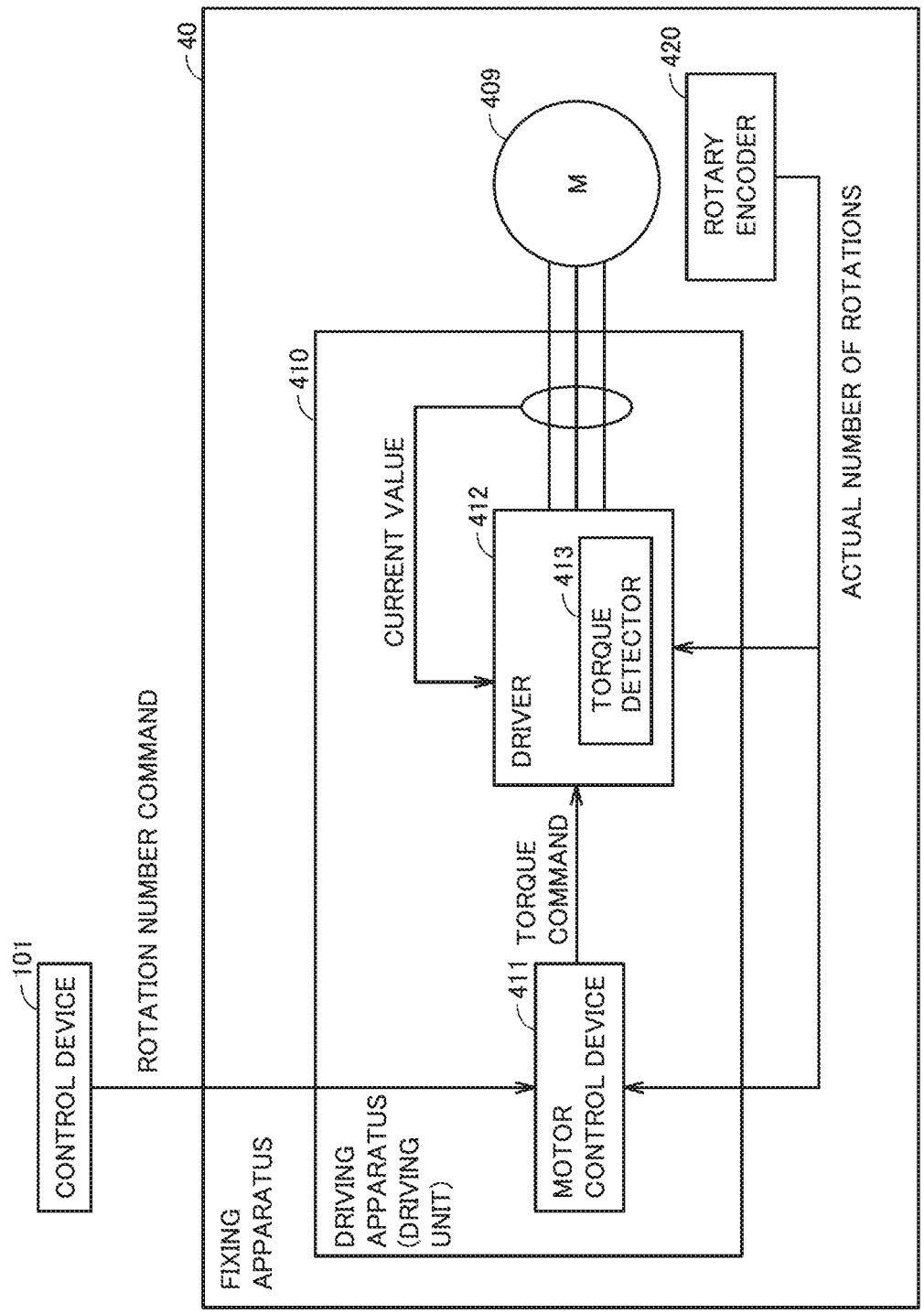
FIG. 4 is a block diagram for illustrating detection of torque in the fixing apparatus.

FIG. 4 is a block diagram for illustrating detection of torque in fixing apparatus 40.

Fixing apparatus 40 includes motor 409, driving apparatus 410, and a rotary encoder 420. Driving apparatus 410 includes a motor control device 411 as a lower-order control device and a driver 412 implemented by an electronic circuit. Driver 412 includes a torque detector 413.

Driving apparatus 410 drives motor 409 to maintain a rotation speed of pressurization roller 408 constant, based on a command (a rotation number command) from control device 101 as a higher-order control device.

Motor 409 is typically a three-phase alternating-current motor. As a voltage (V) is applied across input terminals of the three phases (the U phase, the V phase, and the W phase), the motor is rotated. For example, a control motor such as a servo motor can also be employed as motor 409.

Motor control device 411 accepts a rotation number command from control device 101. When motor control device 411 accepts the rotation number command, it carries out feedback control such that the number of rotations of motor 409 is set to the number of rotations indicated in the accepted rotation number command (which is also referred to as an "indicated number of rotations" below).

When motor control device 411 accepts the rotation number command, it sends a torque command to driver 412 in accordance with the rotation number command.

Driver 412 controls a switching operation by an internal switching element so as to apply a voltage based on the accepted torque command to each input terminal. A current thus flows from driver 412 to motor 409. Motor 409 is rotated by the current. Driver 412 obtains from a sensor (not shown), a value of the current fed to motor 409.

Rotary encoder 420 detects the number of rotations of motor 409. The detected number of rotations (which is also referred to as an "actual number of rotations" below) is fed back to motor control device 411. Driver 412 is notified of the actual number of rotations.

Motor control device 411 calculates a difference between the indicated number of rotations and the actual number of rotations. Motor control device 411 controls a torque command to be output to driver 412 such that the difference is closer to zero.

Torque detector 413 detects torque Tq (load torque) of motor 409 based on the actual number of rotations obtained from rotary encoder 420 and the current value detected by the sensor. Specifically, driver 412 periodically calculates torque Tq by dividing a product of an applied voltage (V) and a detected current value (I) by the actual number of rotations.

Each time a predetermined condition is satisfied, driving apparatus 410 notifies control device 101 of torque Tq detected at the time when the predetermined condition is satisfied, of detected torque. Whether or not the predetermined condition is satisfied is typically determined by control device 101.

According to such a configuration, each time the predetermined condition is satisfied, control device 101 can obtain from driving apparatus 410, torque Tq detected by driving apparatus 410. Specifically, control device 101 can obtain torque Tq detected by driving apparatus 410 when the predetermined condition is satisfied.

<C. Functional Configuration>

Figure 5:
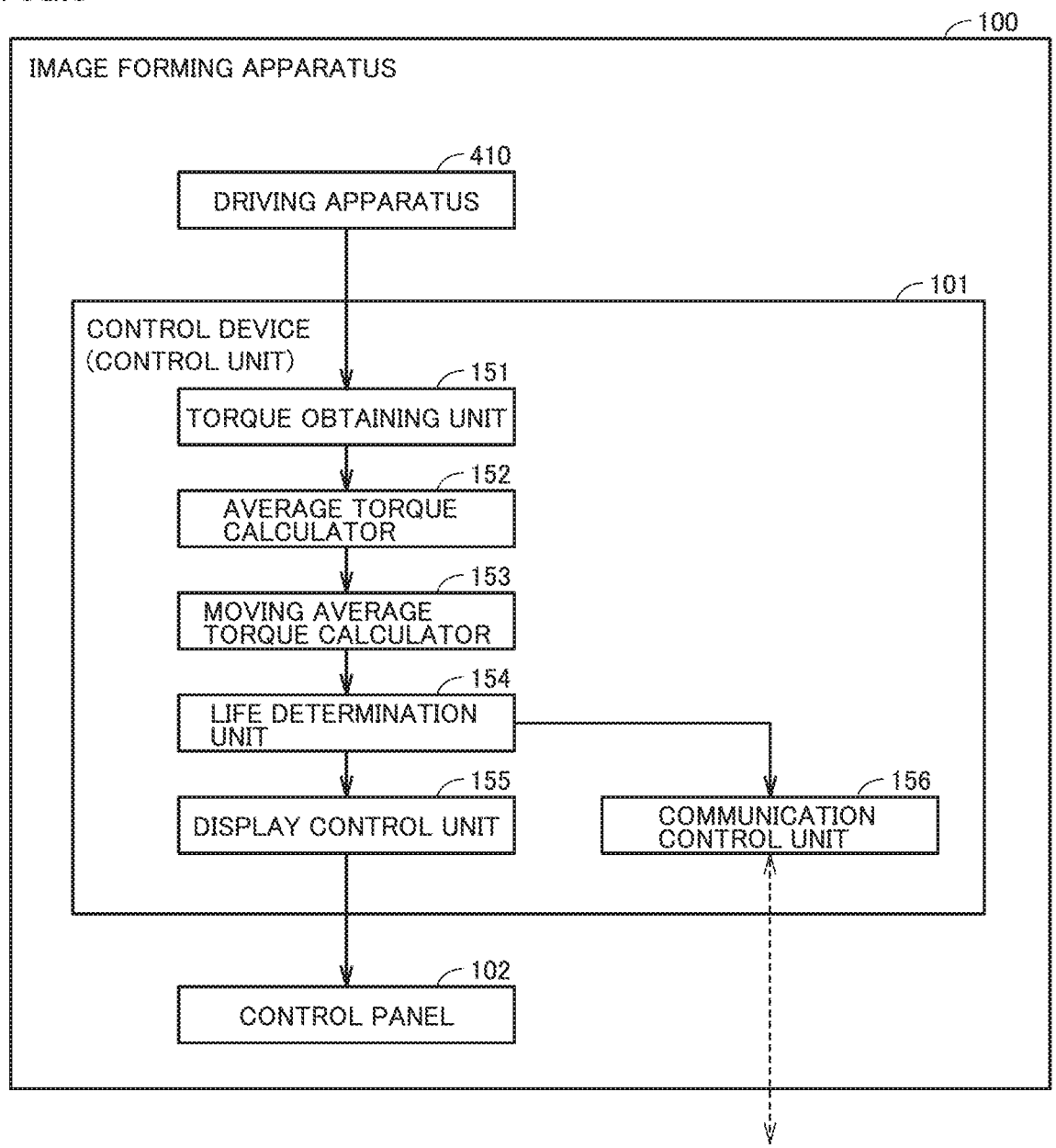
FIG. 5 is a functional block diagram representing a functional configuration of a control device.

FIG. 5 is a functional block diagram representing a functional configuration of control device 101.

Image forming apparatus 100 includes control device 101, driving apparatus 410, and control panel 102.

Control device 101 includes a torque obtaining unit 151, an average torque calculator 152, a moving average torque calculator 153, a life determination unit 154, a display control unit 155, and a communication control unit 156.

Torque obtaining unit 151 obtains torque Tq (a value of torque) from driving apparatus 410. Specifically, torque obtaining unit 151 obtains from driving apparatus 410, torque Tq detected by driving apparatus 410 every prescribed period. An example in which the prescribed period is set to "one day" will be described below. The prescribed period is not limited to one day.

In the present example, torque obtaining unit 151 obtains torque Tq five times a day at the maximum. Specifically, torque obtaining unit 151 obtains from driving apparatus 410, torque Tq during a period over which pressurization roller 408 is in contact with fixing belt 402 as in FIG. 3 and no paper is passing. In other words, torque obtaining unit 151 obtains from driving apparatus 410, torque (which is also referred to as "idle torque" below) of motor 409 during a period over which there is no load imposed by paper S.

More specifically, torque obtaining unit 151 obtains from driving apparatus 410, torque Tq detected after warm-up of image forming apparatus 100. In an example where image forming apparatus 100 is warmed up five times a day, torque can be obtained five times. In an example where the image forming apparatus is warmed up only once a day, control device 101 obtains torque only once on this day. The number of times of obtaining torque Tq per one day is not limited to five times.

As set forth above, "lapse of one day" and "after warm-up of image forming apparatus 100" are defined as the "predetermined condition" in the present example.

Torque (a value of torque) obtained five times from driving apparatus 410 by torque obtaining unit 151 is referred to as Tq(n[1]), Tq(n[2]), Tq(n[3]), Tq(n[4]), and Tq(n[5]). n is a variable representing a day.

Torque obtaining unit 151 sends torque obtained five times to average torque calculator 152. When torque is obtained, for example, only four times, torque obtaining unit 151 typically sends only Tq(n[1]) to Tq(n[4]) to average torque calculator 152. Alternatively, torque obtaining unit 151 may send Tq(n[1]) to Tq(n[5]) and notify average torque calculator 152 that a value of Tq(n[5]) is invalid.

Average torque calculator 152 calculates an average value of torque for each day. Specifically, average torque calculator 152 calculates an average value (which is referred to as "average torque Tav" below) of torque obtained five times as shown in an expression (1) below.

$$Tav(n)=(Tq(n[1])+Tq(n[2])+Tq(n[3])+Tq(n[4])+Tq(n[5]))\div 5 \quad (1)$$

Average torque calculator 152 sends calculated average torque Tav(n) to moving average torque calculator 153.

Moving average torque calculator 153 calculates moving average torque Tmav (a moving average value) by using average torque Tav of five days. Specifically, moving average torque calculator 153 calculates moving average torque Tmav(n) by using average torque Tav(n) on this day and average torque of four days from one day before to four days before (Tav(n−4), Tav(n−3), Tav(n−2), and Tav(n−1)). Specifically, moving average torque calculator 153 performs calculation shown in an expression (2) below.

$$Tmav(n)=(Tav(n-4)+Tav(n-3)+Tav(n-2)+Tav(n-1)+Tav(n))\div 5 \quad (2)$$

Moving average torque calculator 153 sends calculated moving average torque Tmav(n) to life determination unit 154. Though moving average torque Tmav is calculated by using average torque Tav of five days (five pieces), the number of pieces of average torque Tav is not limited to five.

Life determination unit 154 determines whether or not fixing apparatus 40 has reached the end of its life. Specifically, life determination unit 154 determines whether or not fixing apparatus 40 has reached the end of its life based on moving average torque Tmav. More specifically, life determination unit 154 determines that fixing apparatus 40 has reached the end of its life based on variation over time in moving average torque Tmav turning from increase to decrease.

Figure 6:
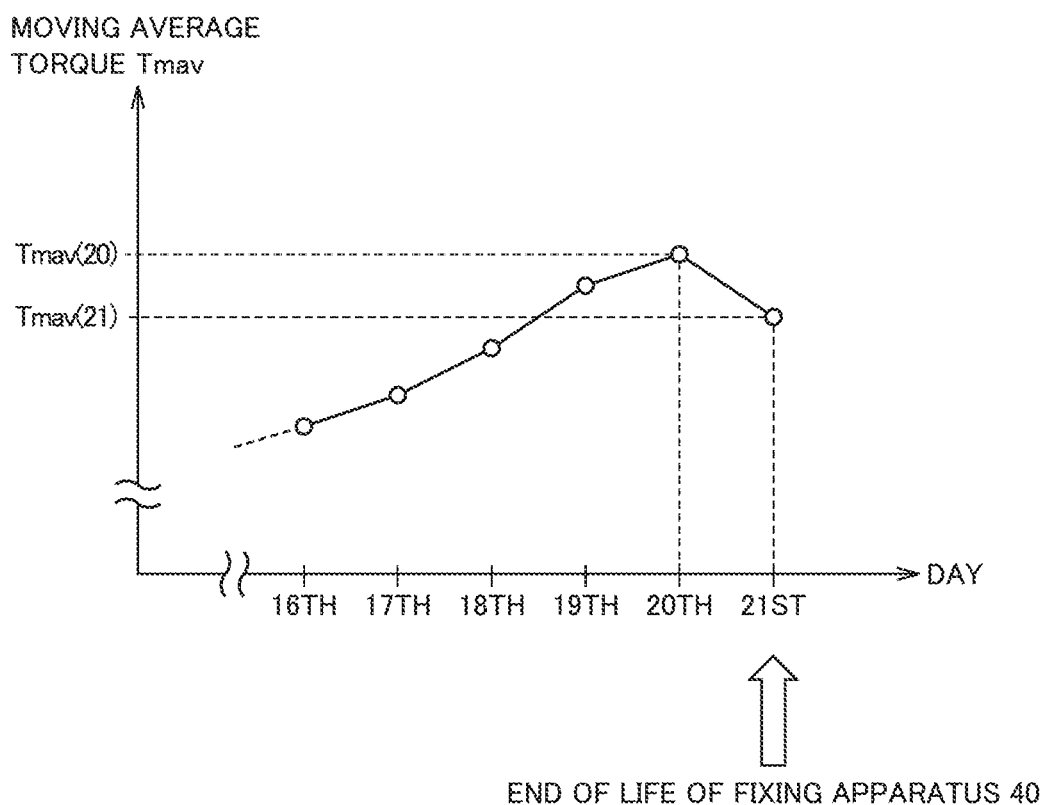
FIG. 6 is a diagram showing variation over time in moving average torque.

FIG. 6 is a diagram showing variation over time in moving average torque Tmav.

The abscissa in the graph (figure) represents a day and the ordinate in the graph represents moving average torque Tmav. In the example in FIG. 6, moving average torque (Tmav(16) to Tmav(21)) from the sixteenth to the twenty-first of a certain month are plotted.

Moving average torque Tmav monotonously increases until the twentieth. Moving average torque Tmav(21) on the twenty-first, however, is lower than moving average torque Tmav(20) on the twentieth which is the previous day. In other words, relation of "Tmav(n−1)>Tmav(n)" is satisfied.

Therefore, life determination unit 154 determines that fixing apparatus 40 has reached the end of its life at the time point of the twenty-first (specifically, the time point of calculation of Tmav(21)). When life determination unit 154 determines that the fixing apparatus has reached the end of its life, it gives a prescribed notification to display control unit 155.

When display control unit 155 accepts a prescribed notification from life determination unit 154, it controls control panel 102 to show a prescribed warning screen.

Figure 7:
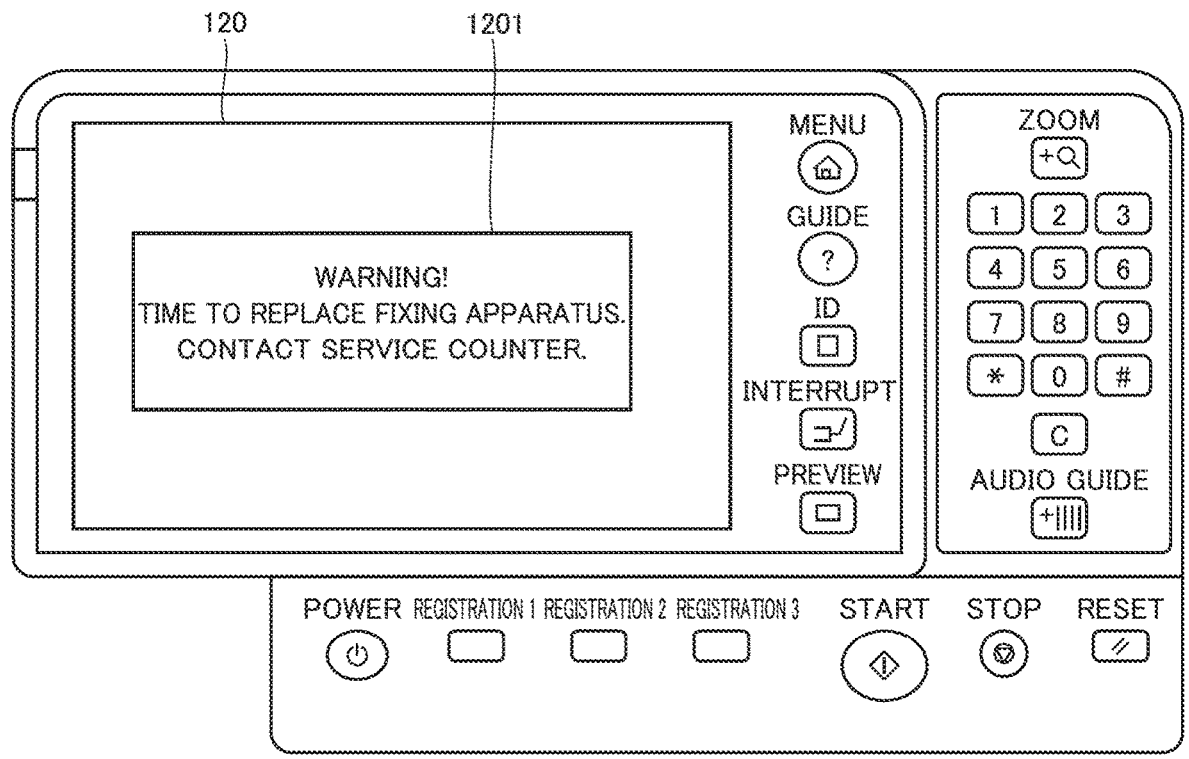
FIG. 7 is a diagram representing an exemplary warning screen shown on a control panel.

FIG. 7 is a diagram representing an exemplary warning screen shown on control panel 102.

Typically, a prescribed warning screen 1201 pops up on touch screen 120 of control panel 102. A user of image forming apparatus 100 can thus know that timing of replacement of fixing apparatus 40 has come.

Referring again to FIG. 5, when predetermined setting has been made by control device 101, life determination unit 154 gives a prescribed notification also to communication control unit 156. Communication control unit 156 is connected to an external network. Image forming apparatus 100 can thus notify an external device that fixing apparatus 40 has reached the end of its life.

Though a configuration in which torque obtaining unit 151 obtains torque Tq detected after warm-up of image forming apparatus 100 from driving apparatus 410 is described above by way of example, limitation thereto is not intended. For example, control device 101 may obtain torque Tq detected after fixation onto a recording material from driving apparatus 410.

When control device 101 determines that fixing apparatus 40 has reached the end of its life, control device 101 typically stops subsequent formation of an image. Without being limited to such control, when control device 101 determines that fixing apparatus 40 has reached the end of its life, control device 101 may permit formation of an image using paper of a first type and not permit formation of an image using paper of a second type smaller in basis weight than the first type. This is because paper S larger in basis weight is less likely to slip in the nip region than paper S smaller in basis weight.

<D. Summary>

Image forming apparatus 100 includes control device 101 that controls operations of the image forming apparatus and fixing apparatus 40 that fixes an unfixed image on paper S (a recording material) onto paper S.

Fixing apparatus 40 includes pressurization roller 408 rotatable in a direction of downstream transportation of the recording material through the transportation path, motor 409 that rotates pressurization roller 408, driving apparatus 410 that drives motor 409, endless fixing belt 402 that is rotated as following rotation of pressurization roller 408, and fixing member 490 that slidably supports fixing belt 402 from an inner surface of fixing belt 402. Fixing member 490 is pressurized by pressurization roller 408 at a position where fixing belt 402 is supported.

Driving apparatus 410 drives motor 409 so as to maintain the rotation speed of pressurization roller 408 constant based on a command from control device 101. Driving apparatus 410 detects torque Tq at the time when it drives motor 409.

Control device 101 obtains detected torque Tq from driving apparatus 410. Control device 101 determines that fixing apparatus 40 has reached the end of its life based on variation over time in torque Tg (in the present example, moving average torque Tmav calculated based on torque Tq) turning from increase to decrease.

Specifically, each time a prescribed period (one day in the present example) elapses, control device 101 obtains torque Tq from driving apparatus 410 a plurality of times and calculates an average value of torque Tq (average torque Tav) obtained the plurality of times. Control device 101 calculates a moving average value (moving average torque Tmav) by using calculated average torque Tav and at least average torque Tav calculated the previous time. When calculated moving average torque Tmav is lower than moving average torque Tmav calculated the previous time, control device 101 determines that fixing apparatus 40 has reached the end of its life.

In fixing apparatus 40, as fixing belt 402 is rotated, sliding sheet 406 serving as a sliding portion is gradually worn and load between fixing belt 402 and sliding sheet 406 gradually increases during rotation of fixing belt 402. Therefore, in order to maintain the speed of pressurization roller 408 constant, torque Tq of motor 409 that rotates pressurization roller 408 should be increased. Therefore, the value of torque Tq of pressurization roller 408 gradually increases as the number of days for which the pressurization roller is used increases. As the value of torque Tq is larger, the value of moving average torque Tmav is also larger.

When the value of torque Tq is larger, however, a phenomenon of slip of paper S occurs in fixing apparatus 40 (specifically, the nip region).

When paper S slips, the speed at which pressurization roller 408 sends paper S downstream is lowered. Therefore, the speed at which pressurization roller 408 sends paper S downstream becomes lower than the speed at which secondary transfer roller 33 on the upstream side in fixing apparatus 40 sends paper S to fixing apparatus 40.

Consequently, a phenomenon called "reverse loop" occurs between secondary transfer roller 33 and fixing apparatus 40. When reverse loop occurs, an image is deteriorated. Loop and reverse loop refer to a state where paper S is bent. "Loop" refers to bending of paper S that occurs in a normal condition. Reverse loop refers to bending of paper S reverse to loop in direction of bending.

When paper S slips as above, the value of detected torque Tq becomes smaller. Therefore, calculated moving average torque Tmav is also lower.

Image forming apparatus 100 thus determines that fixing apparatus 40 has reached the end of its life based on variation over time in moving average torque Tmav turning from increase to decrease. According to such a configuration, the end of life of fixing apparatus 40 can be determined before reverse loop occurs.

According to the configuration, fixing apparatus 40 can be longer in life than in the configuration in which a threshold value of torque of pressurization roller 408 used for determination of the end of life is uniquely determined.

In the present example, the end of life is determined based on moving average torque Tmav. Therefore, even though noise is introduced in torque, influence by noise can be lessened. In other words, determination of the end of life can be higher in accuracy than determination of the end of life made simply based on torque Tq.

Each time a prescribed period (one day in the present example) elapses, control device 101 obtains from driving apparatus 410, idle torque during a period over which no paper is passing. Specifically, control device 101 obtains from driving apparatus 410, torque Tq detected after warm-up of image forming apparatus 100 or after fixation onto paper S.

At such timing, no image is being formed. Therefore, the value of torque Tq detected in driving apparatus 410 is not dependent on contents of unfixed image G on paper S. Therefore, control device 101 can highly accurately determine the end of life by obtaining torque Tq at such timing.

<E. Control Structure>

Figure 8:
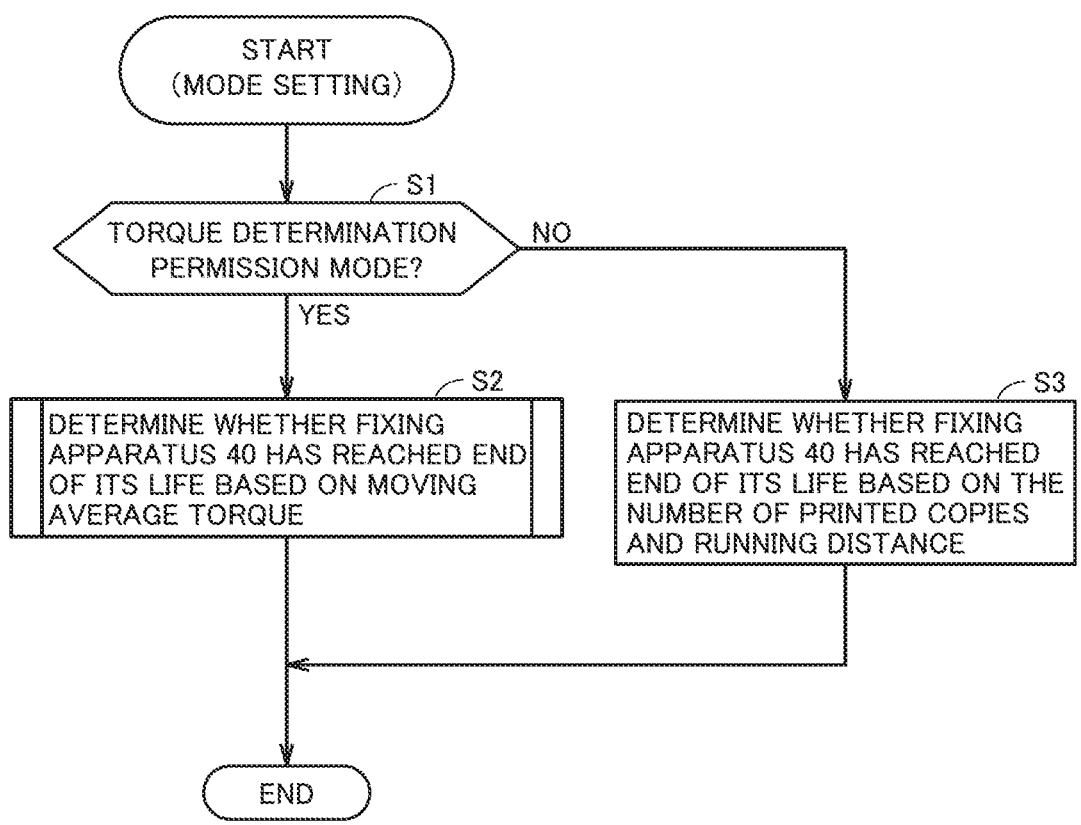
FIG. 8 is a flowchart for illustrating a flow of processing performed in the image forming apparatus.

FIG. 8 is a flowchart for illustrating a flow of processing performed in image forming apparatus 100.

In step S1, control device 101 determines whether or not a torque determination permission mode has been set as a mode of determining the end of life of fixing apparatus 40. The torque determination permission mode refers to a mode in which the end of life of fixing apparatus 40 is determined based on variation over time in torque Tg (in the present example, moving average torque Tmav). Typically, a serviceperson sets the torque determination permission mode.

When control device 101 determines that the torque determination permission mode has been set (YES in step S1), control device 101 determines in step S2 whether or not fixing apparatus 40 has reached the end of its life based on moving average torque Tmav.

When control device 101 determines that the torque determination permission mode has not been set (NO in step S1), control device 101 determines in step S3 whether or not fixing apparatus 40 has reached the end of its life based on the number of printed copies in image forming apparatus 100 and a running distance of pressurization roller 408. Typically, when the number of printed copies exceeds a reference number set in advance or the running distance of pressurization roller 408 exceeds a distance set in advance, control device 101 determines that fixing apparatus 40 has reached the end of its life. In other words, when any one of the condition of the number of printed copies and the condition of the running distance is satisfied, control device 101 determines that fixing apparatus 40 has reached the end of its life.

Figure 9:
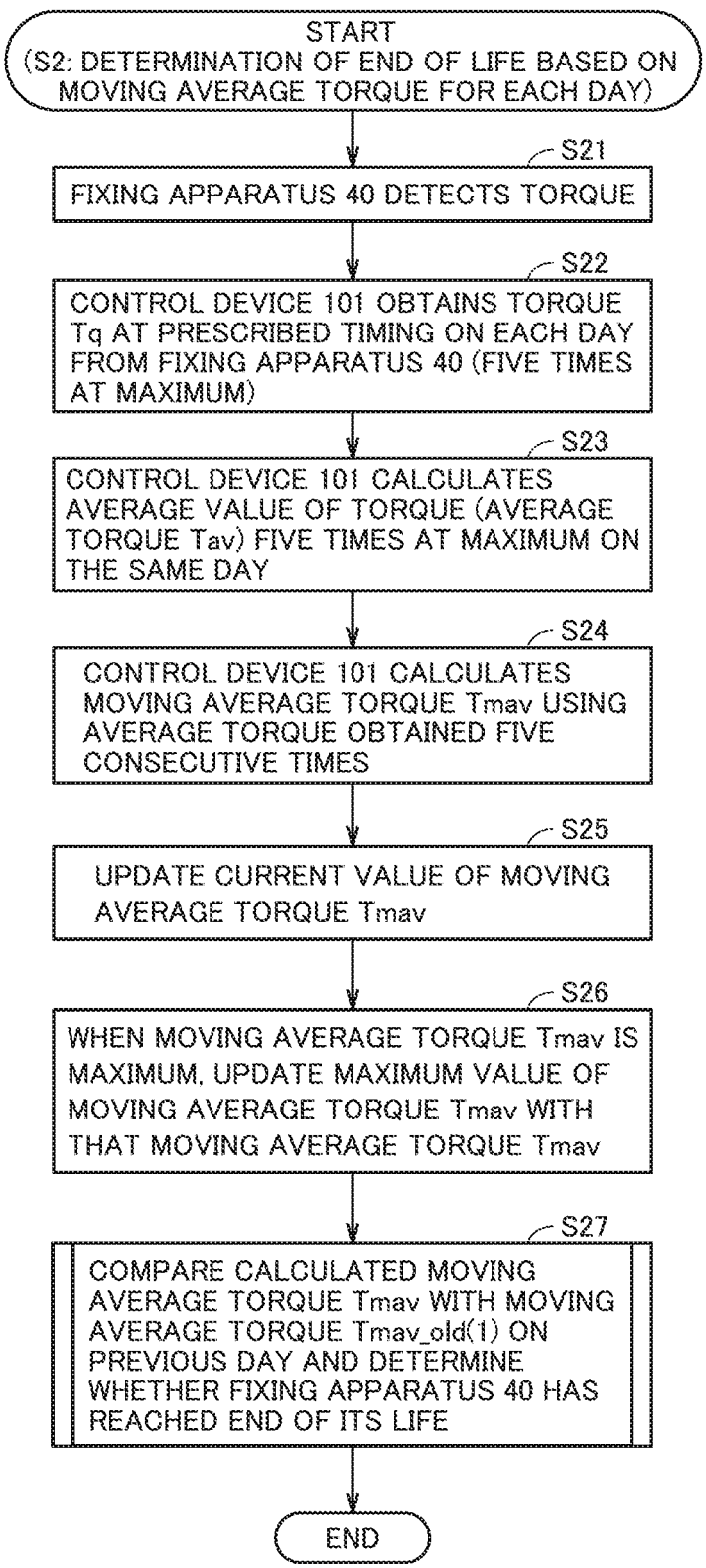
FIG. 9 is a flowchart for illustrating details of processing in step S2 in FIG. 8.

FIG. 9 is a flowchart for illustrating details of processing in step S2 in FIG. 8.

In step S21, fixing apparatus 40 successively detects torque Tq of pressurization roller 408. In step S22, control device 101 obtains from fixing apparatus 40, torque Tq at prescribed timing on each day. As described above, control device 101 obtains from driving apparatus 410, torque Tq detected, for example, after warm-up of image forming apparatus 100.

In step S23, control device 101 calculates an average value of torque Tq (average torque Tav) obtained five times at the maximum on the same day. Specifically, control device 101 performs calculation in the expression (1) described above. In step S24, control device 101 calculates moving average torque Tmav by using five consecutive average values.

In step S25, control device 101 updates a current value (a value of a variable) of moving average torque Tmav with the value calculated in step S24. In step S26, when moving average torque Tmav is maximum, control device 101 updates the maximum value (the value of the variable) of moving average torque Tmav with that moving average torque Tmav. The maximum value of moving average torque Tmav is reset (typically, set to zero) after fixing apparatus 40 is replaced. Therefore, the maximum value is the maximum value after replacement of fixing apparatus 40.

In step S27, control device 101 compares calculated moving average torque Tmav with moving average torque Tmav_old(1) on the previous day and determines whether or not fixing apparatus 40 has reached the end of its life.

Referring to the expression (2), moving average torque Tmav_old(1) on the previous day is calculated in an expression (3) below, with calculated moving average torque Tmav being denoted as Tmav(n).

$$Tmav\_old(1)=Tmav(n-1)=(Tav(n-5)+Tav(n-4)+Tav(n-3)+Tav(n-2)+Tav(n-1))\div 5 \qquad (3)$$

Figure 10:
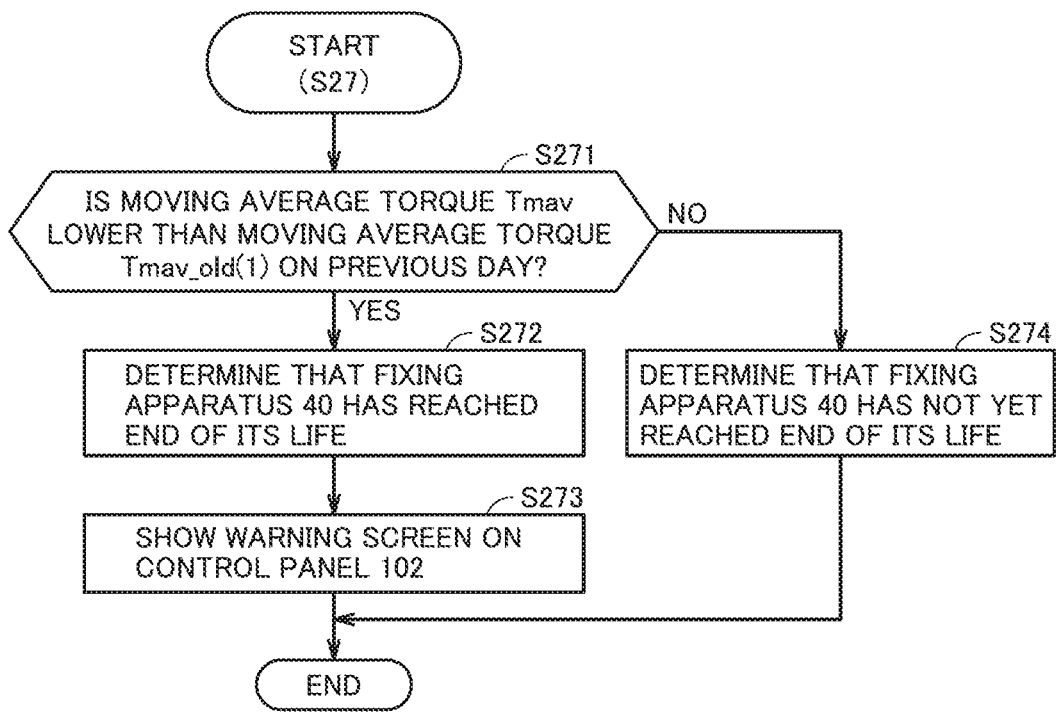
FIG. 10 is a flowchart for illustrating details of processing in step S27 in FIG. 9.

FIG. 10 is a flowchart for illustrating details of processing in step S27 in FIG. 9.

Control device 101 determines in step S271 whether or not moving average torque Tmav is lower than moving average torque Tmav_old(1) on the previous day. When control device 101 determines that the moving average torque is lower than the moving average torque on the previous day (YES in step S271), the control device determines in step S272 that fixing apparatus 40 has reached the end of its life. As shown in FIG. 7, control device 101 controls control panel 102 to show the warning screen in step S273.

When control device 101 determines that the moving average torque is not lower than the moving average torque on the previous day (NO in step S271), control device 101 determines in step S274 that fixing apparatus 40 has not yet reached the end of its life.

<F. Modification>

A modification of life determination processing by control device 101 will be described below.

(f1. First Modification)

Figure 11:
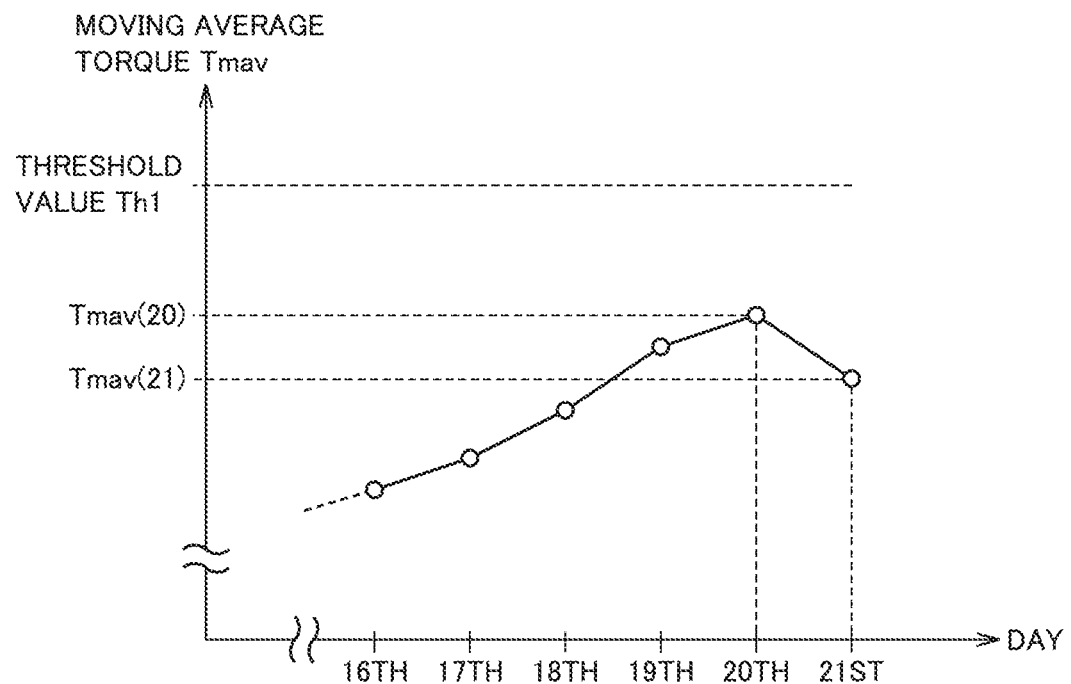
FIG. 11 is a diagram showing variation over time in moving average torque.

FIG. 11 is a diagram showing variation over time in moving average torque.

When variation over time in moving average torque Tmav turns from increase to decrease, control device 101 determines that fixing apparatus 40 has reached the end of its life on condition that moving average torque Tmav is equal to or higher than a predetermined threshold value Th1. Specifically, even though variation over time in moving average torque Tmav turns from increase to decrease, control device 101 does not determine that fixing apparatus 40 has reached the end of its life when moving average torque Tmav is lower than predetermined threshold value Th1.

The reason why determination above is made based on threshold value Th1 is because the value of moving average torque Tmav may turn to decrease due to noise or the like in spite of the fact that moving average torque Tmav is sufficiently lower than a value (numeric range) at which slip of paper S may occur in the nip region.

Figure 12:
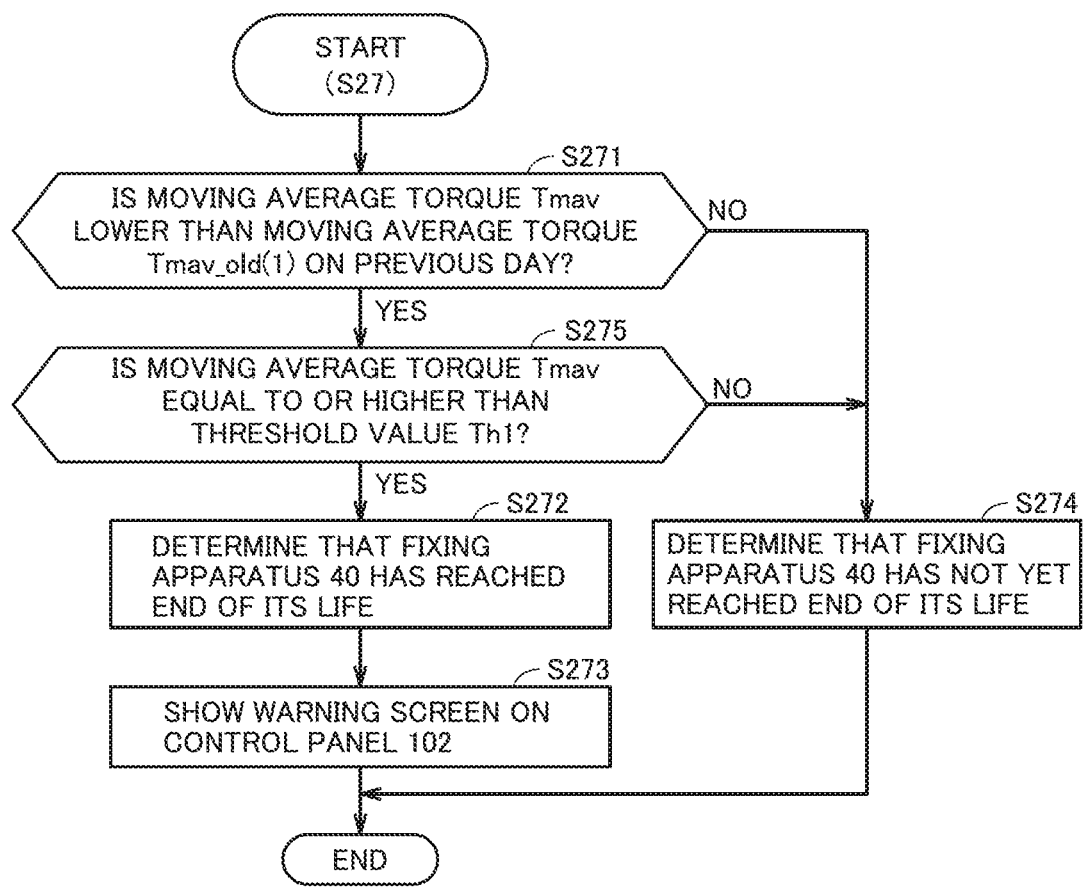
FIG. 12 is a flowchart for illustrating details of processing in step S27 in FIG. 9 in the present modification.

FIG. 12 is a flowchart for illustrating details of processing in step S27 in FIG. 9 in the present modification.

The flowchart in FIG. 12 is different from the flowchart shown in FIG. 10 in including step S275. Specifically, when control device 101 determines in step S271 that the moving average torque is lower than the moving average torque on the previous day (YES in step S271), the control device determines in step S275 whether or not moving average torque Tmav is equal to or higher than threshold value Th1. Threshold value Th1 is assumed as a positive value.

When control device 101 determines that moving average torque Tmav is equal to or higher than threshold value Th1 (YES in step S275), the process proceeds to step S272. When control device 101 determines that moving average torque Tmav is lower than threshold value Th1 (NO in step S275), the process proceeds to step S274.

(f2. Second Modification)

Figure 13:
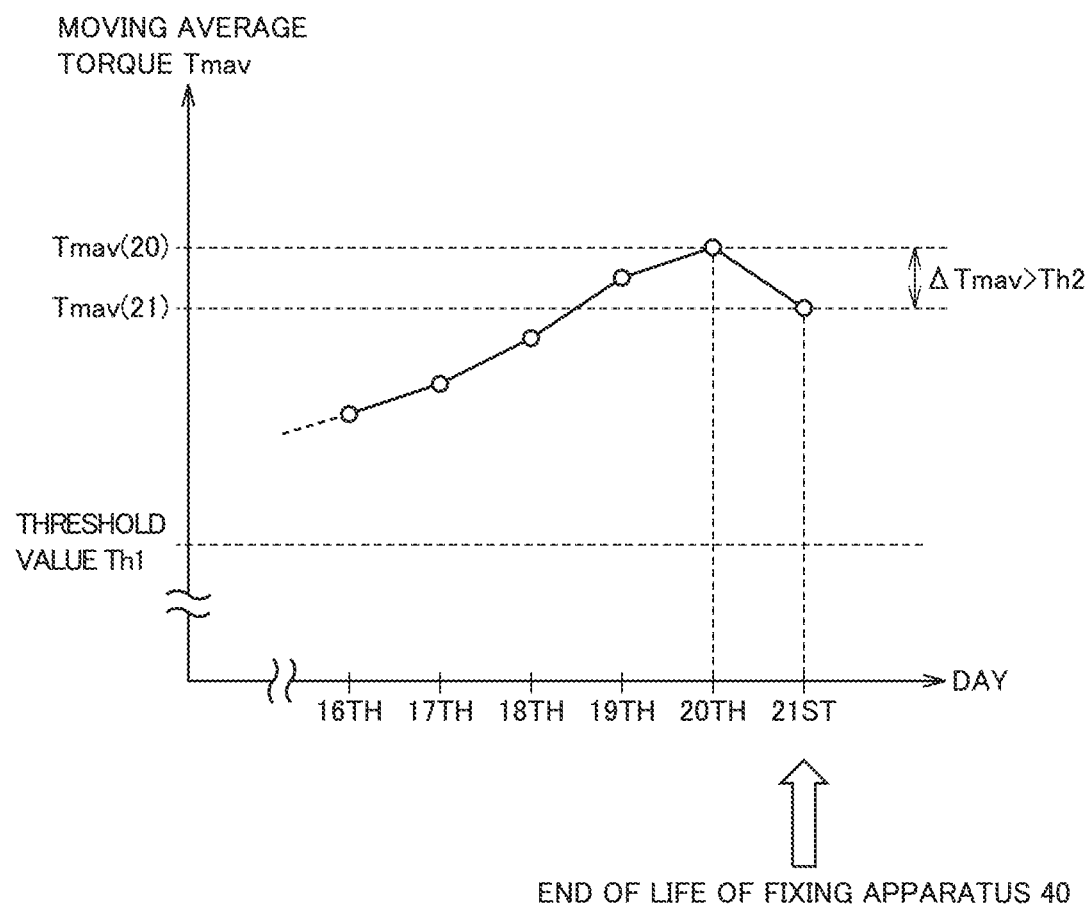
FIG. 13 is a diagram showing variation over time in moving average torque.

FIG. 13 is a diagram showing variation over time in moving average torque.

When variation over time in moving average torque Tmav turns from increase to decrease, control device 101 determines that fixing apparatus 40 has reached the end of its life on condition that an amount of lowering ΔTmav is equal to or larger than a threshold value Th2. Specifically, even though variation over time in moving average torque Tmav turns from increase to decrease, control device 101 does not determine that fixing apparatus 40 has reached the end of its life when amount of lowering ΔTmav is smaller than threshold value Th2.

The reason why determination above based on threshold value Th2 is made is because the value of moving average torque Tmav may turn to decrease due to noise or the like.

Figure 14:
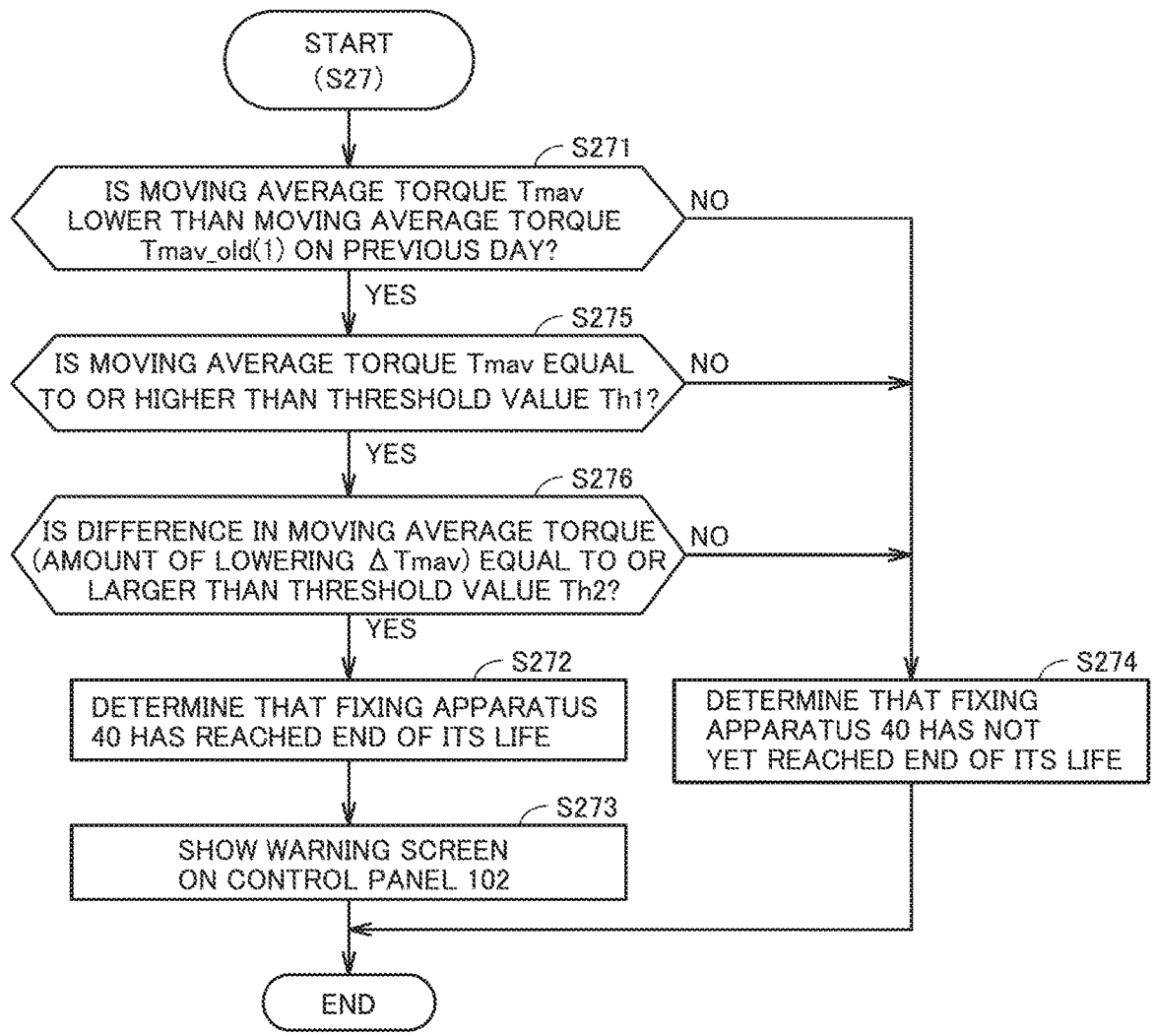
FIG. 14 is a flowchart for illustrating details of processing in step S27 in FIG. 9.

FIG. 14 is a flowchart for illustrating details of processing in step S27 in FIG. 9.

The flowchart in FIG. 14 is different from the flowchart shown in FIG. 12 in including step S276. Specifically, when control device 101 determines in step S275 that the moving average torque is equal to or higher than threshold value Th1 (YES in step S275), the control device determines in step S276 whether or not a difference between moving average torque Tmav and moving average torque Tmav_old(1) (that is, amount of lowering ΔTmav in moving average torque Tmav) is equal to or larger than threshold value Th2. The difference is expressed as an absolute value. Threshold value Th2 is assumed as a positive value.

When control device 101 determines that amount of lowering ΔTmav is equal to or larger than threshold value Th2 (YES in step S276), the process proceeds to step S272. When control device 101 determines that amount of lowering ΔTmav is smaller than threshold value Th2 (NO in step S276), the process proceeds to step S274.

Determination processing in step S275 does not have to be performed. Specifically, when control device 101 determines in step S271 that the moving average torque is lower than the moving average torque on the previous day (YES in step S271), the process may directly proceed to step S276.

(f3. Third Modification)

Figure 15:
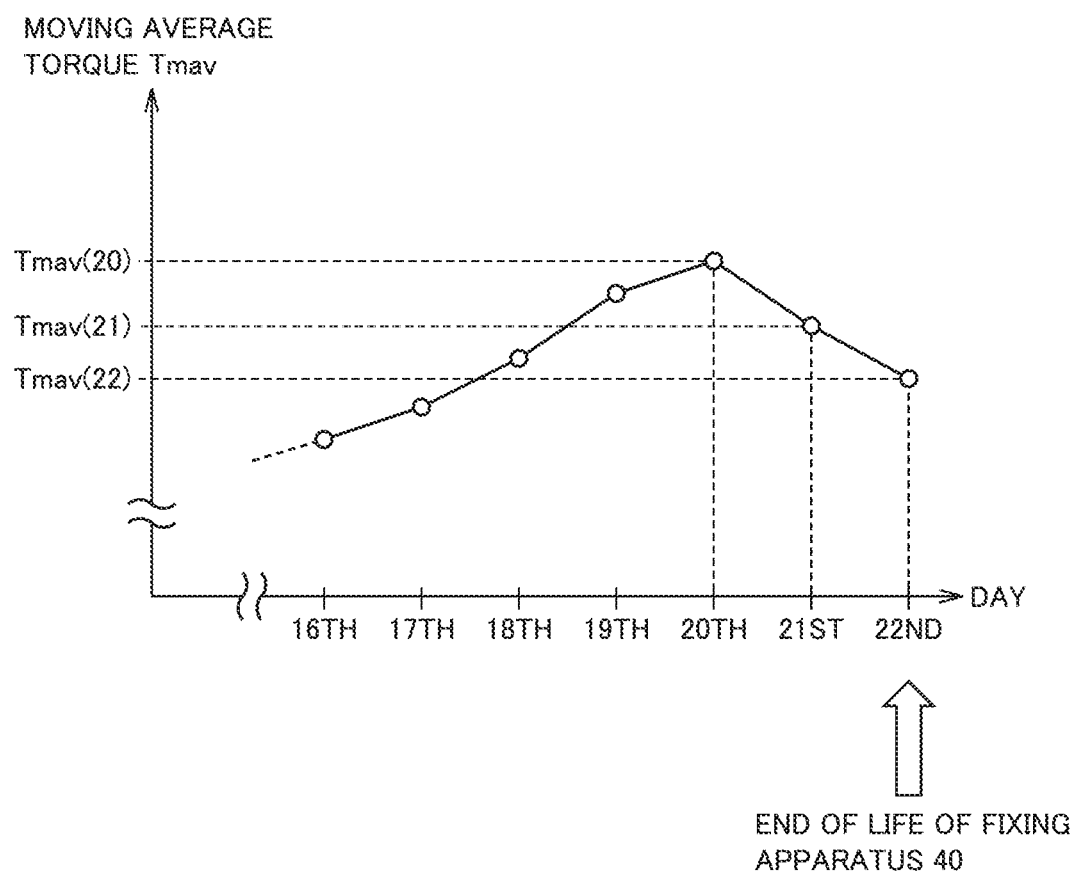
FIG. 15 is a diagram showing variation over time in moving average torque.

FIG. 15 is a diagram showing variation over time in moving average torque.

When variation over time in moving average torque Tmav turns from increase to decrease (that is, calculated moving average torque is lower than moving average torque calculated the previous time), control device 101 determines that fixing apparatus 40 has reached the end of its life on condition that moving average torque calculated the previous time is lower than moving average torque calculated the previous time but one. In other words, control device 101 determines that fixing apparatus 40 has reached the end of its life on condition that moving average torque Tmav has lowered consecutively two times. According to such determination processing, accuracy in determination of the end of life of fixing apparatus 40 can be improved.

Figure 16:
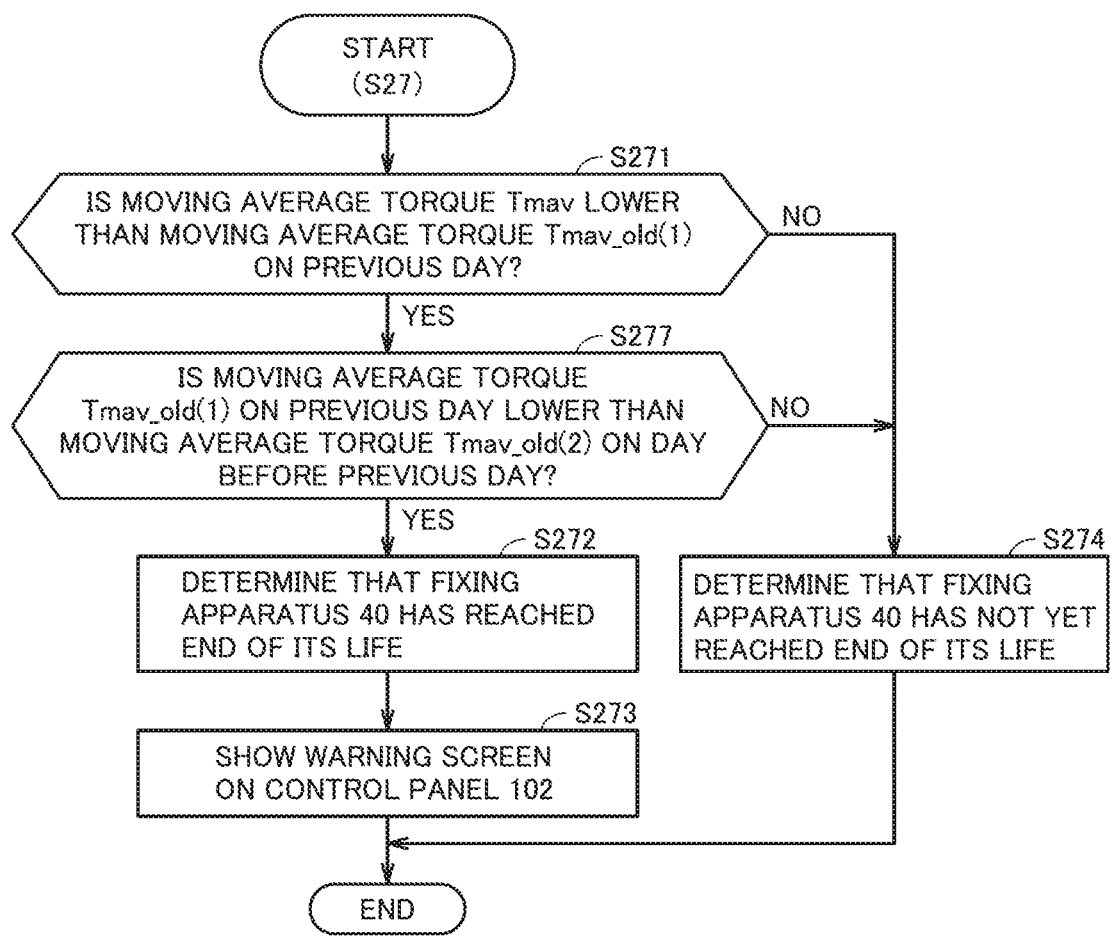
FIG. 16 is a flowchart for illustrating details of processing in step S27 in FIG. 9.

FIG. 16 is a flowchart for illustrating details of processing in step S27 in FIG. 9 in the present modification.

The flowchart in FIG. 16 is different from the flowchart shown in FIG. 10 in including step S277. Specifically, when control device 101 determines in step S271 that the moving average torque is lower than the moving average torque on the previous day (YES in step S271), the control device determines in step S277 whether or not moving average torque Tmav_old(1) on the previous day is lower than moving average torque Tmav_old(2) on the day before the previous day.

When control device 101 determines that moving average torque Tmav_old(1) is lower than moving average torque Tmav_old(2) (YES in step S277), the process proceeds to step S272. When control device 101 determines that moving average torque Tmav_old(1) is not lower than moving average torque Tmav_old(2) (NO in step S277), the process proceeds to step S274.

(f4. Fourth Modification)

In the example above, from a point of view of improvement in accuracy in determination of the end of life, attention is paid to variation over time in moving average torque Tmav. Specifically, control device 101 determines that fixing apparatus 40 has reached the end of its life based on variation over time in moving average torque Tmav turning from increase to decrease.

Torque used for determination, however, is not limited to moving average torque Tmav. Average torque Tav may be employed instead of moving average torque Tmav. Alternatively, torque Tq may be employed instead of moving average torque Tmav.

(1) Determination of End of Life Based on Average Torque Tav

Average torque calculator 152 of control device 101 calculates an average value (average torque Tav) of torque obtained five times in accordance with the expression (1) described above.

In the present modification, life determination unit 154 of control device 101 determines whether or not fixing apparatus 40 has reached the end of its life based on torque Tg (average torque Tav in the present example). Specifically, life determination unit 154 determines that fixing apparatus 40 has reached the end of its life based on variation over time in average torque Tav turning from increase to decrease.

More specifically, each time a prescribed period (for example, one day) elapses, control device 101 obtains torque from driving apparatus 410 a plurality of times and calculates an average value (average torque Tav) of torque obtained the plurality of times. When calculated average torque Tav is lower than average torque Tav calculated previously, control device 101 determines that fixing apparatus 40 has reached the end of its life.

Even though the end of life of fixing apparatus 40 is determined based on variation over time in average torque Tav as above, processing as in the first modification, the second modification, and the third modification as described above is applicable.

Application of the first modification to the present example is as below. When variation over time in average torque Tav turns from increase to decrease, control device 101 determines that fixing apparatus 40 has reached the end of its life on condition that average torque Tav is equal to or higher than a predetermined threshold value Th1'.

Application of the second modification to the present example is as below. When variation over time in average torque Tav turns from increase to decrease, control device 101 determines that fixing apparatus 40 has reached the end of its life on condition that an amount of lowering ΔTav is equal to or larger than a threshold value Th2'. Amount of lowering ΔTav in this case refers to a difference between average torque Tav and average torque Tav_old(1) on the previous day.

Application of the third modification to the present example is as below. When variation over time in average torque Tav turns from increase to decrease (that is, calculated average torque Tav is lower than average torque Tav calculated the previous time), control device 101 determines that fixing apparatus 40 has reached the end of its life on condition that average torque Tav calculated the previous time is lower than average torque Tav calculated the previous time but one.

Since calculation of moving average torque Tmav is not necessary in the present example, control device 101 does not have to include moving average torque calculator 153 shown in FIG. 5.

(2) Determination of End of Life Based on Torque Tq

In the present modification, life determination unit 154 of control device 101 determines whether or not fixing apparatus 40 has reached the end of its life based on torque Tg (torque Tq in the present example). Specifically, life determination unit 154 determines that fixing apparatus 40 has reached the end of its life based on variation over time in torque Tq turning from increase to decrease.

More specifically, control device 101 obtains torque once from driving apparatus 410 each time a prescribed period (for example, one day) elapses. When torque Tq is lower than previous torque Tq (torque Tq on the previous day), control device 101 determines that fixing apparatus 40 has reached the end of its life.

Even though the end of life of fixing apparatus 40 is determined based on variation over time in torque Tq as above, processing as in the first modification, the second modification, and the third modification as described above is applicable.

Application of the first modification to the present example is as below. When variation over time in torque Tq turns from increase to decrease, control device 101 determines that fixing apparatus 40 has reached the end of its life on condition that torque Tq is equal to or higher than a predetermined threshold value Th1".

Application of the second modification to the present example is as below. When variation over time in torque Tq turns from increase to decrease, control device 101 determines that fixing apparatus 40 has reached the end of its life on condition that an amount of lowering ΔTq is equal to or larger than a threshold value Th2". Amount of lowering ΔTq in this case refers to a difference between torque Tq and torque Tq_old(1) on the previous day.

Application of the third modification to the present example is as below. When variation over time in torque Tq turns from increase to decrease (that is, detected torque Tq is lower than torque Tq obtained the previous time), control device 101 determines that fixing apparatus 40 has reached the end of its life on condition that torque Tq obtained the previous time is lower than torque Tq calculated the previous time but one.

Since calculation of average torque Tav and moving average torque Tmav is not necessary in the present example, control device 101 does not have to include average torque calculator 152 and moving average torque calculator 153 shown in FIG. 5.

Embodiment 2

A difference of an image forming apparatus according to the present embodiment from Embodiment 1 will be described below. The image forming apparatus according to the present embodiment is similar in hardware configuration to image forming apparatus 100 in Embodiment 1. Data processing performed by control device 101 is different from data processing in Embodiment 1. Therefore, description will be given below with attention being paid to data processing performed by control device 101.

In Embodiment 1, each time a prescribed period (for example, one day) elapses, control device 101 obtains torque Tq a plurality of times from driving apparatus 410 and calculates an average value (average torque Tav) of torque Tq obtained the plurality of times.

In the present embodiment, each time a running distance of pressurization roller 408 increases by a prescribed distance, torque Tq is obtained from driving apparatus 410 a plurality of times and an average value (which is referred to as "average torque Tav" also in the present embodiment) of torque Tq obtained the plurality of times is calculated.

The running distance is calculated as below. Initially, control device 101 obtains information on a rotation speed of pressurization roller 408 from driving apparatus 410. Thereafter, control device 101 calculates the running distance by multiplying the rotation speed by a duration of rotation of pressurization roller 408.

<A. Functional Configuration>

Figure 17:
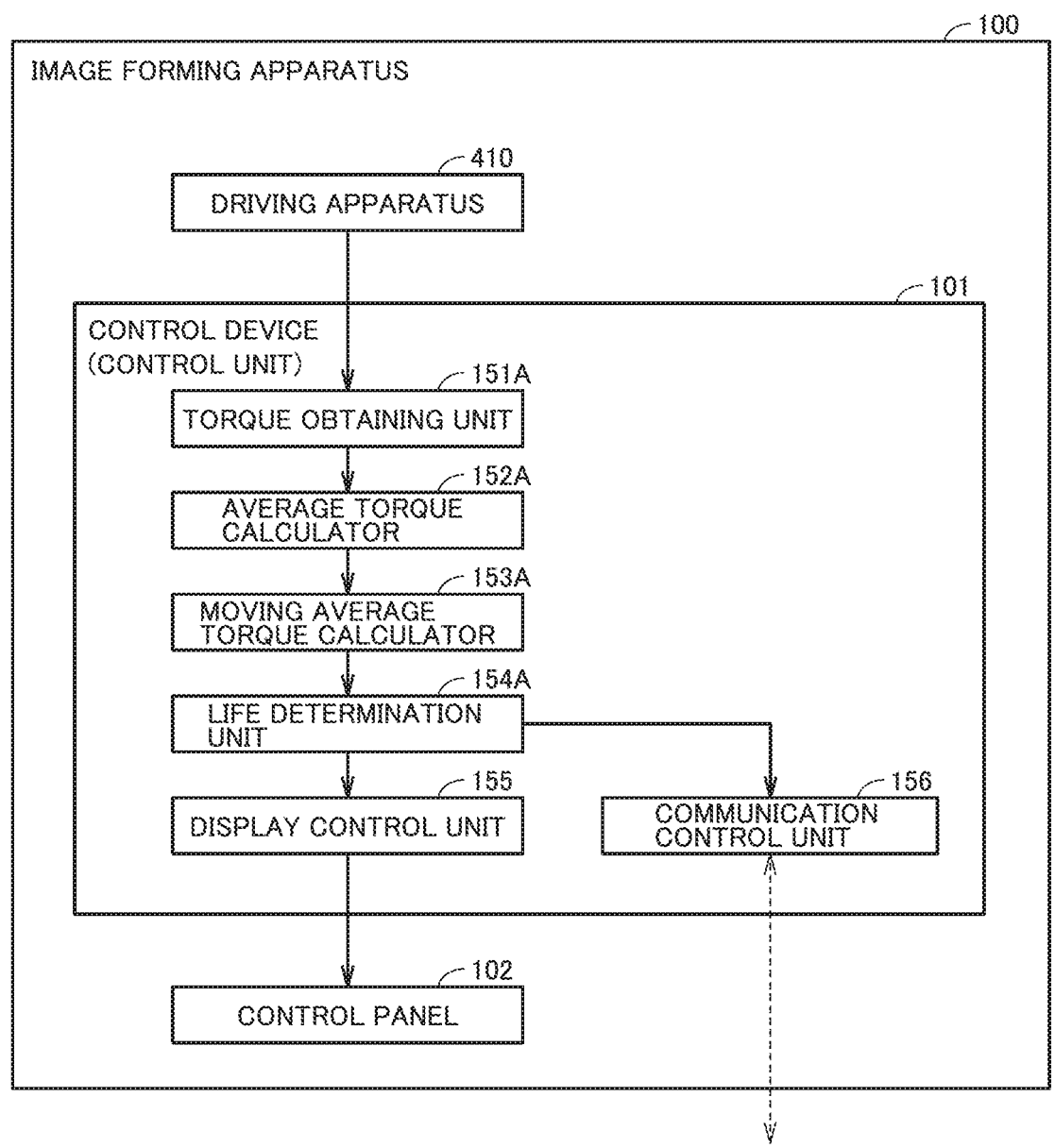
FIG. 17 is a functional block diagram representing a functional configuration of the control device.

FIG. 17 is a functional block diagram representing a functional configuration of control device 101.

Image forming apparatus 100 includes control device 101, driving apparatus 410, and control panel 102.

Control device 101 includes a torque obtaining unit 151A, an average torque calculator 152A, a moving average torque calculator 153A, a life determination unit 154A, display control unit 155, and communication control unit 156.

Torque obtaining unit 151A obtains torque Tq (a value of torque) from driving apparatus 410. Specifically, torque obtaining unit 151A obtains from driving apparatus 410, torque Tq detected by driving apparatus 410 each time a running distance of pressurization roller 408 increases by a prescribed distance. An example in which a prescribed distance is set to "10 km" will be described below.

Torque obtaining unit 151A obtains torque Tq from driving apparatus 410 as being triggered by increase in running distance by 10 km. Typically, after increase in running distance by 10 km is detected, torque obtaining unit 151A obtains from driving apparatus 410, torque five times at the maximum within the same day on which detection was conducted. Specifically, torque obtaining unit 151A obtains torque from driving apparatus 410 during a period over which pressurization roller 408 is in contact with fixing belt 402 as shown in FIG. 3 and no paper is passing.

More specifically, torque obtaining unit 151A obtains from driving apparatus 410, torque Tq detected after warm-up of image forming apparatus 100, similarly to torque obtaining unit 151 in Embodiment 1.

As set forth above, "increase in running distance by 10 km" and "after warm-up of image forming apparatus 100" are defined as the "predetermined condition" in the present example. As described also in Embodiment 1, control device 101 may obtain from driving apparatus 410, torque Tq detected after fixation onto paper S, instead of "after warm-up of image forming apparatus 100."

Torque (a value of torque) obtained five times from driving apparatus 410 by torque obtaining unit 151A is referred to as Tq(m[1]), Tq(m[2]), Tq(m[3]), Tq(m[4]), and Tq(m[5]). m is a variable for identifying every ten-kilometer distance. Each time the running distance increases by 10 km, the value of m is incremented by one.

Torque obtaining unit 151A sends torque obtained five times to average torque calculator 152A.

Average torque calculator 152A calculates an average value of torque every prescribed distance. Specifically, average torque calculator 152A calculates an average value (which is referred to as "average torque Tav'" below) of torque obtained five times as shown in an expression (4) below.

$$Tav'(m)=(Tq(m[1])+Tq(m[2])+Tq(m[3])+Tq(m[4])+Tq(m[5]))\div 5 \quad (4)$$

Average torque calculator 152A sends calculated average torque Tav'(m) to moving average torque calculator 153A.

Moving average torque calculator 153A calculates moving average torque Tmav' (a moving average value) by using average torque Tav' obtained five times. Specifically, moving average torque calculator 153A calculates moving average torque Tmav'(m) by using average torque Tav'(m) on this day and average torque obtained four times most recently (Tav'(m−4), Tav'(m−3), Tav'(m−2), and Tav'(m−1)). Specifically, moving average torque calculator 153A performs calculation shown in an expression (5) below.

$$Tmav'(m)=(Tav'(m-4)+Tav'(m-3)+Tav'(m-2)+Tav'(m-1)+Tav'(m))\div 5 \quad (5)$$

Moving average torque calculator 153A sends calculated moving average torque Tmav'(m) to life determination unit 154A. Though moving average torque Tmav' is calculated by using average torque Tav' obtained five times (five pieces), the number of pieces of average torque Tav' is not limited to five.

Life determination unit 154A determines whether or not fixing apparatus 40 has reached the end of its life. Specifically, life determination unit 154A determines whether or not fixing apparatus 40 has reached the end of its life based on moving average torque Tmav'. More specifically, life determination unit 154A determines that fixing apparatus 40 has reached the end of its life based on variation over time in moving average torque Tmav' turning from increase to decrease.

Figure 18:
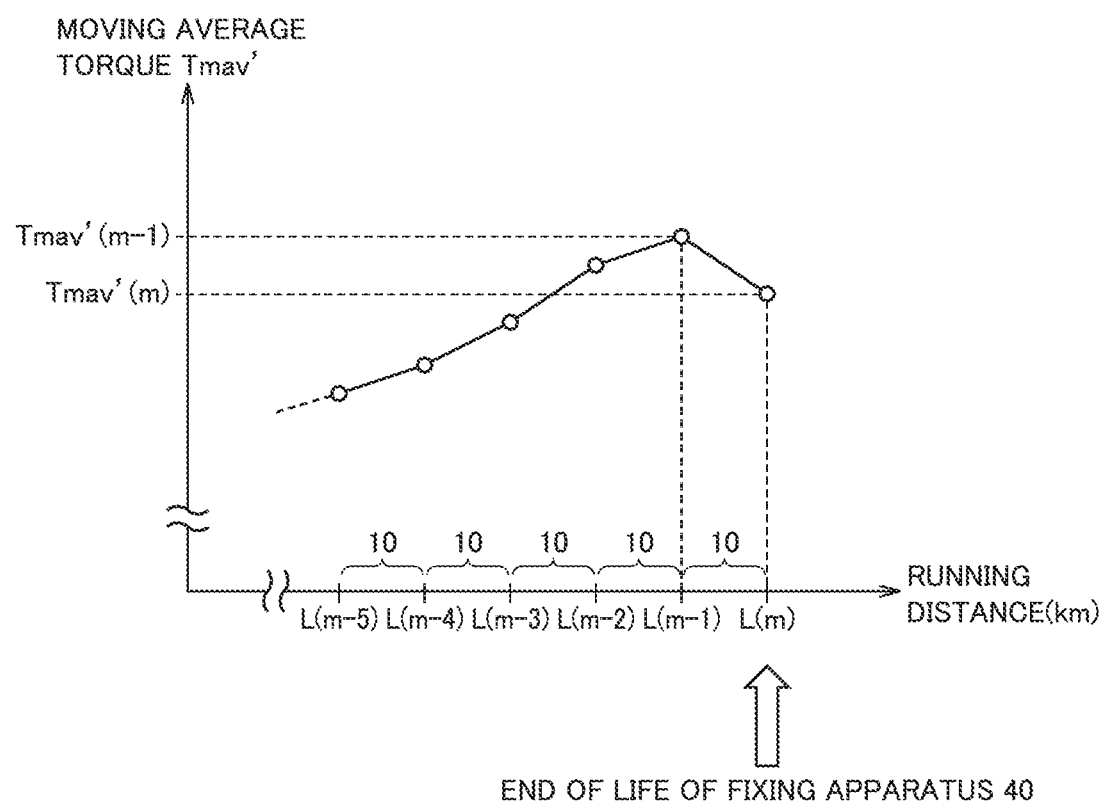
FIG. 18 is a diagram showing variation over time in moving average torque.

FIG. 18 is a diagram showing variation over time in moving average torque Tmav'.

The abscissa in the graph (figure) represents a running distance (km) and the ordinate in the graph represents moving average torque Tmav'.

Moving average torque Tmav' monotonously increases until a distance L(m−1). Moving average torque Tmav'(m) at a distance L(m) is lower than moving average torque Tmav'(m−1) at a previous distance L(m−1). In other words, relation of "Tmav'(m−1)>Tmav'(m)" is satisfied.

Therefore, life determination unit 154A determines that fixing apparatus 40 has reached the end of its life at the time point when distance L(m) is reached (specifically, the time point of calculation of Tmav'(m)). When life determination unit 154A determines that the fixing apparatus has reached the end of its life, it gives a prescribed notification to display control unit 155.

When display control unit 155 accepts a prescribed notification from life determination unit 154A, it controls control panel 102 to show a prescribed warning screen (see FIG. 7).

<B. Summary>

Driving apparatus 410 drives motor 409 so as to maintain the rotation speed of pressurization roller 408 constant based on a command from control device 101. Driving apparatus 410 detects torque at the time when it drives motor 409.

Control device 101 obtains detected torque Tq from driving apparatus 410. Control device 101 determines that fixing apparatus 40 has reached the end of its life based on variation over time in torque Tg (in the present example, moving average torque Tmav') turning from increase to decrease.

Specifically, each time the running distance of pressurization roller 408 increases by a prescribed distance (10 km in the present example), control device 101 obtains torque Tq from driving apparatus 410 a plurality of times and calculates an average value (average torque Tav') of torque Tq obtained the plurality of times. Control device 101 calculates a moving average value (moving average torque Tmav') by using calculated average torque Tav' and at least average torque Tav' calculated previously. When calculated moving average torque Tmav' is lower than moving average torque Tmav' calculated previously, control device 101 determines that fixing apparatus 40 has reached the end of its life.

According to such a configuration, an effect described in Embodiment 1 can be obtained also in the present embodiment.

<C. Control Structure>

Processing shown in FIG. 8 is performed also in the present embodiment as in Embodiment 1.

Figure 19:
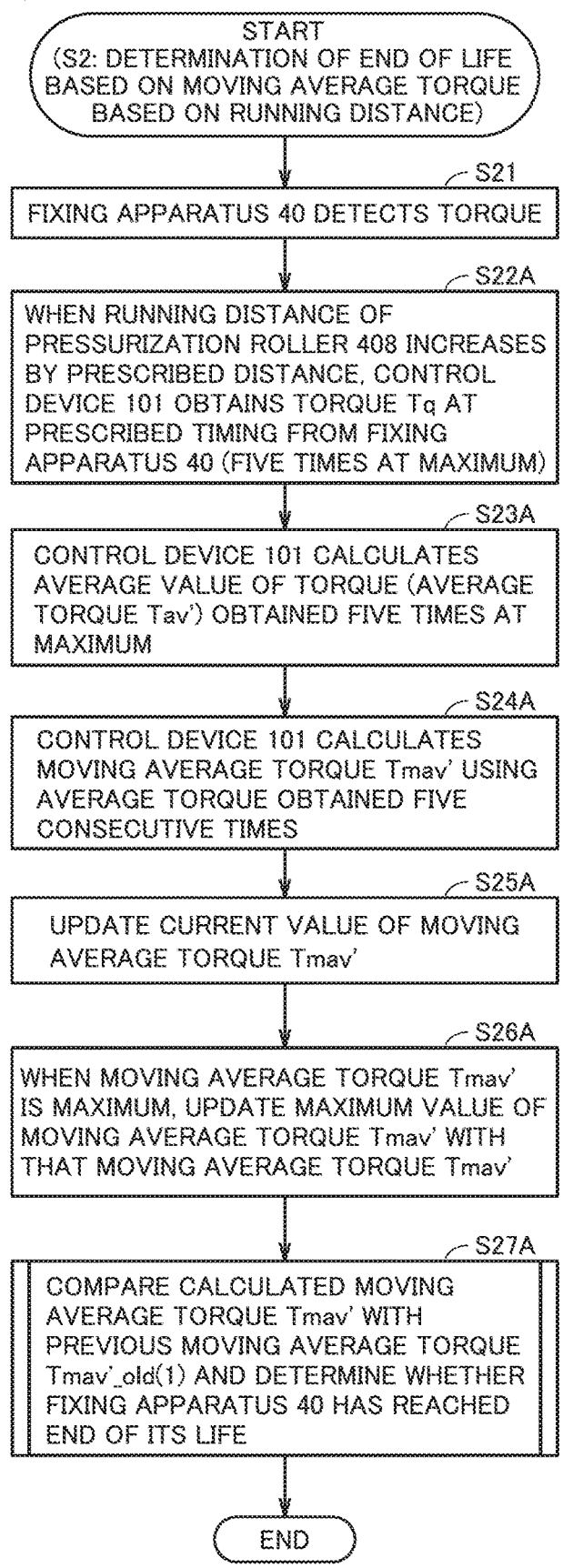
FIG. 19 is a flowchart for illustrating details of processing in step S2 in FIG. 8.

FIG. 19 is a flowchart for illustrating details of processing in step S2 in FIG. 8.

In step S21, fixing apparatus 40 successively detects torque Tq of pressurization roller 408. In step S22A, control device 101 obtains torque Tq at prescribed timing from fixing apparatus 40 each time the running distance of pressurization roller 408 increases by a prescribed distance. As described above, control device 101 obtains from driving apparatus 410, torque Tq detected, for example, after warm-up of image forming apparatus 100.

In step S23A, control device 101 calculates an average value (average torque Tav') of torque Tq obtained five times at the maximum on the same day. Specifically, control device 101 performs calculation in the expression (4) described above. In step S24A, control device 101 calculates moving average torque Tmav' by using five consecutive average values.

In step S25A, control device 101 updates a current value (a value of a variable) of moving average torque Tmav' with the value calculated in step S24A. In step S26A, when moving average torque Tmav' is maximum, control device 101 updates the maximum value (the value of the variable) of moving average torque Tmav' with that moving average torque Tmav'. The maximum value of moving average torque Tmav' is reset (typically, set to zero) after fixing apparatus 40 is replaced. Therefore, the maximum value is a maximum value after replacement of fixing apparatus 40.

In step S27A, control device 101 compares calculated moving average torque Tmav' with previous moving average torque Tmav'_old(1) and determines whether or not fixing apparatus 40 has reached the end of its life.

Referring to the expression (5), previous moving average torque Tmav'_old(1) is calculated in an expression (6) below, with calculated moving average torque Tmav' being denoted as Tmav'(m).

$$Tmav'\_old(1)=Tmav'(m-1)=(Tav'(m-5)+Tav'(m-4)+Tav'(m-3)+Tav'(m-2)+Tav'(m-1))\div 5 \quad (6)$$

Figure 20:
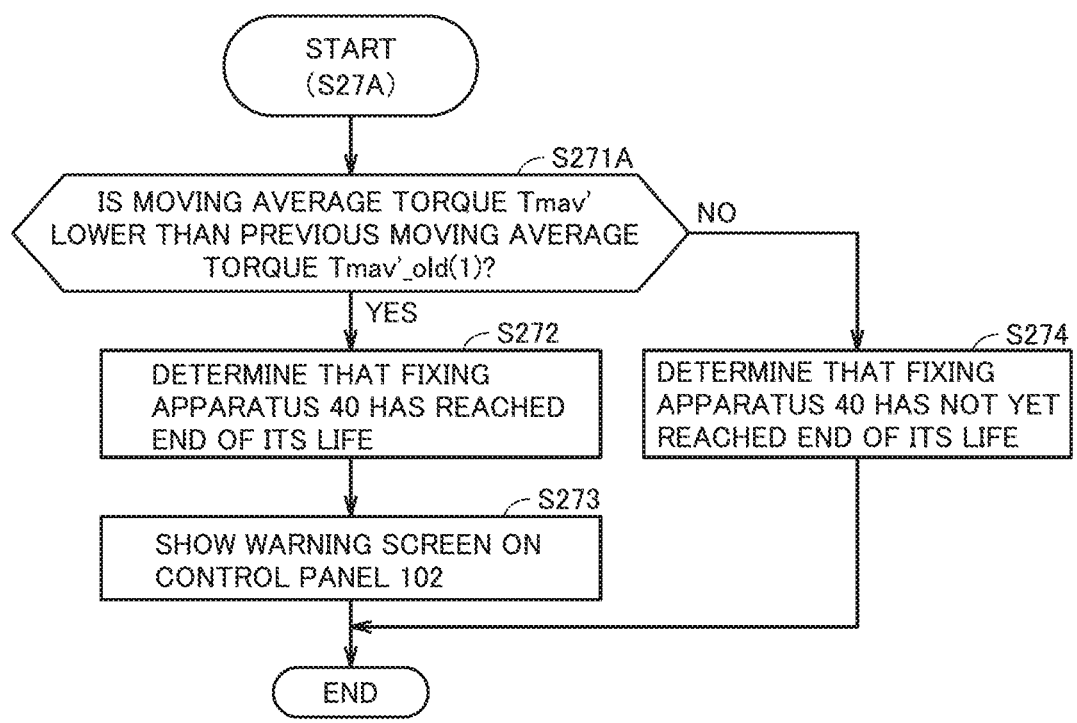
FIG. 20 is a flowchart for illustrating details of processing in step S27A in FIG. 19.

FIG. 20 is a flowchart for illustrating details of processing in step S27A in FIG. 19.

Control device 101 determines in step S271A whether or not moving average torque Tmav' is lower than previous moving average torque Tmav'_old(1). When control device 101 determines that the moving average torque is lower than the previous moving average torque (YES in step S271A), the control device determines in step S272 that fixing apparatus 40 has reached the end of its life. As shown in FIG. 7, control device 101 controls control panel 102 to show the warning screen in step S273.

When control device 101 determines that the moving average torque is not lower than the previous moving average torque (NO in step S271A), control device 101 determines in step S274 that fixing apparatus 40 has not yet reached the end of its life.

<D. Modification>

Each processing (the first modification to the fourth modification) shown in "<F. Modification>" in Embodiment 1 is applicable also in the present embodiment.

For example, application of "(f4. Fourth Modification)" is as below.

Control device 101 may determine that fixing apparatus 40 has reached the end of its life when the calculated average value (average torque Tay') is smaller than the average value calculated previously.

Alternatively, control device 101 may determine that fixing apparatus 40 has reached the end of its life when obtained torque Tq is lower than torque Tq obtained previously.

Embodiment 3

The present embodiment is different from Embodiment 1 and Embodiment 2 in determination of the end of life after it is determined that the torque determination permission mode has been set, which will be described below.

Figure 21:
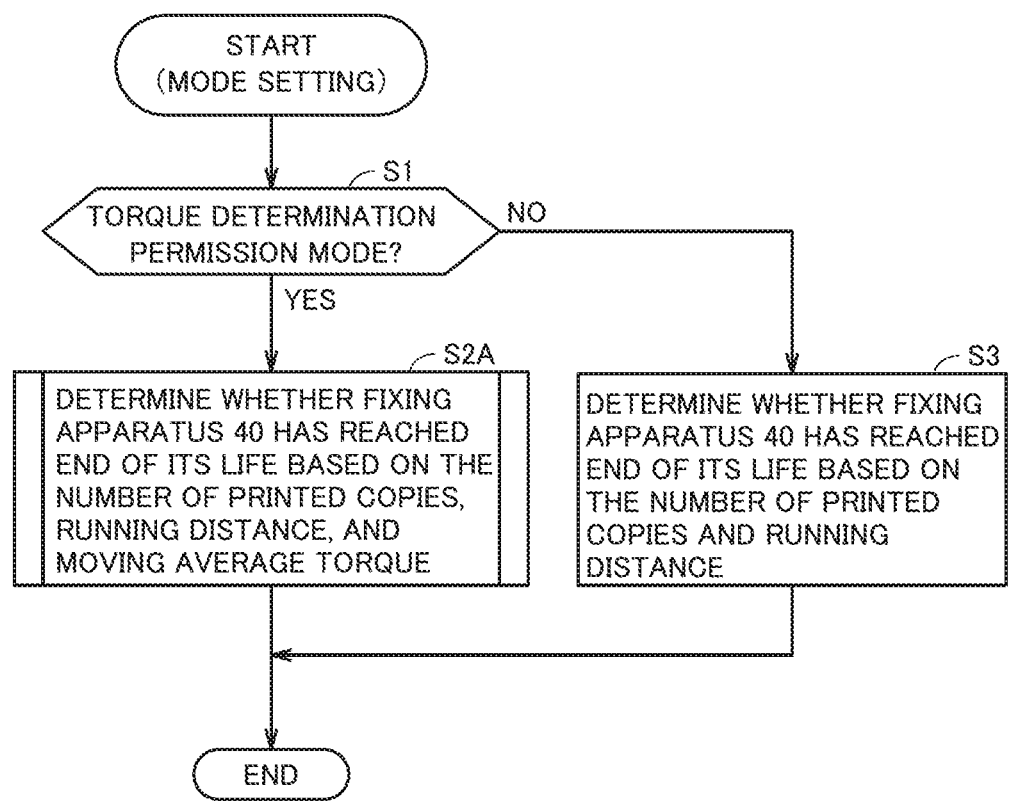
FIG. 21 is a flowchart for illustrating a flow of processing performed in the image forming apparatus.

FIG. 21 is a flowchart for illustrating a flow of processing performed in image forming apparatus 100.

Control device 101 determines in step S1 whether or not the torque determination permission mode has been set as a mode of determining the end of life of fixing apparatus 40.

When control device 101 determines that the torque determination permission mode has been set (YES in step S1), the control device determines in step S2A whether or not fixing apparatus 40 has reached the end of its life based on the number of printed copies in image forming apparatus 100 and the running distance of pressurization roller 408 as well as on moving average torque Tmav'.

When control device 101 determines that the torque determination permission mode has not been set (NO in step S1), the control device determines in step S3 whether or not fixing apparatus 40 has reached the end of its life based on the number of printed copies in image forming apparatus 100 and the running distance of pressurization roller 408.

As shown in step S2A, in the present embodiment, when the torque determination permission mode has been set, the end of life of fixing apparatus 40 is determined in consideration not only of moving average torque Tmav' but also the number of printed copies and the running distance of pressurization roller 408. Therefore, control device 101 can more accurately determine the end of life in the torque determination permission mode.

Embodiment 4

A configuration in which an image forming apparatus and a server apparatus (an information processing apparatus) cooperate to determine the end of life of fixing apparatus 40 will be described in the present embodiment.

Figure 22:
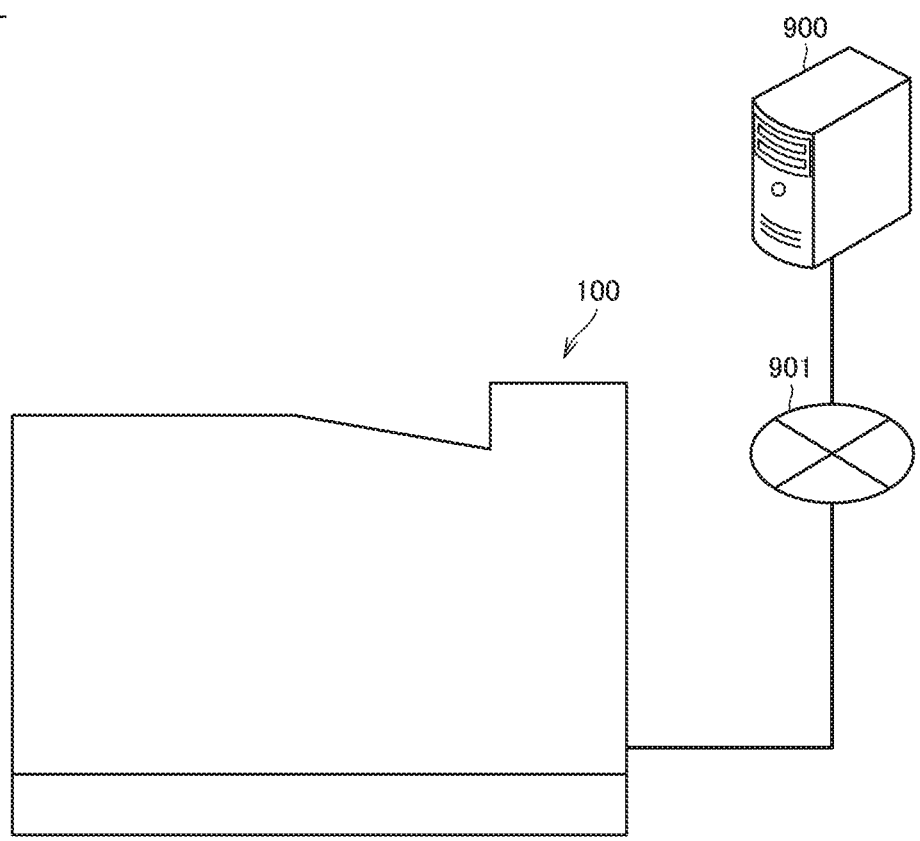
FIG. 22 is a diagram representing a network configuration of an information processing system.

FIG. 22 is a diagram representing a network configuration of an information processing system 1.

Information processing system 1 includes image forming apparatus 100 and a server apparatus 900. Image forming apparatus 100 and server apparatus 900 are communicatively connected to each other over a network 901. Image forming apparatus 100 communicates with server apparatus 900 by means of communication control unit 156 (see FIG. 5).

In information processing system 1, server apparatus 900 obtains torque Tq detected in driving apparatus 410 through network 901. Server apparatus 900 calculates average torque Tav (or Tav') and moving average torque Tmav (or Tmav'). Furthermore, server apparatus 900 determines the end of life of fixing apparatus 40 based on moving average torque Tmav (or Tmav').

According to such a configuration as well, an effect similar to the effect described in Embodiments 1 to 3 is obtained.

Information processing system 1 may be configured such that image forming apparatus 100 calculates moving average torque Tmav (or Tmav') and server apparatus 900 determines the end of life.

Embodiment 5

Though driving apparatus 410 detects torque at the time when motor 409 is driven in Embodiments 1 to 4 above, limitation thereto is not intended. For example, control device 101 may detect torque at the time when motor 409 is driven. Alternatively, a not-shown device within image forming apparatus 100 may detect torque at the time when motor 409 is driven.

Image forming apparatus 100 should only perform at least a function to detect torque at the time when motor 409 is driven. Specifically, torque detector 413 shown in FIG. 4 should only be provided somewhere in image forming apparatus 100. Specifically, torque detector 413 may be located within or outside fixing apparatus 40. Such a function to detect torque can be implemented, for example, by at least one processor.

(1) In particular in Embodiments 1 to 3, control device 101 should only obtain torque at the time when motor 409 is driven each time a predetermined condition is satisfied, and determine that fixing apparatus 40 has reached the end of its life based on variation over time in obtained torque turning from increase to decrease. In summary, image forming apparatus 100 can also be defined as being configured below.

Image forming apparatus 100 includes at least fixing apparatus 40 that fixes unfixed image G on paper S (a recording material) onto paper S and forms an image on paper S.

Image forming apparatus 100 includes pressurization roller (pressurization member) 408 that is rotated by motor 409 in the direction of downstream transportation in fixing apparatus 40, of paper S through a transportation path, fixing belt 402 that forms, as being opposed to pressurization roller 408, a nip region where unfixed image G is fixed, and is rotated as following rotation of pressurization roller 408, fixing member (support member) 490 that is arranged on the inner side of fixing belt 402 and slidably supports fixing belt 402 at a position opposed to pressurization roller 408 against a pressure applied by pressurization roller 408, and control device (control unit) 101 that obtains torque at the time when motor 409 is driven each time a predetermined condition is satisfied and determines that fixing apparatus 40 has reached the end of its life based on variation over time in obtained torque turning from increase to decrease.

According to such a configuration as well, the effect described above can be obtained. According to the configuration, at least accuracy in determination of the end of life of fixing apparatus 40 can be improved.

(2) In particular in Embodiment 4, each time a predetermined condition is satisfied, server apparatus (information processing apparatus) 900 should only obtain from image forming apparatus 100, torque at the time when motor 409 is driven each time a predetermined condition is satisfied and determine that fixing apparatus 40 has reached the end of its life based on variation over time in obtained torque turning from increase to decrease. In summary, image forming apparatus 100 can be defined as being configured below.

Information processing system 1 includes image forming apparatus 100 that includes at least fixing apparatus 40 that fixes unfixed image G on paper S (a recording material) onto paper S and forms an image on paper S and server apparatus (information processing apparatus) 900.

Image forming apparatus 100 includes pressurization roller (pressurization member) 408 that is rotated by motor 409 in the direction of downstream transportation of paper S, in fixing apparatus 40 through a transportation path, fixing belt 402 that forms, as being opposed to pressurization roller 408, a nip region where unfixed image G is fixed, and is rotated as following rotation of pressurization roller 408, and fixing member (support member) 490 that is arranged on the inner side of fixing belt 402 and slidably supports fixing belt 402 at a position opposed to pressurization roller 408 against a pressure applied by pressurization roller 408.

Server apparatus 900 obtains from image forming apparatus 100, torque at the time when motor 409 is driven each time a predetermined condition is satisfied. Server apparatus 900 determines that fixing apparatus 40 has reached the end of its life based on variation over time in obtained torque turning from increase to decrease.

According to such a configuration as well, the effect described above can be obtained. According to the configuration, at least accuracy in determination of the end of life of fixing apparatus 40 can be improved.

<Additional Aspects>

An image forming apparatus includes at least a fixing apparatus that fixes onto a recording material, an unfixed image on the recording material, and forms an image on the recording material. The image forming apparatus includes a pressurization member that is rotated by a motor in a direction of downstream transportation in the fixing apparatus, of the recording material through a transportation path, a fixing belt that forms, as being opposed to the pressurization member, a nip region where the unfixed image is fixed, and is rotated as following rotation of the pressurization member, a support member that is arranged on an inner side of the fixing belt and slidably supports the fixing belt at a position opposed to the pressurization member against a pressure applied by the pressurization member, and a control unit that obtains torque at the time when the motor is driven each time a predetermined condition is satisfied, and determines that the fixing apparatus has reached the end of its life based on variation over time in obtained torque turning from increase to decrease.

Preferably, the predetermined condition is increase in running distance of the pressurization member by a prescribed distance. The control unit obtains torque each time the running distance of the pressurization member increases by the prescribed distance. The control unit determines that the fixing apparatus has reached the end of its life when the obtained torque is lower than torque obtained previously.

Preferably, the predetermined condition is increase in running distance of the pressurization member by a prescribed distance. The control unit obtains torque a plurality of times each time the running distance of the pressurization member increases by the prescribed distance and calculates an average value of torque obtained the plurality of times. The control unit determines that the fixing apparatus has reached the end of its life when the calculated average value is smaller than the average value calculated previously.

Preferably, the predetermined condition is increase in running distance of the pressurization member by a prescribed distance. The control unit obtains torque a plurality of times each time the running distance of the pressurization member increases by the prescribed distance and calculates an average value of torque obtained the plurality of times. The control unit calculates a moving average value by using the calculated average value and at least the average value calculated previously. The control unit determines that the fixing apparatus has reached the end of its life when the calculated moving average value is smaller than the moving average value calculated previously.

Preferably, the predetermined condition is lapse of a prescribed period. The control unit obtains torque each time the prescribed period elapses. The control unit determines that the fixing apparatus has reached the end of its life when the obtained torque is lower than torque obtained previously.

Preferably, the predetermined condition is lapse of a prescribed period. The control unit obtains torque a plurality of times each time the prescribed period elapses and calculates an average value of torque obtained the plurality of times. The control unit determines that the fixing apparatus has reached the end of its life when the calculated average value is smaller than the average value calculated previously.

Preferably, the predetermined condition is lapse of a prescribed period. The control unit obtains torque a plurality of times each time the prescribed period elapses and calculates an average value of torque obtained the plurality of times. The control unit calculates a moving average value by using the calculated average value and at least the average value calculated previously. The control unit determines that the fixing apparatus has reached the end of its life when the calculated moving average value is smaller than the moving average value calculated previously.

Preferably, the control unit obtains information on a rotation speed of the pressurization member. The control unit calculates the running distance by multiplying the rotation speed by a duration of rotation of the pressurization member.

Preferably, each time the running distance of the pressurization member increases by a prescribed distance, the control unit obtains as the torque, idle torque during a period over which no paper is passing.

Preferably, each time the prescribed period elapses, the control unit obtains as the torque, idle torque during a period over which no paper is passing.

Preferably, the control unit obtains as the idle torque during the period over which no paper is passing, torque detected after warm-up of the image forming apparatus or after fixation onto the recording material.

Preferably, the control unit determines that the fixing apparatus has reached the end of its life on condition that the obtained torque is equal to or higher than a predetermined threshold value.

Preferably, the control unit determines that the fixing apparatus has reached the end of its life on condition that the calculated average value is equal to or larger than a predetermined threshold value.

Preferably, the control unit determines that the fixing apparatus has reached the end of its life on condition that the calculated moving average value is equal to or larger than a predetermined threshold value.

Preferably, when the obtained torque is lower than the torque obtained the previous time, the control unit determines that the fixing apparatus has reached the end of its life on condition that the torque obtained the previous time is lower than the torque obtained the previous time but one.

Preferably, when the calculated average value is smaller than the average value calculated the previous time, the control unit determines that the fixing apparatus has reached the end of its life on condition that the average value calculated the previous time is smaller than the average value calculated the previous time but one.

Preferably, when the calculated moving average value is smaller than the moving average value calculated the previous time, the control unit determines that the fixing apparatus has reached the end of its life on condition that the moving average value calculated the previous time is smaller than the moving average value calculated the previous time but one.

Preferably, when the control unit determines that the fixing apparatus has reached the end of its life, the control unit permits formation of an image using paper of a first type and does not permit formation of an image using paper of a second type smaller in basis weight than the paper of the first type.

Preferably, the image forming apparatus further includes a control panel. When the control unit determines that the fixing apparatus has reached the end of its life, the control unit controls the control panel to show a prescribed image.

An information processing system includes an image forming apparatus that includes at least a fixing apparatus that fixes onto a recording material, an unfixed image on the recording material and forms an image on the recording material and an information processing apparatus. The image forming apparatus includes a pressurization member that is rotated by a motor in a direction of downstream transportation in the fixing apparatus, of the recording material through a transportation path, a fixing belt that forms, as being opposed to the pressurization member, a nip region where the unfixed image is fixed, and is rotated as following rotation of the pressurization member, and a support member that is arranged on an inner side of the fixing belt and slidably supports the fixing belt at a position opposed to the pressurization member against a pressure applied by the pressurization member. The image forming apparatus detects torque at the time when the motor is driven. The information processing apparatus obtains from the image forming apparatus, torque at the time when the motor is driven each time a predetermined condition is satisfied. The information processing apparatus determines that the fixing apparatus has reached the end of its life based on variation over time in obtained torque turning from increase to decrease.

An information processing method is performed in an image forming apparatus that includes at least a fixing apparatus that fixes onto a recording material, an unfixed image on the recording material and forms an image on the recording material. The image forming apparatus includes a control unit, a pressurization member that is rotated by a motor in a direction of downstream transportation in the fixing apparatus, of the recording material through a transportation path, a fixing belt that forms, as being opposed to the pressurization member, a nip region where the unfixed image is fixed, and is rotated as following rotation of the pressurization member, and a support member that is arranged on an inner side of the fixing belt and slidably supports the fixing belt at a position opposed to the pressurization member against a pressure applied by the pressurization member. The information processing method includes obtaining, by the control unit, torque at the time when the motor is driven each time a predetermined condition is satisfied and determining, by the control unit, that the fixing apparatus has reached the end of its life based on variation over time in obtained torque turning from increase to decrease.

<<Disclosure II>>
<Premises>

As described in Disclosure I, when paper is in an undesirable deflected state which is also referred to as "reverse loop," an output image (a fixed image) is deteriorated.

From the point of view above, torque (torque of the pressurization roller) at which slip of paper is expected to occur may be determined in advance and set as a reference value (threshold value) in determination of life. Torque at the time of slip of paper, however, is varied also by a state of pressurization (load) by the pressurization roller. Therefore, it is difficult to uniquely determine the reference value. Therefore, according to the conventional technique, the fixing apparatus has consequently been determined as reaching the end of its life in a stage quite earlier than the actual end of its life.

The present disclosure also provides an image forming apparatus, an information processing system, and an information processing method capable of achieving higher accuracy in determination of the end of life of a fixing apparatus as in Disclosure I.

Embodiment 6

<A. Hardware Configuration>

Figure 23:
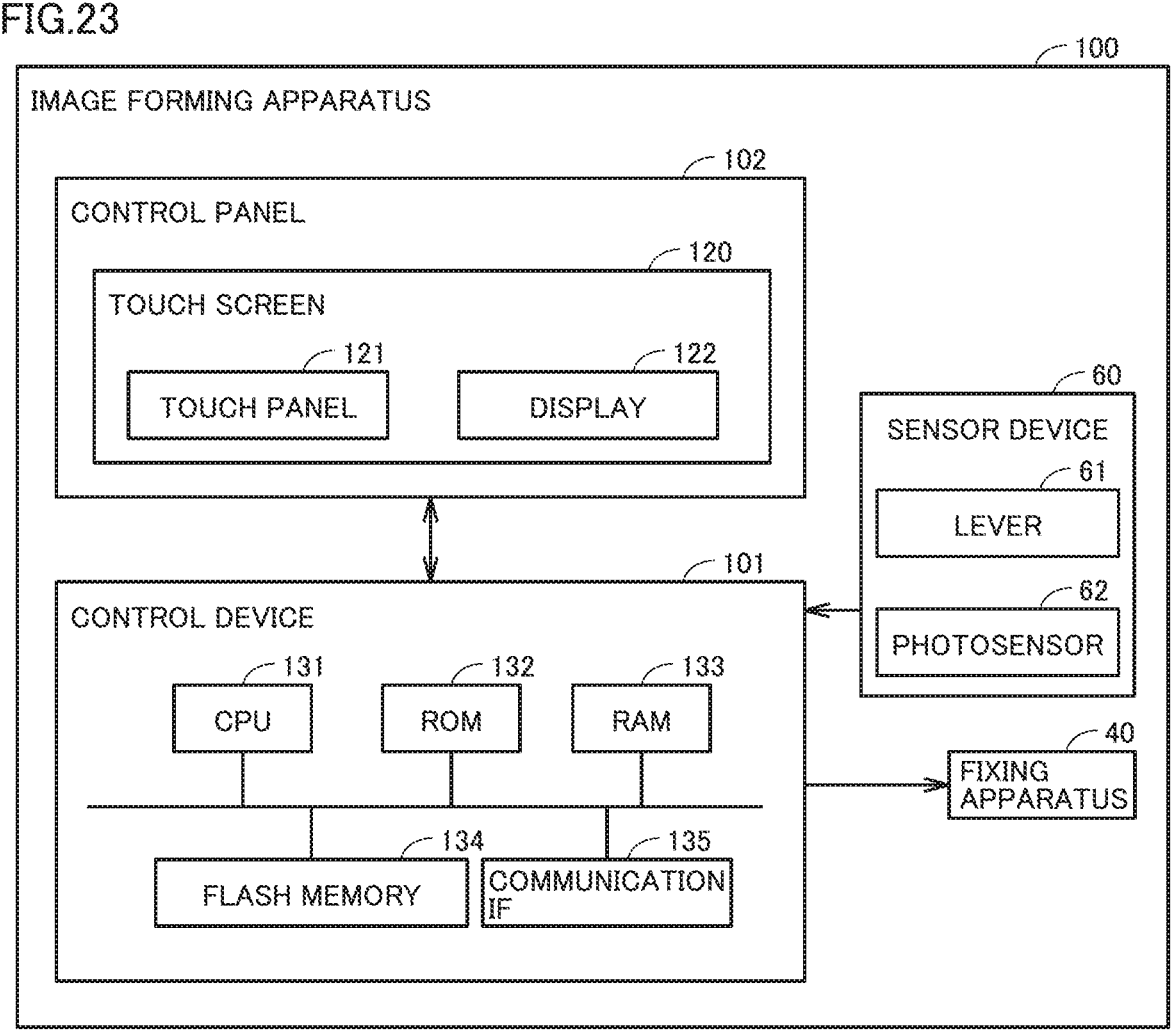
FIG. 23 is a block diagram for illustrating a hardware configuration of the image forming apparatus.

FIG. 23 is a block diagram for illustrating a hardware configuration of image forming apparatus 100. Image forming apparatus 100 includes at least control device (control unit) 101, control panel 102, fixing apparatus 40, and a sensor device (detector) 60.

Sensor device 60 includes a lever 61 and a photosensor 62. Sensor device 60 is provided between secondary transfer roller 33 as a transfer apparatus (transfer unit) that transfers an image to paper S and fixing apparatus 40 (specifically, pressurization roller 408 of fixing apparatus 40) and detects a state of paper S. Specifically, sensor device 60 detects whether or not paper S is deflected in a predetermined direction (a first direction). A state in which paper S is deflected in a predetermined direction is also referred to as a "loop state" or a "forward loop state" below. Though details will be described later, the loop state refers to bending of paper S that occurs in a normal condition.

When paper S is in the loop state, sensor device 60 transmits a predetermined signal (an on signal) to control device 101. When paper S is deflected in a direction (a second direction) reverse to the predetermined direction, sensor device 60 does not transmit the predetermined signal (on signal) to control device 101. The predetermined signal is also referred to as a "detection signal."

As described above, a state in which paper S is deflected in the direction reverse to the predetermined direction is referred to as a "reverse loop state." Though details will be described later, the reverse loop state refers to bending of paper S reverse in direction to the loop state and deflection of paper S in an abnormal condition.

Details of sensor device 60, the loop state, and the reverse loop state will be described later.

Control device 101 determines at least whether or not paper S is in the "loop state" based on presence of a signal output from sensor device 60. More specifically, control device 101 determines also whether or not paper S is in the "reverse loop state" through processing which will be described later.

<B. Control of State of Paper S>

A state of paper S between secondary transfer roller 33 and fixing apparatus 40 and control of a rotation speed of pressurization roller 408 in accordance with the state of paper S will be described below.

(b1. Apparatus Configuration)

Figure 24:
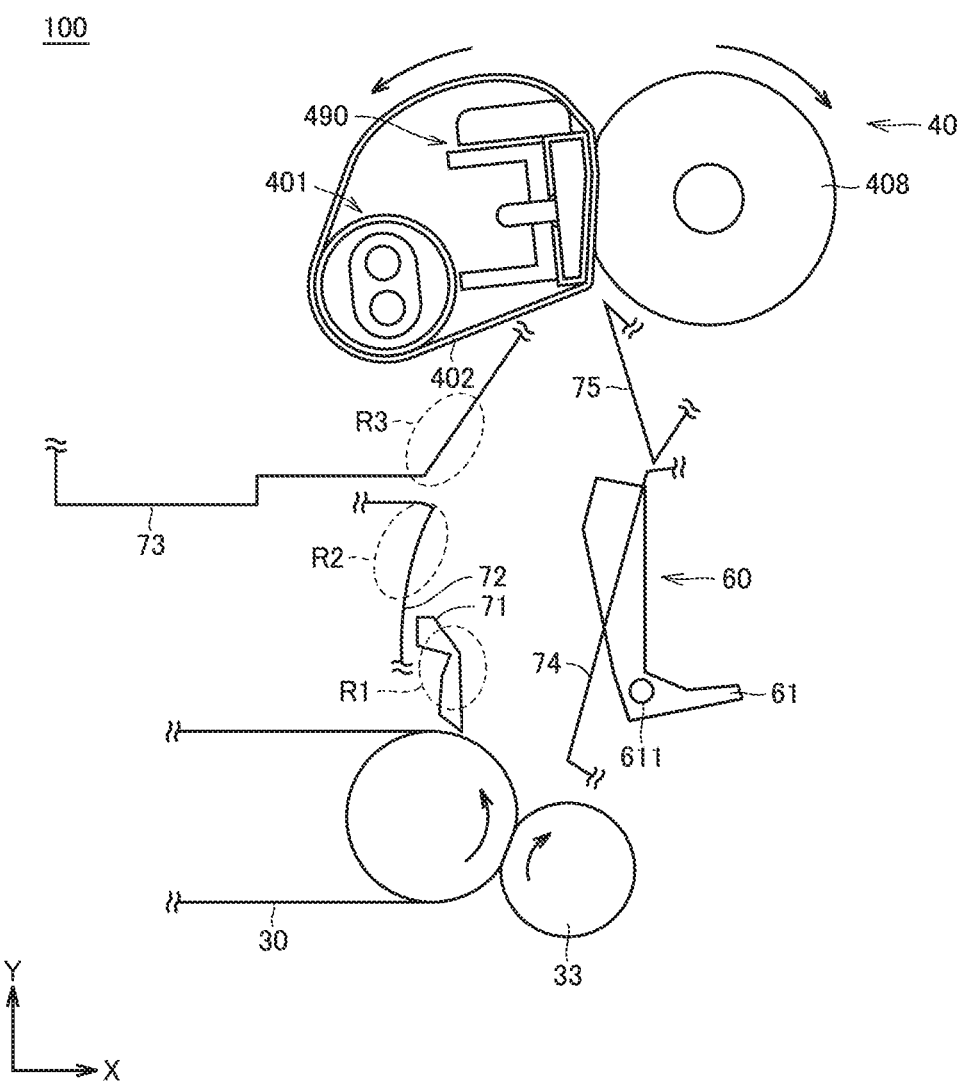
FIG. 24 is an enlarged view of a main portion of the image forming apparatus.

FIG. 24 is an enlarged view of a main portion of image forming apparatus 100.

Image forming apparatus 100 includes fixing apparatus 40, secondary transfer roller 33, intermediate transfer belt 30, sensor device 60, a separation tab 71, and paper passage guides 72, 73, 74, and 75. Sensor device 60 includes lever 61 described above, a rotation shaft 611, and photosensor 62 (see FIG. 23).

Separation tab 71 serves to remove paper S from intermediate transfer belt 30 when paper S does not come off from intermediate transfer belt 30 and to transport paper S toward fixing apparatus 40.

Paper passage guides 72 to 75 serve to guide paper S to fixing apparatus 40. Paper passage guide 72 is provided above separation tab 71 (on a side of fixing apparatus 40). Paper passage guide 73 is provided above paper passage guide 72 and below fixing belt 402 of fixing apparatus 40. Paper passage guide 74 is provided at a position opposed to paper passage guide 72 and above secondary transfer roller 33. Paper passage guide 75 is provided under pressurization roller 408 and above paper passage guide 74. Paper passage guide 75 serves to transport paper S to the nip region in fixing apparatus 40.

Regions R1, R2, and R3 are regions where a print surface of paper S may be in contact therewith when paper S cannot appropriately be transported (for example, paper S is in the reverse loop state). When the print surface of paper S comes in contact with regions R1, R2, and R3, rubbing of an image occurs.

Lever 61 of sensor device 60 is pivoted around rotation shaft 611. Specifically, as a result of contact with paper S, lever 61 is pivoted clockwise by a prescribed angle from an illustrated position (which is also referred to as a "default position" below). The position of lever 61 after pivot by a prescribed angle is also referred to as an "end point position" below for the sake of convenience of description. When there is no contact with paper S, lever 61 returns to the default position. Lever 61 thus takes a different position depending on presence of contact with paper S.

Not-shown photosensor 62 does not output a detection signal to control device 101 when lever 61 is located at the default position. When lever 61 is located at the end point position, photosensor 62 outputs the detection signal to control device 101. When lever 61 is located at the end point position, an on state (a state in which a signal is output) is set, and when lever 61 is located at the default position (the position shown in FIG. 24), an off state (a state in which a signal is not output) is set.

(b2. Loop Control)

Loop control is started immediately before paper S enters fixing apparatus 40. Until loop control is started, pressurization roller 408 continues to rotate at high-speed side speed VH described above. Loop control is also referred to as "forward loop control" below for distinction from reverse loop control which will be described later.

Figure 25:
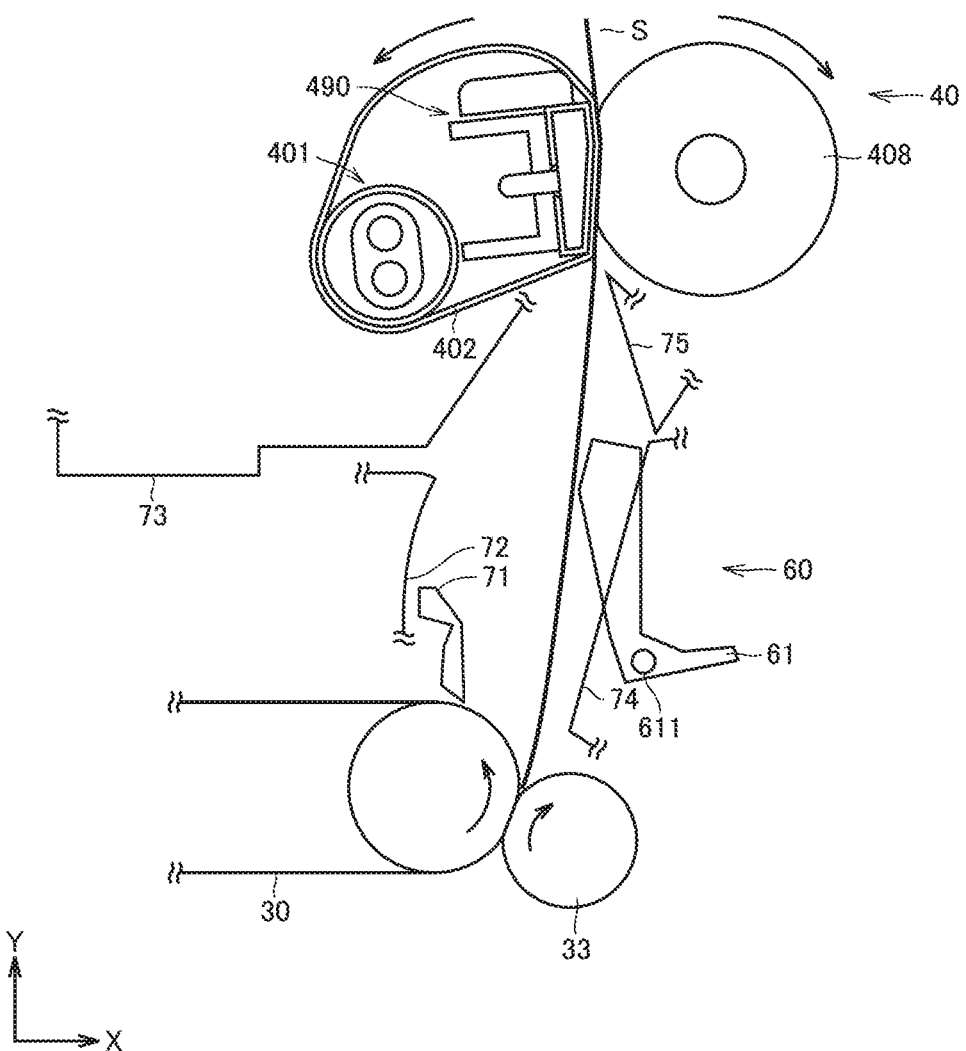
FIG. 25 is a diagram showing a state in which paper is not looping.

FIG. 25 is a diagram showing a state in which paper S is not looping.

Paper S is substantially straight between secondary transfer roller 33 and fixing apparatus 40. In this state, forward loop control has already been started. The straight state refers to a state without deflection between a region of contact between secondary transfer roller 33 and intermediate transfer belt 30 and the nip region in fixing apparatus 40.

In the state (position) of paper S shown in FIG. 25, paper S is not in contact with lever 61 of sensor device 60. Therefore, lever 61 does not pivot clockwise. In other words, lever 61 maintains the default position. Therefore, photosensor 62 (see FIG. 23) outputs no detection signal to control device 101.

In this case, paper S tends to be tensioned. Then, control device 101 switches the rotation speed of pressurization roller 408 from high-speed side speed VH to low-speed side speed VL. The tensioned state of paper S is thus relaxed.

Figure 26:
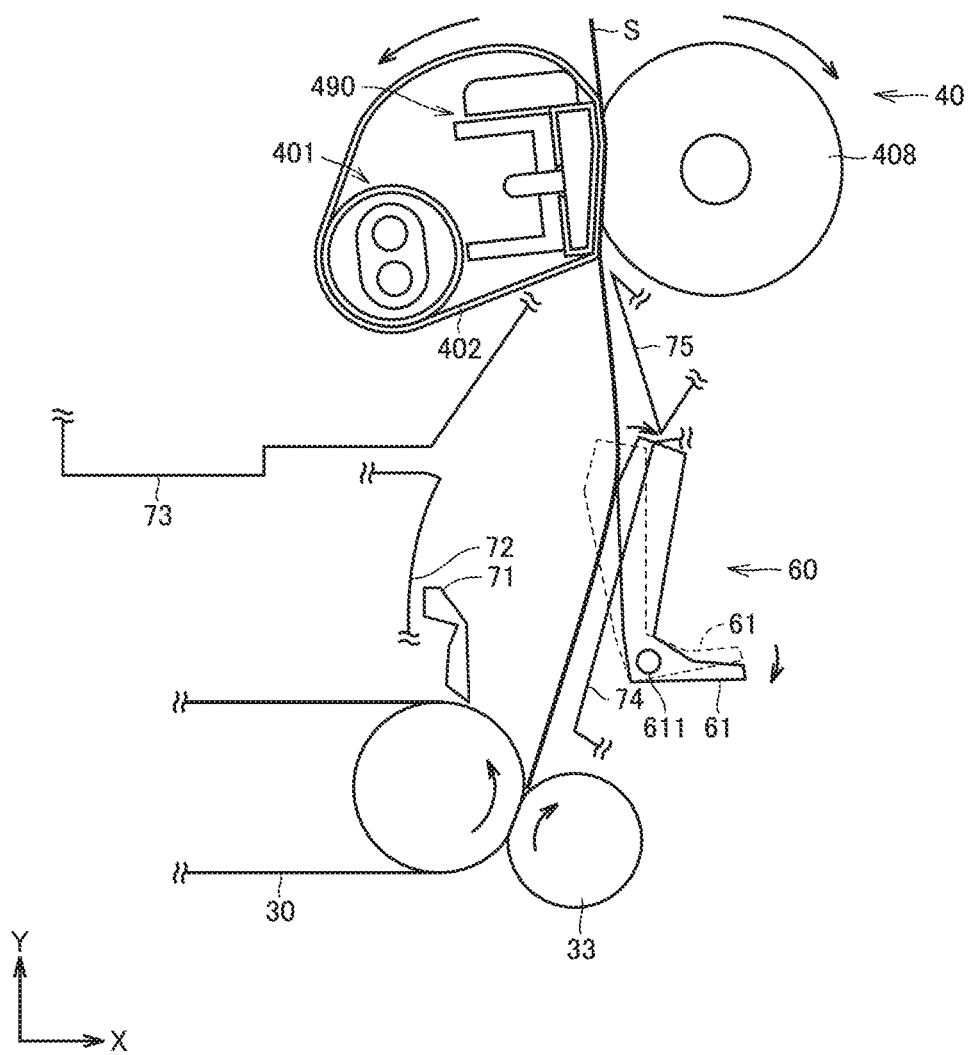
FIG. 26 is a diagram showing a state in which paper is looping.

FIG. 26 is a diagram showing a state in which paper S is looping.

A central portion of paper S is deflected between secondary transfer roller 33 and fixing apparatus 40 in a positive direction along an X axis in the figure. In other words, paper S is curved. Specifically, paper S is slack. More specifically, the central portion of paper S is displaced in a direction toward sensor device 60 as compared with the state in which paper S is straight. The state in which paper S is deflected in the direction as in FIG. 26 is referred to as the "forward loop state" as described above.

When deflection of paper S is large to some extent as shown in FIG. 26, paper S comes in contact with lever 61 of sensor device 60. Consequently, lever 61 is pivoted clockwise. Lever 61 is thus moved from the default position to the end point position. When lever 61 reaches the end point position, photosensor 62 continues to output the detection signal to control device 101. In this case, paper S is slack.

When control device 101 accepts input of a signal from photosensor 62 while the rotation speed of pressurization roller 408 is set to low-speed side speed VL, it switches the rotation speed of pressurization roller 408 from low-speed side speed VL to high-speed side speed VH. Slack of paper S can thus be eliminated.

As set forth above, control device 101 adjusts the rotation speed of pressurization roller 408 in accordance with presence of the detection signal from sensor device 60. Under such speed control, paper S can enter fixing apparatus 40 in an appropriate state.

(b3. Reverse Loop Control)

Under forward loop control described above, the reverse loop state is less likely in paper of basis weight equal to or larger than prescribed basis weight (for example, paper equal to or larger than plain paper in basis weight). In other words, paper having rigidity equal to or higher than a prescribed level is less likely to be in the reverse loop state. Paper small in basis weight such as thin paper, however, is more likely to be in the reverse loop state than paper large in basis weight.

Figure 27:
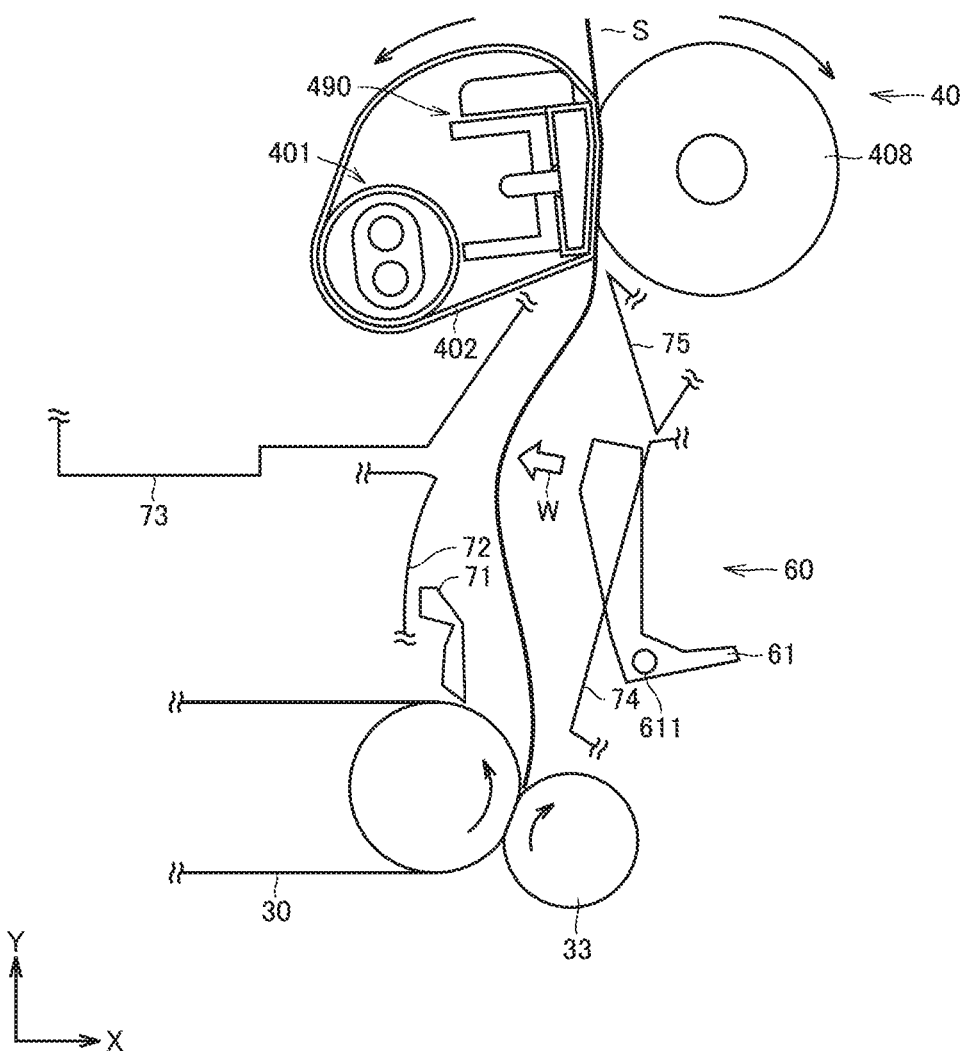
FIG. 27 is a diagram for illustrating a reverse loop state.

FIG. 27 is a diagram for illustrating the reverse loop state.

As paper S moves in a direction shown with an arrow W, the paper enters the reverse loop state. Specifically, the central portion of paper S is deflected in a negative direction along the X axis in the figure between secondary transfer roller 33 and fixing apparatus 40. In other words, paper S is opposite in the direction of curving to the curved state in FIG. 26. Specifically, the central portion of paper S is displaced toward paper passage guides 72 and 73 as compared with the state in which paper S is straight.

Since lever 61 of sensor device 60 maintains the default position in this state, photosensor 62 does not output the detection signal to control device 101. Therefore, the rotation speed of pressurization roller 408 maintains low-speed side speed VL.

Control device 101 determines that paper S tends to be tensioned in spite of slack in paper S. When the rotation speed of pressurization roller 408 is maintained at low-speed side speed VL, deflection will be larger. In other words, slack of paper S will increase.

When a rear end of paper S passes through secondary transfer roller 33 in such a state, the rear end of paper S flutters. Consequently, rubbing of an image or contamination of a rear edge of paper S occurs.

In order to avoid occurrence of such an event, control device 101 carries out reverse loop control which will be described below.

When there is no input of detection signal for a prescribed time period (which is also referred to as a "set time period TC1" below) set for starting control, control device 101 varies the rotation speed of pressurization roller 408 until it receives input of the detection signal. Typically, control device 101 switches the rotation speed of pressurization roller 408 between speed VH and speed VL. For example, control device 101 switches the rotation speed with a predetermined period.

Figure 28:
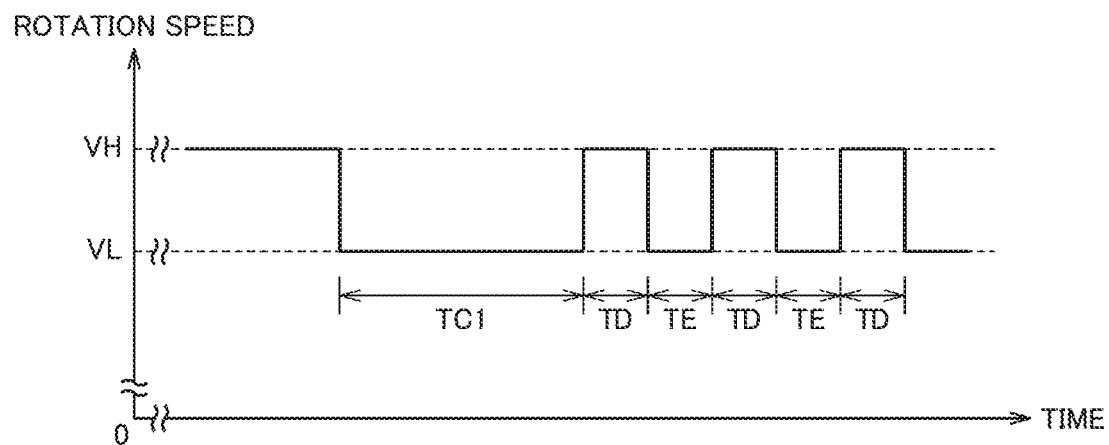
FIG. 28 is a diagram illustrating how to vary a rotation speed of a pressurization roller.

FIG. 28 is a diagram illustrating how to vary a rotation speed of pressurization roller 408.

When set time period TC1 has elapsed since there was no input of a detection signal, control device 101 periodically switches the rotation speed of pressurization roller 408. In other words, when set time period TC1 has elapsed since the rotation speed was set to speed VL, control device 101 periodically switches the rotation speed of pressurization roller 408. Specifically, when set time period TC1 has elapsed, control device 101 sets the rotation speed to speed VH for a time period TD. After control device 101 sets the rotation speed to speed VH for time period TD, it sets the rotation speed to speed VL for a time period TE. Similarly also thereafter, the control device switches the rotation speed between speed VH and speed VL. Time period TD and time period TE are typically equal to each other.

By thus controlling the rotation speed of pressurization roller 408 to vary, a pulling action and a slacking action can alternately be given to paper S. The reverse loop state of paper S can thus return to the forward loop state.

When paper S is set to the forward loop state, lever 61 reaches the end point position and hence control device 101 receives the detection signal. Thereafter, forward loop control described above is carried out.

(b4. Determination of End of Life)

Determination of the end of life of fixing apparatus 40 will be described. In the present example, control device 101 determines whether or not fixing apparatus 40 has reached the end of its life based on a result of reverse loop control.

When a time period for which the rotation speed of pressurization roller 408 is varied (which is referred to as a "speed variation duration Tz" below) is equal to or longer than a prescribed time period set for determination of the end of life (which is also referred to as a "set time period TC2" below), control device 101 determines that fixing apparatus 40 has reached the end of its life. In the present example, the time period for which the rotation speed of pressurization roller 408 is varied is the sum of a time period calculated by multiplying time period TD by an integer and a time period calculated by multiplying time period TE by an integer.

Since the rotation speed of pressurization roller 408 is periodically varied in the example in FIG. 28, speed variation duration Tz is also in proportion to the number of times of switching of the rotation speed of pressurization roller 408. Therefore, when the number of times of switching of the rotation speed of pressurization roller 408 is equal to or larger than the number determined by a period f of variation and set time period TC2, control device 101 may determine that fixing apparatus 40 has reached the end of its life. Period f is expressed as a reciprocal of the sum of time period TD and time period TE (f=1/(TD+TE)).

Typically, when the number of times of switching of the rotation speed is larger than a value calculated by dividing set time period TC2 by period f (that is, TC2/f), control device 101 determines that fixing apparatus 40 has reached the end of its life. In an example where a value obtained by dividing set time period TC2 by period f (TC2/f) is a decimal value, control device 101 may determine that fixing apparatus 40 has reached the end of its life when the number of times of switching of the rotation speed is larger than a value (an integral value) calculated by rounding up the first decimal place of that value.

From a point of view of higher accuracy in determination of the end of life, determination of the end of life as below may be made.

On condition that a ratio of the number of times that speed variation duration Tz is equal to or longer than set time period TC2 is equal to or larger than a prescribed value TR (for example, thirty percent) of the number of times of control for varying the rotation speed of pressurization roller 408, control device 101 may determine that fixing apparatus 40 has reached the end of its life. Speed variation duration Tz may exceed time period TC2 accidentally only once. In this case, it may not be preferred to determine that fixing apparatus 40 has reached the end of its life. By making determination based on the ratio as above, accuracy in determination of the end of life can be improved.

Each time a prescribed period elapses or each time a running distance of pressurization roller 408 increases by a prescribed distance, control device 101 may make determination as to life of fixing apparatus 40. In other words, fixing apparatus 101 does not constantly make determination as to life of fixing apparatus 40 but may make determination as to life each time a predetermined condition is satisfied.

In Embodiments 7 to 9 which will be described later, control device 101 determines the end of life of fixing apparatus 40 each time a predetermined condition is satisfied as such.

(Modification)

In the example above, control device 101 determines that fixing apparatus 40 has reached the end of its life when a time period (speed variation duration Tz) for which the rotation speed of pressurization roller 408 is varied is equal to or longer than the prescribed time period (set time period TC2) set for determination of the end of life. Specifically, speed variation duration Tz is set to a time period required for carrying out reverse loop control once (the sum of a time period calculated by multiplying time period TD by an integer and a time period calculated by multiplying time period TE by an integer (see FIG. 28)). Limitation thereto, however, is not intended.

For example, control device 101 may regard speed variation duration Tz as a cumulative value (which is also referred to as a "cumulative time period" below) of a time period required for each time of reverse loop control and determine that fixing apparatus 40 has reached the end of its life when the cumulative time period is equal to or longer than a set time period Tc. In other words, control device 101 may determine that fixing apparatus 40 has reached the end of its life based on a time period required for reverse loop control for each of a plurality of sheets of paper S (that is, the cumulative time period), rather than a time period required for reverse loop control for one sheet of paper S (which is also referred to as an "elementary time period" below).

Accumulation of time periods required for reverse loop control and calculation of the cumulative time period based on the accumulated time periods are carried out by control device 101.

<C. Functional Configuration>

Figure 29:
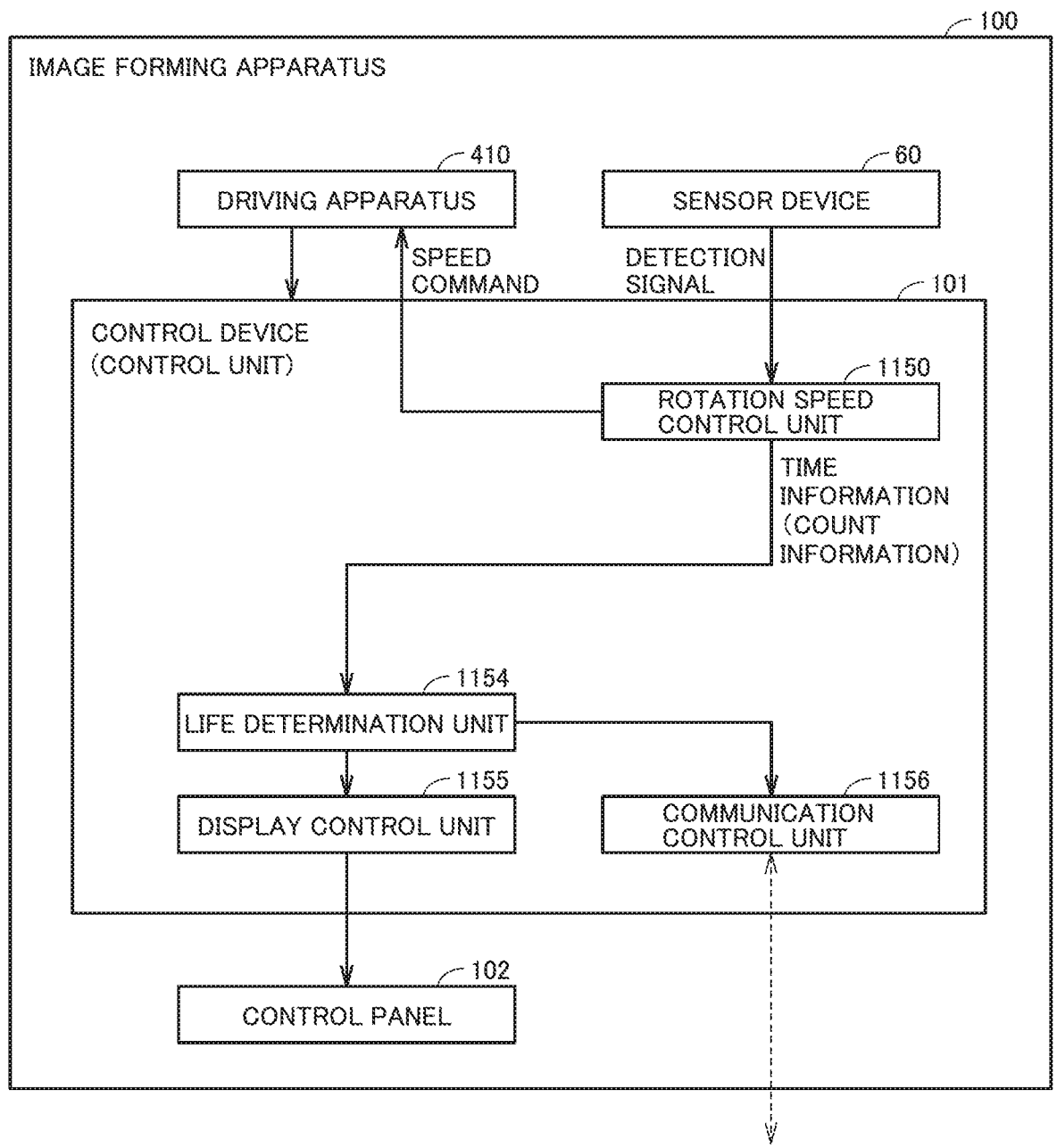
FIG. 29 is a functional block diagram representing a functional configuration of the control device.

FIG. 29 is a functional block diagram representing a functional configuration of control device 101.

Image forming apparatus 100 includes control device 101, driving apparatus 410, control panel 102, and sensor device 60.

Control device 101 includes a rotation speed control unit 1150, a life determination unit 1154, a display control unit 1155, and a communication control unit 1156.

Rotation speed control unit 1150 controls a rotation speed of pressurization roller 408. Specifically, rotation speed control unit 1150 controls the rotation speed of pressurization roller 408 by sending a speed command to motor control device 411 (see FIG. 4 in Disclosure I) of driving apparatus 410.

Specifically, rotation speed control unit 1150 receives a detection signal from sensor device 60. Specifically, rotation speed control unit 1150 receives a detection signal output from photosensor 62, based on movement of lever 61 from the default position to the end point position as a result of contact with paper S. Rotation speed control unit 1150 controls the rotation speed of pressurization roller 408 based on whether or not it has received the detection signal.

For example, during forward loop control, rotation speed control unit 1150 controls the rotation speed of pressurization roller 408 to speed VH or speed VL based on whether or not it receives the detection signal. When the reverse loop state (see FIG. 27) occurs, rotation speed control unit 1150 varies the rotation speed of pressurization roller 408 until it receives input of the detection signal. In the present example, rotation speed control unit 1150 switches the rotation speed of pressurization roller 408 between speed VH and speed VL.

When paper is in the reverse loop state, rotation speed control unit 1150 gives life determination unit 1154 information on speed variation duration Tz for which the rotation speed of pressurization roller 408 is varied. Rotation speed control unit 1150 may give life determination unit 1154 information on count of variation, instead of information on speed variation duration Tz.

Life determination unit 1154 determines whether or not fixing apparatus 40 has reached the end of its life. Specifically, life determination unit 1154 determines whether or not fixing apparatus 40 has reached the end of its life based on information on speed variation duration Tz (or alternatively count information) obtained from rotation speed control unit 1150. Specifically, when speed variation duration Tz is equal to or longer than set time period TC2 described above, life determination unit 1154 determines that fixing apparatus 40 has reached the end of its life. When life determination unit 1154 determines that the fixing apparatus has reached the end of its life, life determination unit 1154 gives a prescribed notification to display control unit 1155.

When display control unit 1155 accepts the prescribed notification from life determination unit 1154, it controls control panel 102 to show prescribed warning screen 1201 (see FIG. 7 in Disclosure I).

When control device 101 has made predetermined setting, life determination unit 1154 gives a prescribed notification also to communication control unit 1156. Communication control unit 1156 is connected to an external network. Image forming apparatus 100 can thus notify an external device that fixing apparatus 40 has reached the end of its life.

When control device 101 determines that fixing apparatus 40 has reached the end of its life, control device 101 typically stops subsequent formation of an image. Without being limited to such control, when control device 101 determines that fixing apparatus 40 has reached the end of its life, control device 101 may permit formation of an image using paper of a first type and may not permit formation of an image using paper of a second type smaller in basis weight than the paper of the first type. Paper S large in basis weight is less likely to be in the reverse loop state than paper S small in basis weight.

(Modification)

As described above, the reverse loop state normally does not occur in paper equal to or larger than plain paper in basis weight. On the other hand, paper smaller in basis weight such as thin paper is more likely to be in the reverse loop state than paper larger in basis weight.

Reverse loop thus normally does not occur in paper equal to or larger than plain paper in basis weight. Therefore, the reason why reverse loop occurs while paper S equal to or larger than plain paper in basis weight is used may be because fixing apparatus 40 is near the end of its life. Therefore, control device 101 preferably obtains information on speed variation duration Tz during reverse loop control for each type of paper (thin paper, plain paper, or cardboard).

For example, control device 101 may determine that fixing apparatus 40 has reached the end of its life when speed variation duration Tz is equal to or longer than set time period TC2 for paper of a type equal to or larger than plain paper in basis weight. Alternatively, control device 101 may determine that fixing apparatus 40 has reached the end of its life when speed variation duration Tz is equal to or longer than set time period TC2 for thin paper and further for paper of a type equal to or larger than plain paper in basis weight.

<D. Summary>

(1) As set forth above, image forming apparatus 100 includes control device 101 that controls operations of the image forming apparatus, a transfer apparatus (secondary transfer roller 33) that transfers an image onto paper S (a recording material), fixing apparatus 40 that fixes an unfixed image on paper S onto paper S, and sensor device 60 that is provided between the transfer apparatus and fixing apparatus 40 and detects a state of paper S.

The transfer apparatus transports paper S to fixing apparatus 40 at a predetermined speed. Fixing apparatus 40 includes pressurization roller 408 and pressurization roller 408 transports paper S transported from the transfer apparatus, downstream through the transportation path. When paper S is deflected in the first direction (the positive direction along the X axis in FIG. 24), sensor device 60 outputs a detection signal (a predetermined signal) to control device 101, and when paper S is deflected in the second direction (the negative direction along the X axis in FIG. 24) reverse to the first direction, it does not output the detection signal to control device 101.

While control device 101 receives input of the detection signal, control device 101 controls the rotation speed of pressurization roller 408 to speed VH (the first speed), and while it does not receive input of the detection signal, it controls the rotation speed of pressurization roller 408 to speed VL (the second speed) lower than speed VH. While control device 101 does not receive input of the detection signal for set time period TC1 (the first time period), control device 101 varies the rotation speed of pressurization roller 408 until it receives input of the detection signal. When a time period for which control device 101 varies the rotation speed of pressurization roller 408 is equal to or longer than set time period TC2 (the second time period), control device 101 determines that fixing apparatus 40 has reached the end of its life.

As the time period for which the rotation speed of pressurization roller 408 is varied is longer, it can be concluded that the reverse loop state has been aggravated. In other words, it is expected that fixing apparatus 40 has deteriorated.

Therefore, by paying attention to the time period for which the rotation speed of pressurization roller 408 is varied, the end of life of fixing apparatus 40 can be determined.

According to the configuration, the end of life is determined with attention being paid to a reverse loop phenomenon based on deterioration of fixing apparatus 40. Therefore, the end of life of fixing apparatus 40 can be determined more accurately than in a configuration where the threshold value for torque of pressurization roller 408 used for determination of the end of life is uniquely determined. Therefore, according to the configuration, timing of replacement of fixing apparatus 40 can be postponed and hence life of fixing apparatus 40 can be longer than in the conventional example.

(2) Control device 101 varies the rotation speed of pressurization roller 408 by switching the rotation speed of pressurization roller 408 between speed VH and speed VL.

(3) The rotation speed is switched with a predetermined period. When the number of times of switching of the rotation speed of pressurization roller 408 is equal to or larger than the number of times determined by the period and set time period TC2, control device 101 determines that fixing apparatus 40 has reached the end of its life.

(4) On condition that a ratio of the number of times that speed variation duration Tz for which the rotation speed of pressurization roller 408 is varied is equal to or longer than set time period TC2, of the number of times of control for varying the rotation speed of pressurization roller 408, is equal to or higher than prescribed value TR, control device 101 determines that fixing apparatus 40 has reached the end of its life. According to the configuration, the end of life can more accurately be determined.

(5) Each time a prescribed period elapses or each time a running distance of pressurization roller 408 increases by a prescribed distance, control device 101 makes determination as to the end of life of fixing apparatus 40.

(6) Sensor device 60 includes lever 61 and photosensor 62. When paper S is deflected in the second direction (the negative direction along the X axis in FIG. 24), lever 61 is located at the default position (the first position), and when paper S is deflected in the first direction (the positive direction along the X axis), lever 61 is moved from the default position to the end point position (the second position) by paper S. When lever 61 is located at the end point position, photosensor 62 outputs the detection signal to control device 101.

(7) A time period for which the rotation speed of pressurization roller 408 is varied is a cumulative value of a time period (elementary time period) for which the rotation speed of pressurization roller 408 is varied for each of a plurality of sheets of paper S.

(8) Image forming apparatus 100 can also be defined as being configured below.

Image forming apparatus 100 includes at least fixing apparatus 40 that fixes an unfixed image on paper S onto paper S and forms an image on paper S. Image forming apparatus 100 includes a transfer apparatus (a transfer unit or secondary transfer roller 33) that transfers an image onto paper S and transports paper S downstream through a transportation path, pressurization roller (pressurization member) 408 that can be rotated in a direction of downstream transportation in fixing apparatus 40 through the transportation path, of paper S from the transfer apparatus, fixing belt 402 that forms, as being opposed to pressurization roller 408, a nip region where unfixed image G is fixed, and is rotated as following rotation of pressurization roller 408, sensor device (detector) 60 that is provided between the transfer apparatus and pressurization roller 408 and detects a state of paper S, and control device (control unit) 101.

When paper S is deflected in the first direction (the positive direction along the X axis in FIG. 24), sensor device 60 outputs a detection signal (a predetermined signal) to control device 101, and when paper S is deflected in the second direction (the negative direction along the X axis in FIG. 24) reverse to the first direction, it does not output the detection signal to control device 101.

While control device 101 receives input of the detection signal, control device 101 controls the rotation speed of pressurization roller 408 to speed VH (the first speed), and while control device 101 does not receive input of the detection signal, control device 101 controls the rotation speed of pressurization roller 408 to speed VL (the second speed) lower than speed VH. While control device 101 does not receive input of the detection signal for set time period TC1 (the first time period), control device 101 varies the rotation speed of pressurization roller 408 until it receives input of the detection signal. When a time period for which the rotation speed of pressurization roller 408 is varied is equal to or longer than set time period TC2 (the second time period), control device 101 determines that fixing apparatus 40 has reached the end of its life.

<E. Control Structure>

Figure 30:
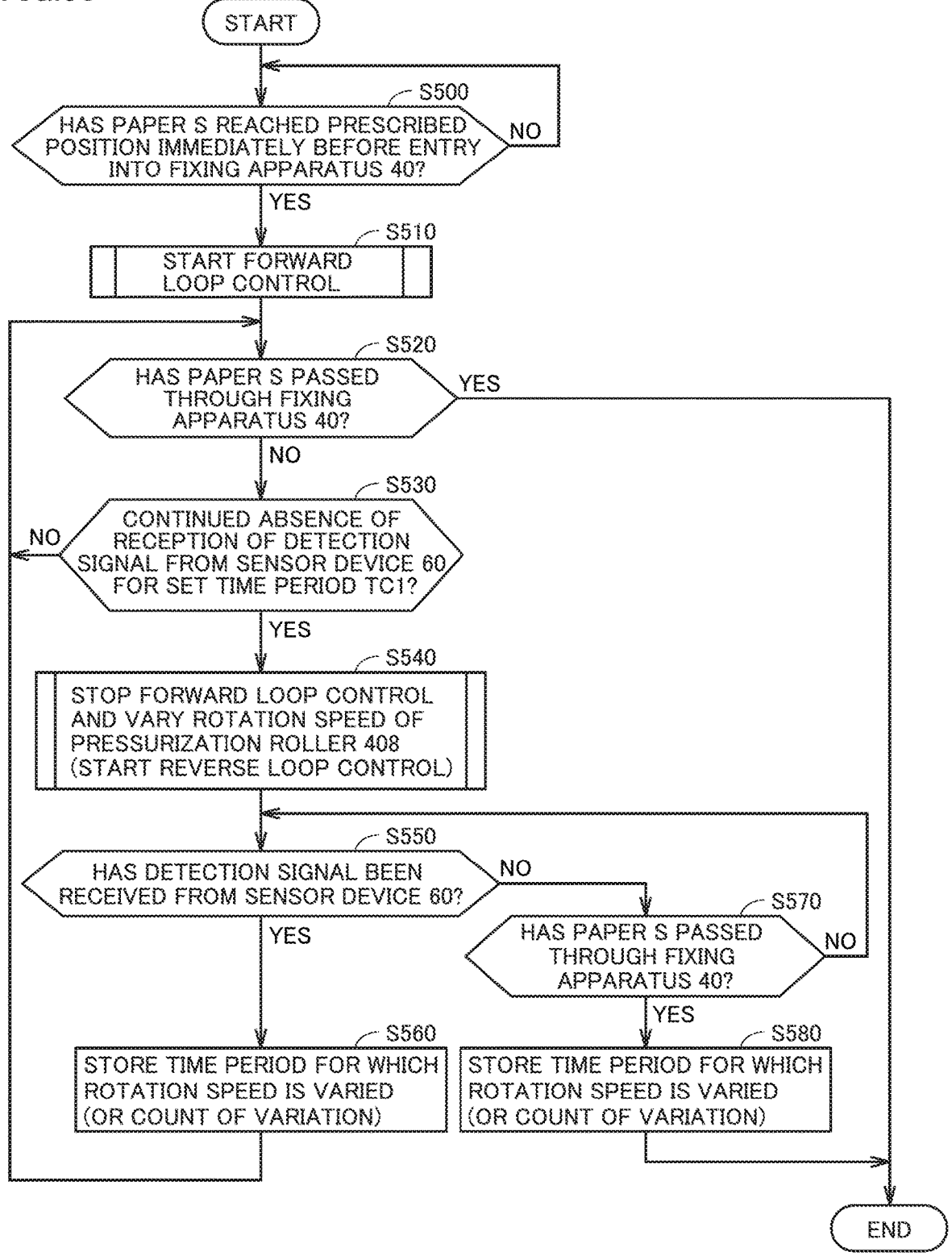
FIG. 30 is a flowchart representing a flow of processing performed by the control device.

FIG. 30 is a flowchart representing a flow of processing performed by control device 101.

Control device 101 (specifically, CPU 131) determines in step S500 whether or not paper S has reached a prescribed position immediately before entry into fixing apparatus 40. When control device 101 determines that paper has reached the prescribed position (YES in step S500), control device 101 starts in step S510 forward loop control described above. When control device 101 determines that paper has not reached the prescribed position (NO in step S500), control device 101 allows the process to proceed to step S500.

In step S520 after step S510, control device 101 determines whether or not paper S has passed through fixing apparatus 40. When control device 101 determines that paper S has passed through fixing apparatus 40 (YES in step S520), control device 101 quits a series of processing. When control device 101 determines that paper S has not passed through fixing apparatus 40 (NO in step S520), control device 101 determines in step S530 whether or not reception of a detection signal from sensor device 60 is continuously absent for set time period TC1.

When the control device determines that reception of the detection signal is continuously absent for set time period TC1 (YES in step S530), control device 101 stops forward loop control and varies the rotation speed of pressurization roller 408 in step S540. In other words, control device 101 starts reverse loop control. When the control device determines that it has received the detection signal (NO in step S530), control device 101 allows the process to proceed to step S520.

In step S550 after step S540, control device 101 determines whether or not it has received the detection signal from sensor device 60. When the control device determines that it has received the detection signal (YES in step S550), in step S560, control device 101 has flash memory 134 (see FIG. 23) store a time period (that is, speed variation duration Tz) for which it varies the rotation speed. Alternatively, instead of speed variation duration Tz, control device 101 has flash memory 134 store count of variation in rotation speed. Thereafter, control device 101 allows the process to proceed to step S520.

When the control device determines that it has not received the detection signal (NO in step S550), control device 101 determines in step S570 whether or not paper S has passed through fixing apparatus 40. When the control device determines that the paper has passed through the fixing apparatus (YES in step S570), control device 101 has flash memory 134 store speed variation duration Tz or count of variation in step S580. When the control device determines that paper has not passed through the fixing apparatus (NO in step S570), control device 101 allows the process to proceed to step S550.

Figure 31:
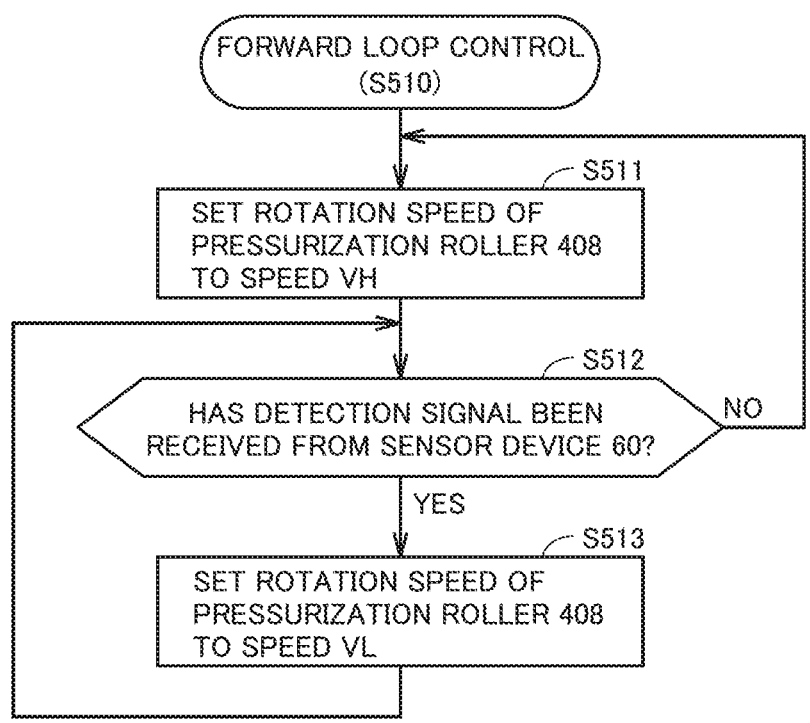
FIG. 31 is a flowchart representing a detailed flow of processing in step S510 in FIG. 30.

FIG. 31 is a flowchart representing a detailed flow of processing in step S510 in FIG. 30.

In step S511, control device 101 sets the rotation speed of pressurization roller 408 to high-speed side speed VH. In step S512, control device 101 determines whether or not it has received a detection signal from sensor device 60.

When the control device determines that it has received the detection signal (YES in step S512), control device 101 sets the rotation speed of pressurization roller 408 to low-speed side speed VL in step S513. When the control device determines that it has not received the detection signal (NO in step S512), control device 101 allows the process to proceed to step S511.

Figure 32:
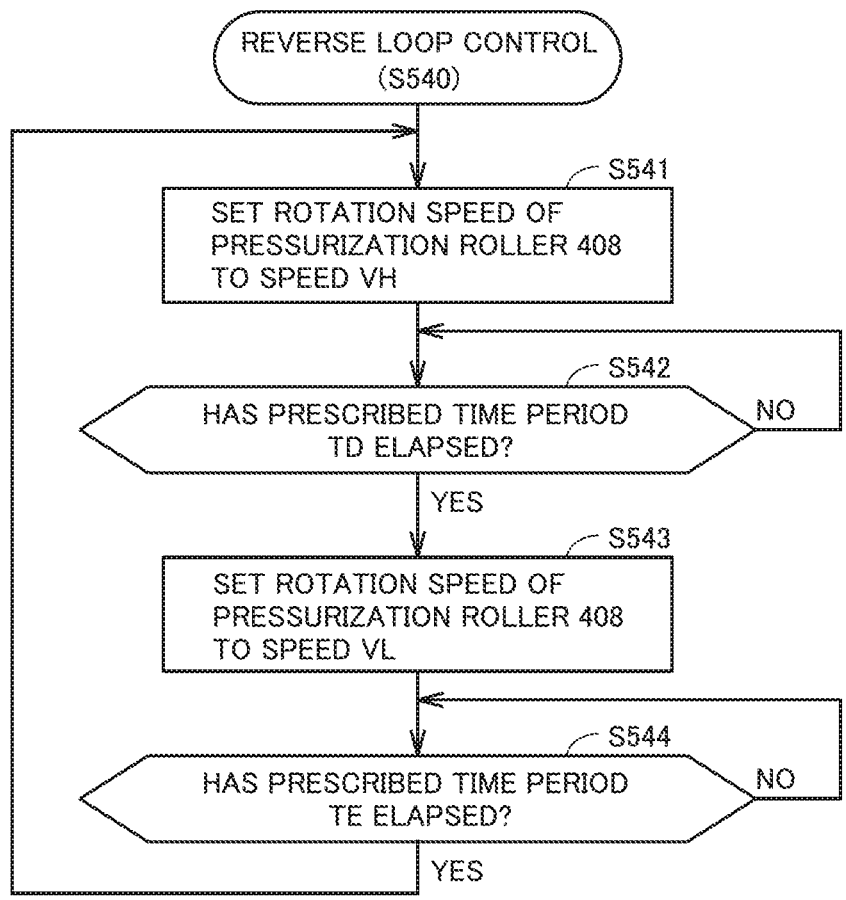
FIG. 32 is a flowchart representing a detailed flow of processing in step S540 in FIG. 30.

FIG. 32 is a flowchart representing a detailed flow of processing in step S540 in FIG. 30.

In step S541, control device 101 sets the rotation speed of pressurization roller 408 to high-speed side speed VH. In step S542, control device 101 determines whether or not prescribed time period TD (see FIG. 28) has elapsed since a time point of setting of the rotation speed to speed VH.

When the control device determines that prescribed time period TD has elapsed (YES in step S542), control device 101 sets the rotation speed of pressurization roller 408 to low-speed side speed VL in step S543. When the control device determines that prescribed time period TD has not elapsed (NO in step S542), control device 101 allows the process to proceed to step S542. In other words, control device 101 maintains the rotation speed of pressurization roller 408 at speed VH until prescribed time period TD elapses.

In step S544 after step S543, control device 101 determines whether or not prescribed time period TE (see FIG. 28) has elapsed since the time point of setting of the rotation speed to speed VL.

When the control device determines that prescribed time period TE has elapsed (YES in step S544), control device 101 allows the process to proceed to step S541. When the control device determines that prescribed time period TE has not elapsed (NO in step S544), control device 101 allows the process to proceed to step S544. In other words, control device 101 maintains the rotation speed of pressurization roller 408 at speed VL until prescribed time period TE elapses.

As set forth above, control device 101 periodically varies the rotation speed of pressurization roller 408.

Figure 33:
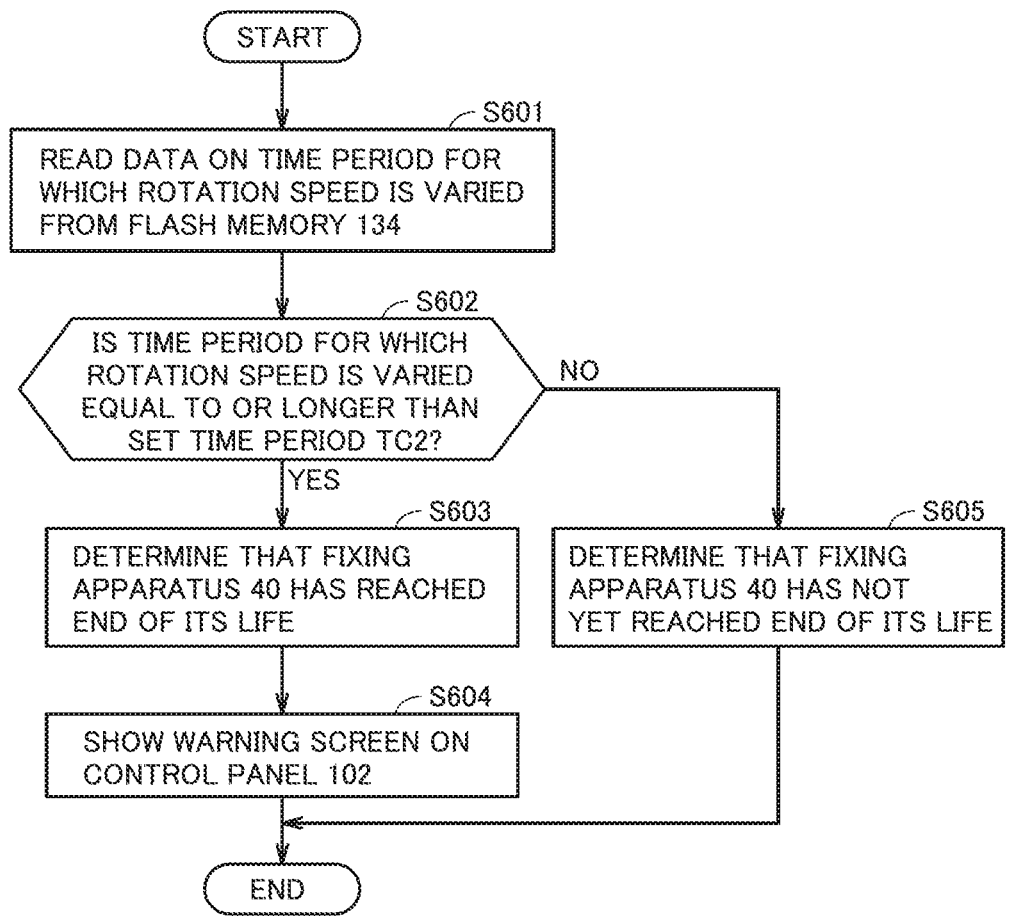
FIG. 33 is a flowchart representing a flow of life determination processing.

FIG. 33 is a flowchart representing a flow of life determination processing.

In step S601, CPU 131 of control device 101 reads a time period for which the rotation speed is varied (that is, speed variation duration Tz) from flash memory 134. For example, when a predetermined condition is satisfied, reading is performed.

Data that has already been read is excluded from data to be read (speed variation duration Tz). Each time data is read, CPU 131 may erase read data from flash memory 134. Alternatively, CPU 131 may overwrite data with new data. How data is held and erased is not particularly limited.

In step S602 after step S601, control device 101 determines whether or not a time period (speed variation duration Tz) for which the rotation speed of pressurization roller 408 is varied is equal to longer than set time period TC2. When the control device determines that speed variation duration Tz is equal to or longer than set time period TC2 (YES in step S602), control device 101 determines in step S603 that fixing apparatus 40 has reached the end of its life. In other words, control device 101 determines that the service life of fixing apparatus 40 has expired. Thereafter, in step S604, control device 101 provides warning representation on control panel 102.

When the control device determines that speed variation duration Tz is shorter than set time period TC2 (NO in step S602), control device 101 determines in step S605 that fixing apparatus 40 has not reached the end of its life. In other words, control device 101 determines that the service life of fixing apparatus 40 has not yet expired.

(Modification)

Figure 34:
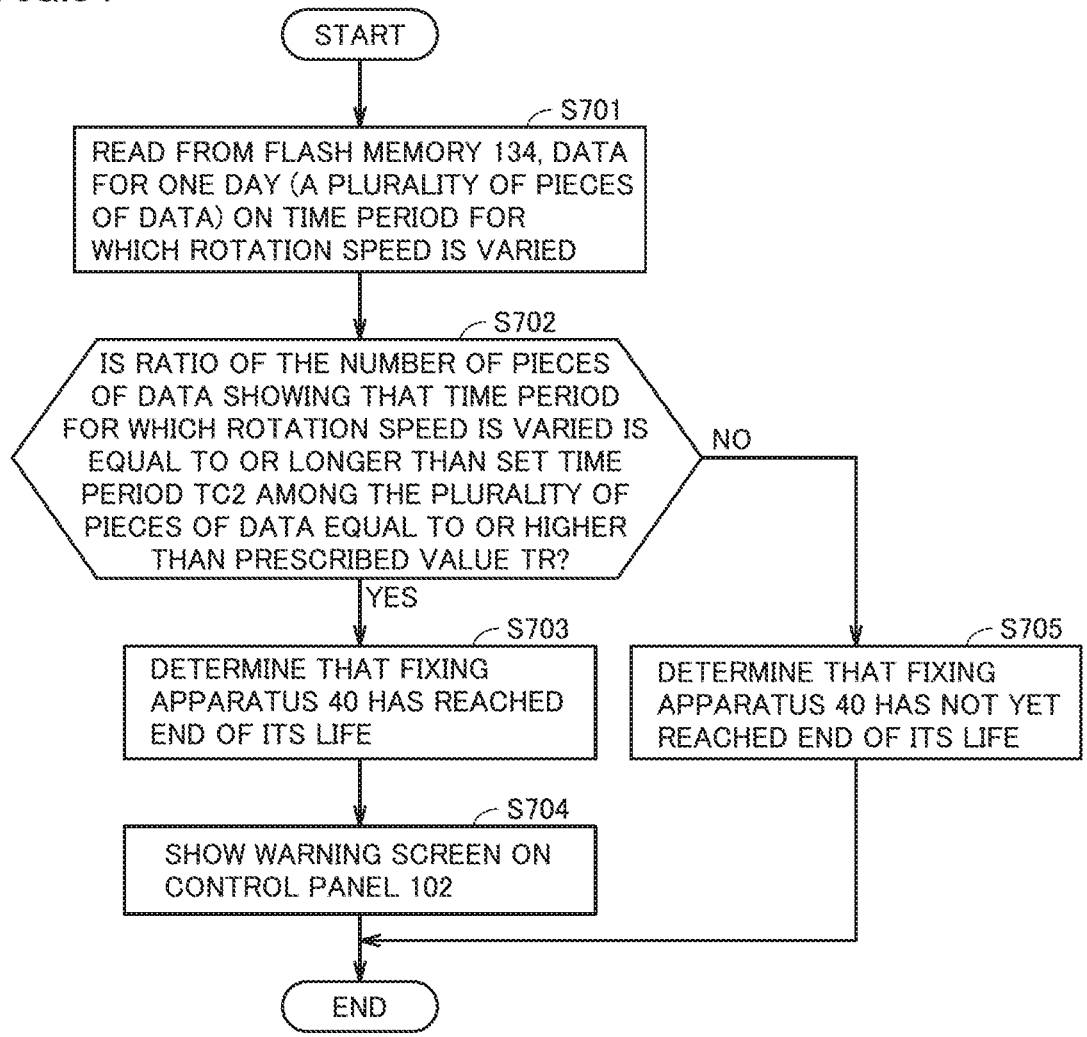
FIG. 34 is a flowchart representing a flow of processing for determining life of the fixing apparatus based on a prescribed value.

FIG. 34 is a flowchart representing a flow of processing for determining the end of life of fixing apparatus 40 based on prescribed value TR.

In step S701, CPU 131 of control device 101 reads from flash memory 134, data for one day (typically, a plurality of pieces of data), on a time period (speed variation duration Tz) for which the rotation speed is varied. In step S702, control device 101 determines whether or not a ratio of the number of pieces of data showing that a time period for which the rotation speed is varied is equal to or longer than set time period TC2 among the plurality of pieces of data is equal to or higher than prescribed value TR.

When the control device determines that the ratio is equal to or higher than prescribed value TR (YES in step S702), control device 101 determines in step S703 that fixing apparatus 40 has reached the end of its life. Thereafter, in step S704, control device 101 provides warning representation on control panel 102.

When the control device determines that the ratio is lower than prescribed value TR (NO in step S702), control device 101 determines in step S705 that fixing apparatus 40 has not reached the end of its life.

Figure 35:
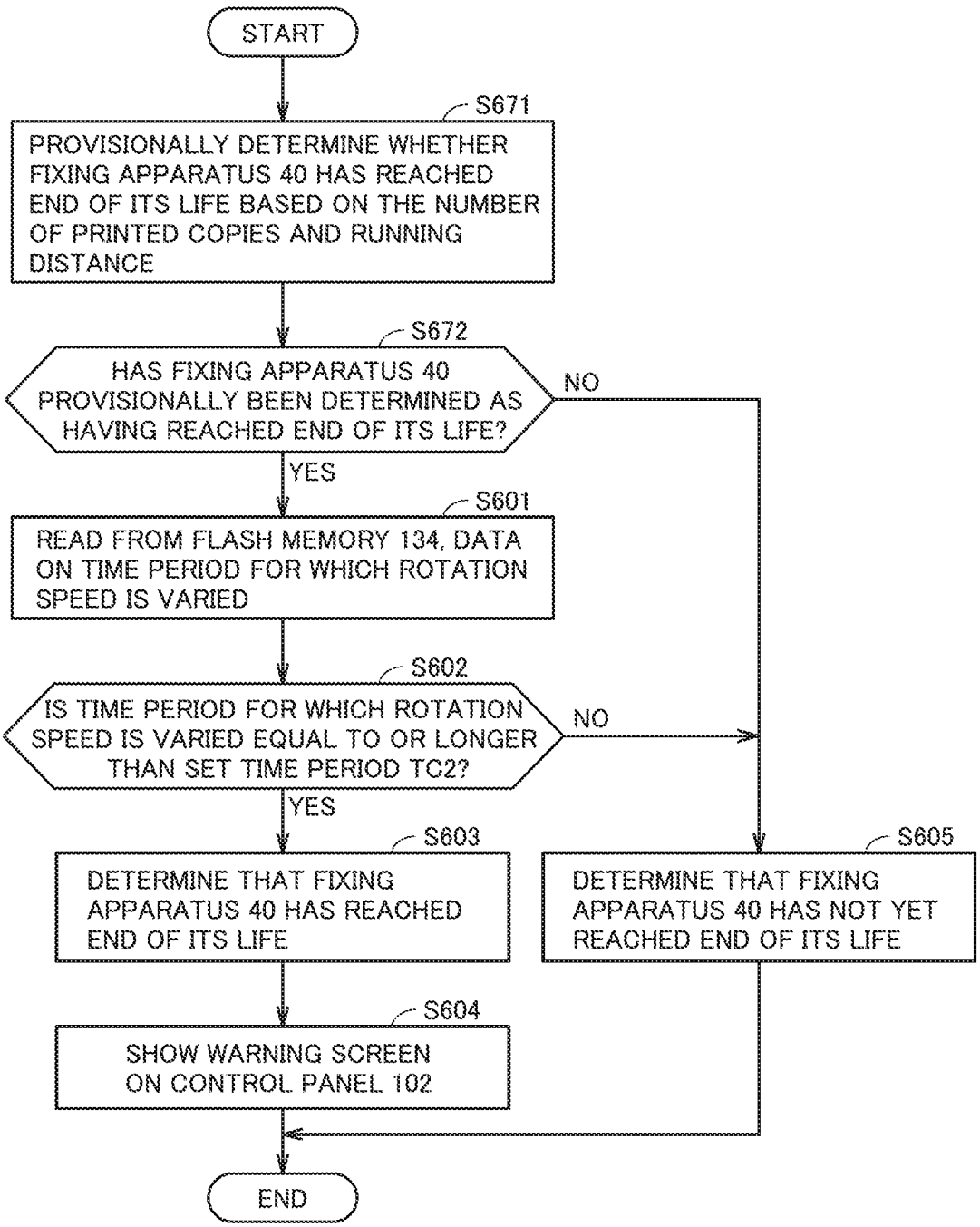
FIG. 35 is a flowchart representing a flow of life determination processing when the number of printed copies and a running distance are additionally considered in determination of life.

FIG. 35 is a flowchart representing a flow of life determination processing when the number of printed copies and a running distance are additionally considered in determination of the end of life.

In step S671, control device 101 provisionally determines whether or not fixing apparatus 40 has reached the end of its life based on the number of printed copies (the number of formed images) and the running distance of pressurization roller 408. Specifically, control device 101 provisionally determines that fixing apparatus 40 has reached the end of its life when the number of printed copies exceeds a predetermined threshold value. Alternatively, when the running distance is equal to or longer than a predetermined threshold value, control device 101 determines that fixing apparatus 40 has reached the end of its life.

When the control device provisionally determines that fixing apparatus 40 has reached the end of its life (YES in step S672), control device 101 allows the process to proceed to step S601. When the control device provisionally determines that fixing apparatus 40 has not reached the end of its life, the control device finally determines in step S605 that fixing apparatus 40 has not reached the end of its life.

Since processing in step S601 or later is the same as the processing shown in FIG. 33, description will not be repeated.

<F. User Interface>

Typically, prescribed warning screen 1201 pops up on touch screen 120 of control panel 102 as shown in FIG. 7 in Disclosure I. A user of image forming apparatus 100 can thus know that timing of replacement of fixing apparatus 40 has come.

<G. Life Extension Processing>

When the control device determines that fixing apparatus 40 has reached the end of its life as above, normally, fixing apparatus 40 should be replaced. Life of fixing apparatus 40, however, can also be extended by performing processing as below.

For example, when a time period (speed variation duration Tz) for which the rotation speed of pressurization roller 408 is varied becomes long, control device 101 increases the rotation speed of pressurization roller 408. Alternatively, when a time period for which the rotation speed of pressurization roller 408 is varied becomes long, control device 101 increases load imposed by pressurization roller 408 on fixing member 490.

Embodiment 7

Processing in the present embodiment is combined with processing in Embodiment 6. Specifically, image forming apparatus 100 performs the processing described in Embodiment 6 and processing described in the present embodiment. Similarly, processing in other Embodiments 8, 9, and 10 which will be described later is also combined with the processing in Embodiment 6.

Specifically, in the present embodiment and other Embodiments 8 and 9, image forming apparatus 100 determines the end of life of fixing apparatus 40 based not only on a time period for which the rotation speed of the pressurization roller is varied (or count of variation) but also on torque Tq.

More specifically, the control device provisionally determines whether or not fixing apparatus 40 has reached the end of its life through processing described in the present embodiment or processing described in other Embodiments 8 and 9. When the control device provisionally determines that fixing apparatus 40 has reached the end of its life, it determines (that is, finally determines) whether or not fixing apparatus 40 has reached the end of its life by performing determination processing described in Embodiment 6. When the control device does not provisionally determine that fixing apparatus 40 has reached the end of its life, it does not finally makes determination as to the end of life.

As described above, control device 101 determines the end of life of fixing apparatus 40 each time a predetermined condition is satisfied. Specifically, control device 101 determines the end of life of fixing apparatus 40 each time a prescribed period elapses.

In the following, each embodiment will be described with reference to torque Tq, average torque Tav as an average value of torque Tq, and moving average torque Tmav as a moving average value of average torque Tav. Details of torque will be described later. This is also applicable to other Embodiments 8 to 10 which will be described later.

For the sake of convenience of description, when torque Tq, average torque Tav, and moving average torque Tmav are not distinguished from one another, they are simply denoted as "torque Tg." Torque Tg is a concept that encompasses torque Tq, average torque Tav, and moving average torque Tmav. This is also applicable to other Embodiments 8 to 10 which will be described later.

<A. Functional Configuration>

Figure 36:
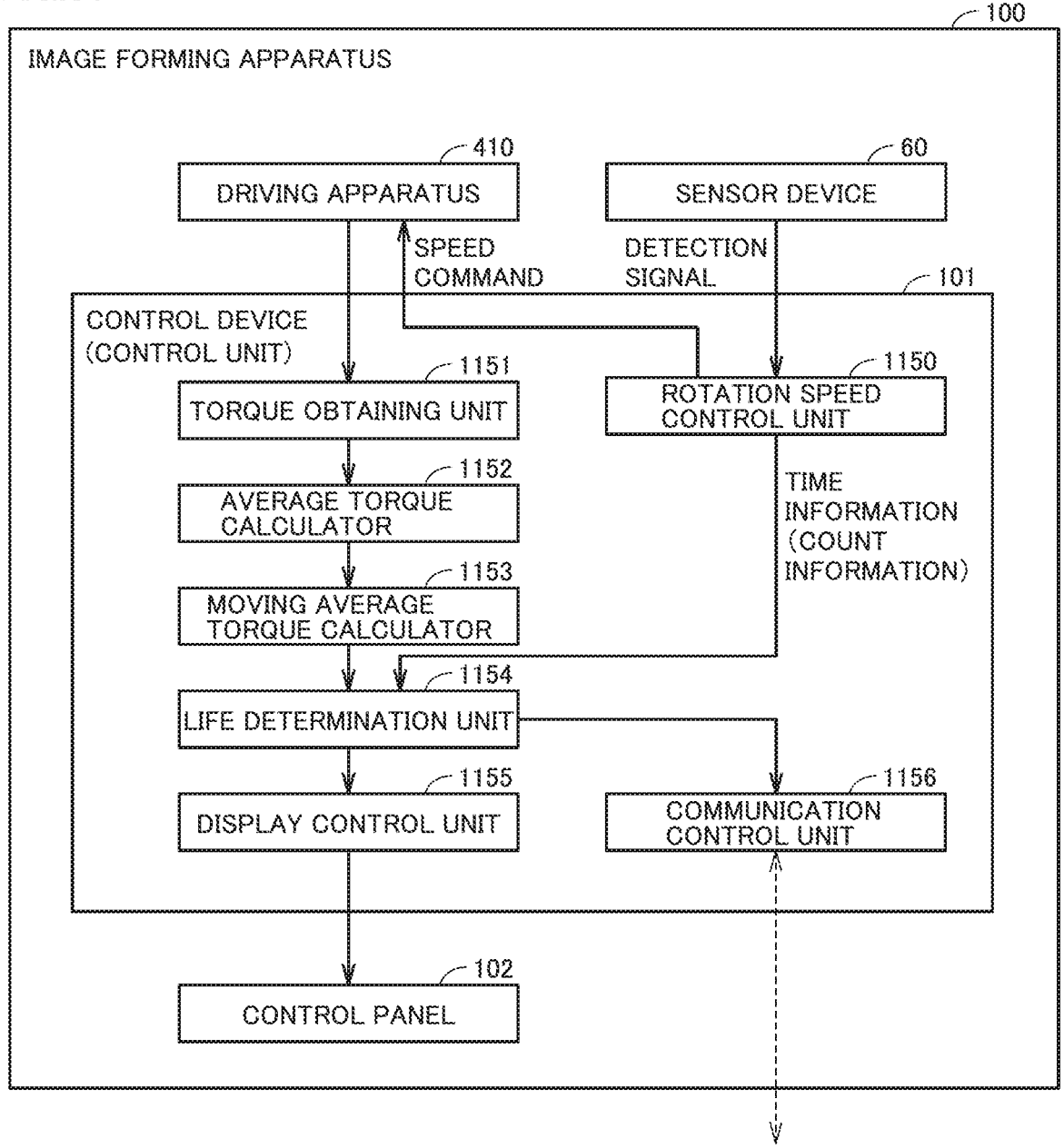
FIG. 36 is a functional block diagram representing a functional configuration of the control device.

FIG. 36 is a functional block diagram representing a functional configuration of control device 101.

Image forming apparatus 100 includes control device 101, driving apparatus 410, control panel 102, and sensor device 60.

Control device 101 includes rotation speed control unit 1150, a torque obtaining unit 1151, an average torque calculator 1152, a moving average torque calculator 1153, a life determination unit 1154, a display control unit 1155, and a communication control unit 1156.

Torque obtaining unit 1151 obtains torque Tq (a value of torque) from driving apparatus 410. Specifically, torque obtaining unit 1151 obtains from driving apparatus 410, torque Tq detected by driving apparatus 410 every prescribed period. An example in which the prescribed period is set to "one day" will be described below. The prescribed period is not limited to one day.

In the present example, torque obtaining unit 1151 obtains torque Tq five times a day at the maximum. Specifically, torque obtaining unit 1151 obtains from driving apparatus 410, torque Tq during a period over which pressurization roller 408 is in contact with fixing belt 402 as shown in FIG. 3 in Disclosure I and no paper is passing. In other words, torque obtaining unit 1151 obtains from driving apparatus 410, torque (that is, "idle torque") of motor 409 during a period over which there is no load imposed by paper S.

More specifically, torque obtaining unit 1151 obtains from driving apparatus 410, torque Tq detected after warm-up of image forming apparatus 100. In an example where image forming apparatus 100 is warmed up five times a day, torque can be obtained five times. In an example where the image forming apparatus is warmed up only once a day, control device 101 obtains torque only once on this day. The number of times of obtaining torque Tq per one day is not limited to five times.

As set forth above, "lapse of one day" and "after warm-up of image forming apparatus 100" are defined as the "predetermined condition" in the present example.

Torque (a value of torque) obtained five times from driving apparatus 410 by torque obtaining unit 1151 is referred to as Tq(n[1]), Tq(n[2]), Tq(n[3]), Tq(n[4]), and Tq(n[5]). n is a variable representing a day.

Torque obtaining unit 1151 sends torque obtained five times to average torque calculator 1152. When torque is obtained, for example, only four times, torque obtaining unit 1151 typically sends only Tq(n[1]) to Tq(n[4]) to average torque calculator 1152. Alternatively, torque obtaining unit 1151 may send Tq(n[1]) to Tq(n[5]) and notify average torque calculator 1152 that a value of Tq(n[5]) is invalid.

Average torque calculator 1152 calculates an average value of torque for each day. Specifically, average torque calculator 1152 calculates an average value (which is referred to as "average torque Tav" below) of torque obtained five times as shown in an expression (7) below. The expression (7) is the same as the expression (1) shown in Disclosure I.

$$Tav(n)=(Tq(n[1])+Tq(n[2])+Tq(n[3])+Tq(n[4])+Tq(n[5]))\div 5 \qquad (7)$$

Average torque calculator 1152 sends calculated average torque Tav(n) to moving average torque calculator 1153.

Moving average torque calculator 1153 calculates moving average torque Tmav (a moving average value) by using average torque Tav of five days. Specifically, moving average torque calculator 1153 calculates moving average torque Tmav(n) by using average torque Tav(n) on this day and average torque of four days from one day before to four days before (Tav(n−4), Tav(n−3), Tav(n−2), and Tav(n−1)). Specifically, moving average torque calculator 1153 performs calculation shown in an expression (8) below. The expression (8) is the same as the expression (2) shown in Disclosure I.

$$Tmav(n)=(Tav(n-4)+Tav(n-3)+Tav(n-2)+Tav(n-1)+Tav(n))\div 5 \qquad (8)$$

Moving average torque calculator 1153 sends calculated moving average torque Tmav(n) to life determination unit 1154. Though moving average torque Tmav is calculated by using average torque Tav of five days (five pieces), the number of pieces of average torque Tav is not limited to five.

Life determination unit 1154 determines whether or not fixing apparatus 40 has reached the end of its life. Specifically, life determination unit 1154 determines whether or not fixing apparatus 40 has reached the end of its life based on time information (or count information) obtained from rotation speed control unit 1150 and moving average torque Tmav. More specifically, life determination unit 1154 provisionally determines that fixing apparatus 40 has reached the end of its life based on variation over time in moving average torque Tmav turning from increase to decrease. Life determination unit 1154 determines (finally determines in the present embodiment) whether or not fixing apparatus 40 has reached the end of its life based on time information (or count information) obtained from rotation speed control unit 1150 as described in Embodiment 6, on condition that it has provisionally determined that fixing apparatus 40 had reached the end of its life.

Figure 37:
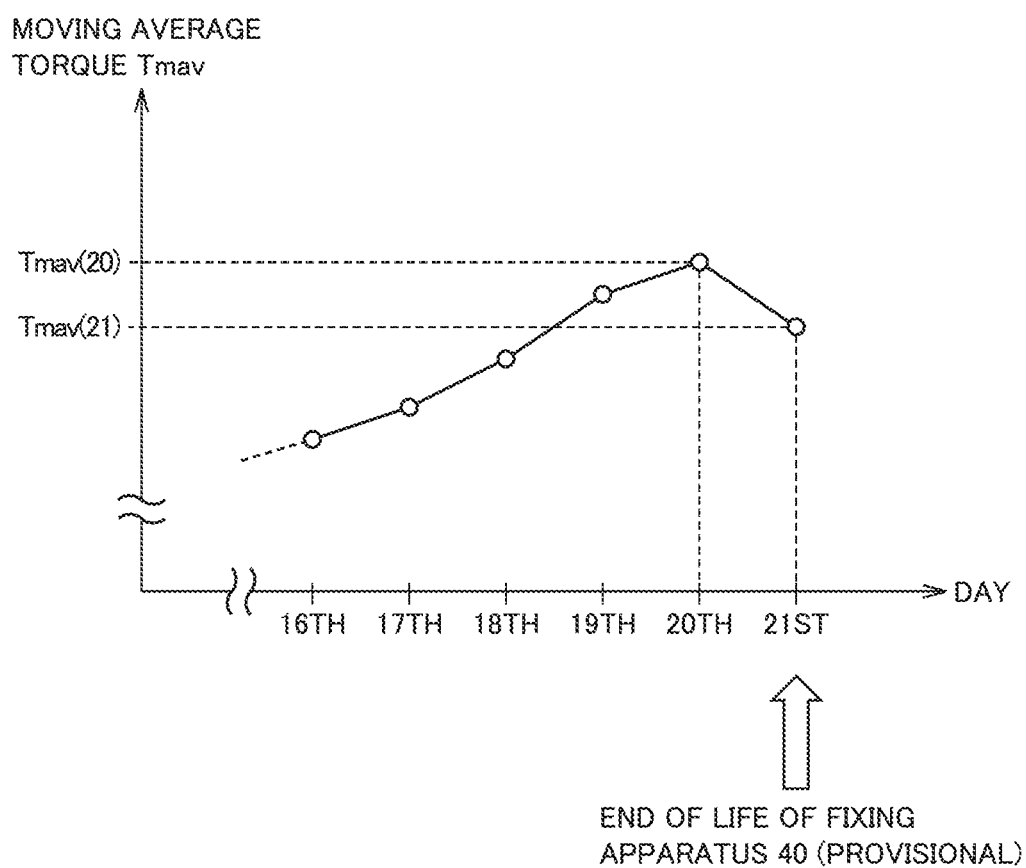
FIG. 37 is a diagram showing variation over time in moving average torque.

FIG. 37 is a diagram showing variation over time in moving average torque Tmav.

The abscissa in the graph (figure) represents a day and the ordinate in the graph represents moving average torque Tmav. In the example in FIG. 37, moving average torque (Tmav(16) to Tmav(21)) from the sixteenth to the twenty-first of a certain month are plotted.

Moving average torque Tmav monotonously increases until the twentieth. Moving average torque Tmav(21) on the twenty-first is lower than moving average torque Tmav(20) on the twentieth which is the previous day. In other words, relation of "Tmav(n−1)>Tmav(n)" is satisfied.

Therefore, life determination unit 1154 provisionally determines that fixing apparatus 40 has reached the end of its life at the time point of the twenty-first (specifically, the time point of calculation of Tmav(21)). When life determination unit 1154 provisionally determines that the fixing apparatus has reached the end of its life, it gives a prescribed notification to display control unit 1155.

When display control unit 1155 accepts a prescribed notification from life determination unit 1154, it controls control panel 102 to show prescribed warning screen 1201 (see FIG. 7 in Disclosure I).

When predetermined setting has been made by control device 101, life determination unit 1154 gives a prescribed notification also to communication control unit 1156. Communication control unit 1156 is connected to an external network. Image forming apparatus 100 can thus notify an external device that fixing apparatus 40 has reached the end of its life.

Though a configuration in which torque obtaining unit 1151 obtains torque Tq detected after warm-up of image forming apparatus 100 from driving apparatus 410 is described above by way of example, limitation thereto is not intended. For example, control device 101 may obtain from driving apparatus 410, torque Tq detected after fixation onto a recording material.

When control device 101 provisionally determines that fixing apparatus 40 has reached the end of its life, control device 101 typically stops subsequent formation of an image. Without being limited to such control, when control device 101 provisionally determines that fixing apparatus 40 has reached the end of its life, control device 101 may permit formation of an image using paper of a first type and not permit formation of an image using paper of a second type smaller in basis weight than the first type. This is because paper S larger in basis weight is less likely to slip in the nip region than paper S smaller in basis weight.

<B. Summary>

Image forming apparatus 100 includes control device 101 that controls operations of the image forming apparatus and fixing apparatus 40 that fixes an unfixed image on paper S (a recording material) onto paper S.

Fixing apparatus 40 includes pressurization roller 408 rotatable in a direction of downstream transportation of the recording material through the transportation path, motor 409 that rotates pressurization roller 408, driving apparatus 410 that drives motor 409, endless fixing belt 402 that is rotated as following rotation of pressurization roller 408, and fixing member 490 that slidably supports fixing belt 402 from an inner surface of fixing belt 402. Fixing member 490 is pressurized by pressurization roller 408 at a position where fixing belt 402 is supported.

Driving apparatus 410 drives motor 409 so as to maintain the rotation speed of pressurization roller 408 constant based on a command from control device 101. Driving apparatus 410 detects torque Tq at the time when it drives motor 409.

Control device 101 obtains detected torque Tq from driving apparatus 410. Control device 101 provisionally determines that fixing apparatus 40 has reached the end of its life based on variation over time in torque Tg (in the present example, moving average torque Tmav calculated based on torque Tq) turning from increase to decrease.

Specifically, each time a prescribed period (one day in the present example) elapses, control device 101 obtains torque Tq from driving apparatus 410 a plurality of times and calculates an average value of torque Tq (average torque Tav) obtained the plurality of times. Control device 101 calculates a moving average value (moving average torque Tmav) by using calculated average torque Tav and at least average torque Tav calculated previously. When calculated moving average torque Tmav is lower than moving average torque Tmav calculated previously, control device 101 provisionally determines that fixing apparatus 40 has reached the end of its life.

In fixing apparatus 40, as fixing belt 402 is rotated, sliding sheet 406 serving as a sliding portion is gradually worn and load between fixing belt 402 and sliding sheet 406 gradually increases during rotation of fixing belt 402. Therefore, in order to maintain the speed of pressurization roller 408 constant, torque Tq of motor 409 that rotates pressurization roller 408 should be increased. Therefore, the value of torque Tq of pressurization roller 408 gradually increases as the number of days for which the pressurization roller is used increases. As the value of torque Tq is larger, the value of moving average torque Tmav is also larger.

When the value of torque Tq is larger, however, a phenomenon of slip of paper S occurs in fixing apparatus 40 (specifically, the nip region).

When paper S slips, the speed at which pressurization roller 408 sends paper S downstream is lowered. Therefore, the speed at which pressurization roller 408 sends paper S downstream is lower than the speed at which secondary transfer roller 33 on the upstream side in fixing apparatus 40 sends paper S to fixing apparatus 40.

Consequently, the reverse loop state occurs between secondary transfer roller 33 and fixing apparatus 40. When reverse loop occurs, an image is deteriorated.

When paper S slips as above, the value of detected torque Tq becomes smaller. Therefore, calculated moving average torque Tmav is also lower.

Image forming apparatus 100 thus provisionally determines that fixing apparatus 40 has reached the end of its life based on variation over time in moving average torque Tmav turning from increase to decrease. According to such a configuration, the end of life of fixing apparatus 40 can provisionally be determined before reverse loop occurs.

According to the configuration, fixing apparatus 40 can be longer in life than in the configuration in which a threshold value of torque of pressurization roller 408 used for provisional determination of the end of life is uniquely determined.

In the present example, the end of life is provisionally determined based on moving average torque Tmav. Therefore, even though noise is introduced in torque, influence by noise can be lessened. Namely, provisional determination of the end of life can be higher in accuracy than provisional determination of the end of life made simply based on torque Tq.

Each time a prescribed period (one day in the present example) elapses, control device 101 obtains from driving apparatus 410, idle torque during a period over which no paper is passing. Specifically, control device 101 obtains from driving apparatus 410, torque Tq detected after warm-up of image forming apparatus 100 or after fixation onto paper S.

At such timing, no image is being formed. Therefore, the value of torque Tq detected in driving apparatus 410 is not dependent on contents of unfixed image G on paper S. Therefore, control device 101 can highly accurately provisionally determine the end of life by obtaining torque Tq at such timing.

<C. Control Structure>

Figure 38:
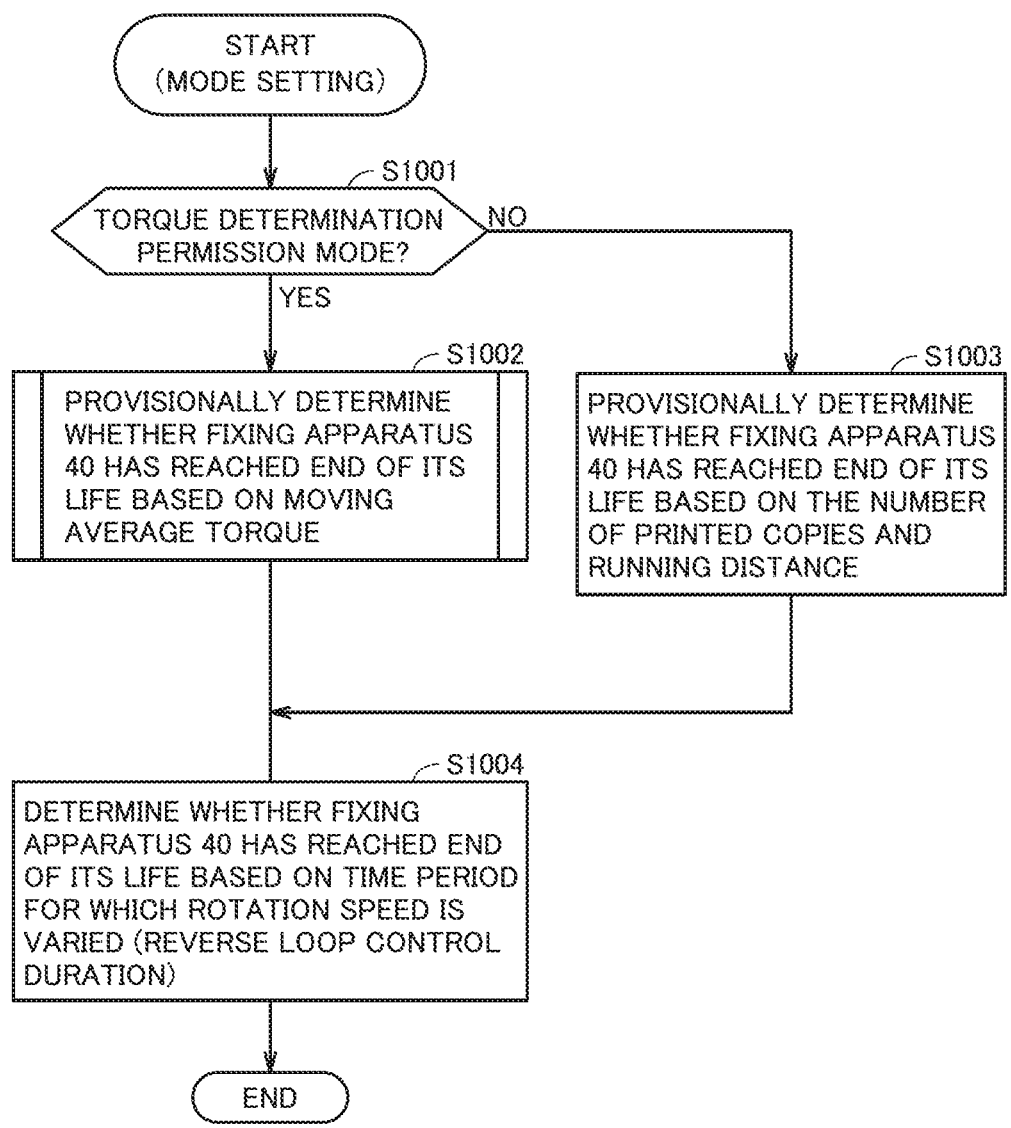
FIG. 38 is a flowchart for illustrating a flow of processing performed in the image forming apparatus.

FIG. 38 is a flowchart for illustrating a flow of processing performed in image forming apparatus 100.

In step S1001, control device 101 determines whether or not a torque determination permission mode has been set as a mode of provisionally determining the end of life of fixing apparatus 40. The torque determination permission mode refers to a mode in which the end of life of fixing apparatus 40 is provisionally determined based on variation over time in torque Tg (in the present example, moving average torque Tmav). Typically, a serviceperson sets the torque determination permission mode.

When control device 101 determines that the torque determination permission mode has been set (YES in step S1001), control device 101 provisionally determines in step S1002 whether or not fixing apparatus 40 has reached the end of its life based on moving average torque Tmav.

When control device 101 determines that the torque determination permission mode has not been set (NO in step S1001), control device 101 provisionally determines in step S1003 whether or not fixing apparatus 40 has reached the end of its life based on the number of printed copies in image forming apparatus 100 and a running distance of pressurization roller 408. Typically, when the number of printed copies exceeds a reference number set in advance or the running distance of pressurization roller 408 exceeds a distance set in advance, control device 101 provisionally determines that fixing apparatus 40 has reached the end of its life. In other words, when any one of the condition of the number of printed copies and the condition of the running distance is satisfied, control device 101 provisionally determines that fixing apparatus 40 has reached the end of its life.

Control device 101 determines in step S1004 whether or not fixing apparatus 40 has reached the end of its life based on a time period for which the rotation speed is varied (a reverse loop restriction duration).

Figure 39:
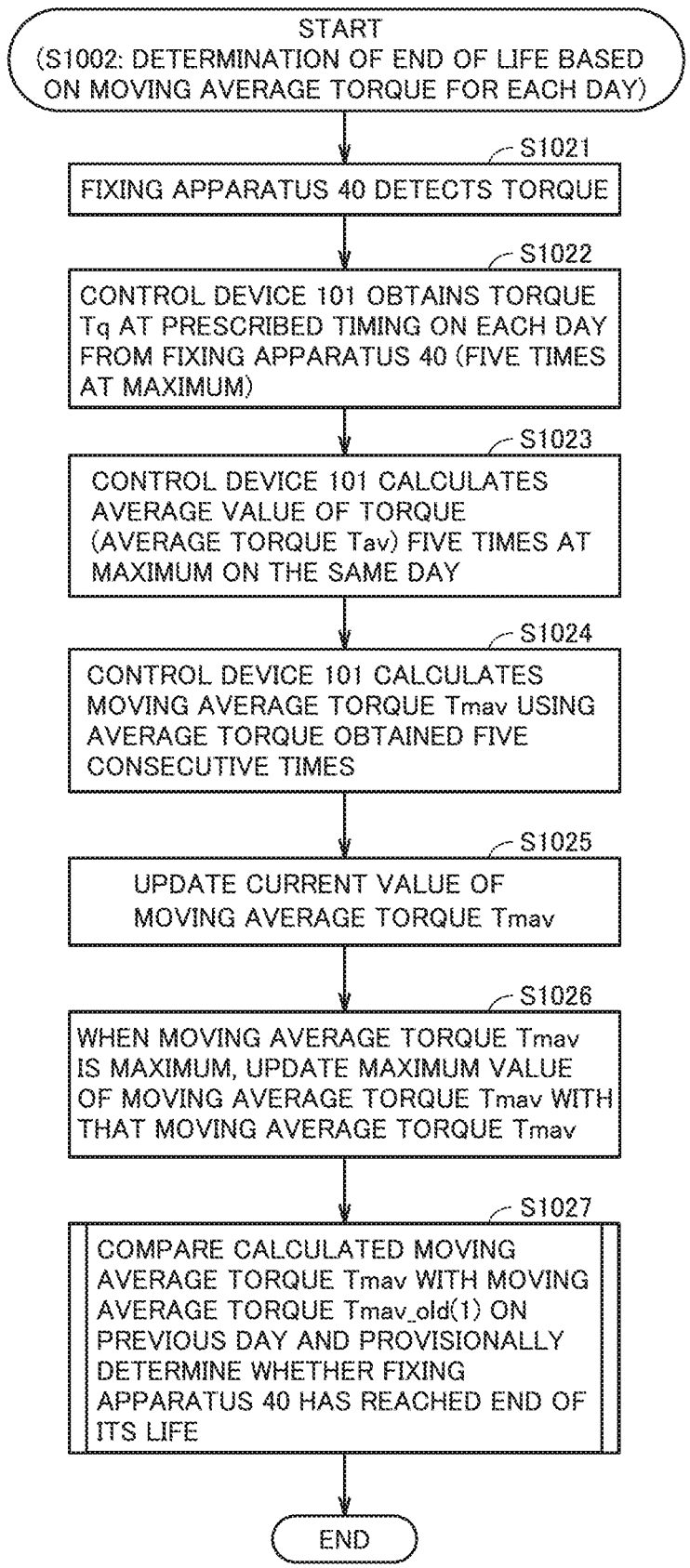
FIG. 39 is a flowchart for illustrating details of processing in step S1002 in FIG. 38.

FIG. 39 is a flowchart for illustrating details of processing in step S1002 in FIG. 38.

In step S1021, fixing apparatus 40 successively detects torque Tq of pressurization roller 408. In step S1022, control device 101 obtains from fixing apparatus 40, torque Tq at prescribed timing on each day. As described above, control device 101 obtains from driving apparatus 410, for example, torque Tq detected after warm-up of image forming apparatus 100.

In step S1023, control device 101 calculates an average value (average torque Tav) of torque Tq obtained five times at the maximum on the same day. Specifically, control device 101 performs calculation in the expression (7) described above. In step S1024, control device 101 calculates moving average torque Tmav by using five consecutive average values.

In step S1025, control device 101 updates a current value (a value of a variable) of moving average torque Tmav with the value calculated in step S1024. In step S1026, when moving average torque Tmav is maximum, control device 101 updates the maximum value (the value of the variable) of moving average torque Tmav with that moving average torque Tmav. The maximum value of moving average torque Tmav is reset (typically, set to zero) after fixing apparatus 40 is replaced. Therefore, the maximum value is a maximum value after replacement of fixing apparatus 40.

In step S1027, control device 101 compares calculated moving average torque Tmav with moving average torque Tmav_old(1) on the previous day and provisionally determines whether or not fixing apparatus 40 has reached the end of its life.

Referring to the expression (8), moving average torque Tmav_old(1) on the previous day is calculated in an expression (9) below, with calculated moving average torque Tmav being denoted as Tmav(n). The expression (9) is the same as the expression (3) shown in Disclosure I.

$$Tmav\_old(1)=Tmav(n-1)=(Tav(n-5)+Tav(n-4)+Tav(n-3)+Tav(n-2)+Tav(n-1))\div 5 \qquad (9)$$

Figure 40:
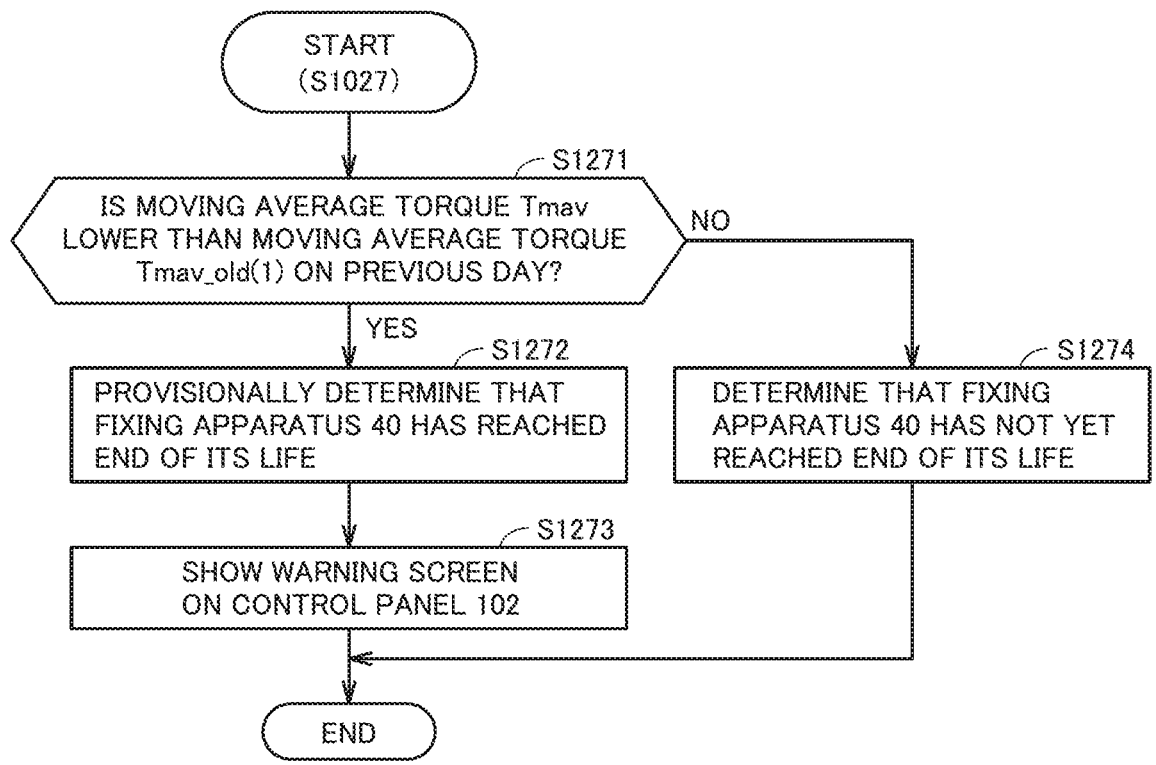
FIG. 40 is a flowchart for illustrating details of processing in step S1027 in FIG. 39.

FIG. 40 is a flowchart for illustrating details of processing in step S1027 in FIG. 39.

Control device 101 determines in step S1271 whether or not moving average torque Tmav is lower than moving average torque Tmav_old(1) on the previous day. When control device 101 determines that the moving average torque is lower than the moving average torque on the previous day (YES in step S1271), the control device provisionally determines in step S1272 that fixing apparatus 40 has reached the end of its life. As shown in FIG. 7 in Disclosure I, control device 101 controls control panel 102 to show the warning screen in step S1273.

When control device 101 determines that the moving average torque is not lower than the moving average torque on the previous day (NO in step S1271), control device 101 determines in step S1274 that fixing apparatus 40 has not yet reached the end of its life.

<D. Modification>

A modification of provisional life determination processing by control device 101 will be described below.

(d1. First Modification)

When variation over time in moving average torque Tmav (see FIG. 11 in Disclosure I) turns from increase to decrease, control device 101 provisionally determines that fixing apparatus 40 has reached the end of its life on condition that moving average torque Tmav is equal to or higher than predetermined threshold value Th1. Specifically, even though variation over time in moving average torque Tmav turns from increase to decrease, control device 101 does not determine that fixing apparatus 40 has reached the end of its life when moving average torque Tmav is lower than predetermined threshold value Th1.

The reason why determination above based on threshold value Th1 is made is because the value of moving average torque Tmav may turn to decrease due to noise or the like in spite of the fact that moving average torque Tmav is sufficiently lower than a value (numeric range) at which slip of paper S may occur in the nip region (similar to the reason shown in Disclosure I).

Figure 41:
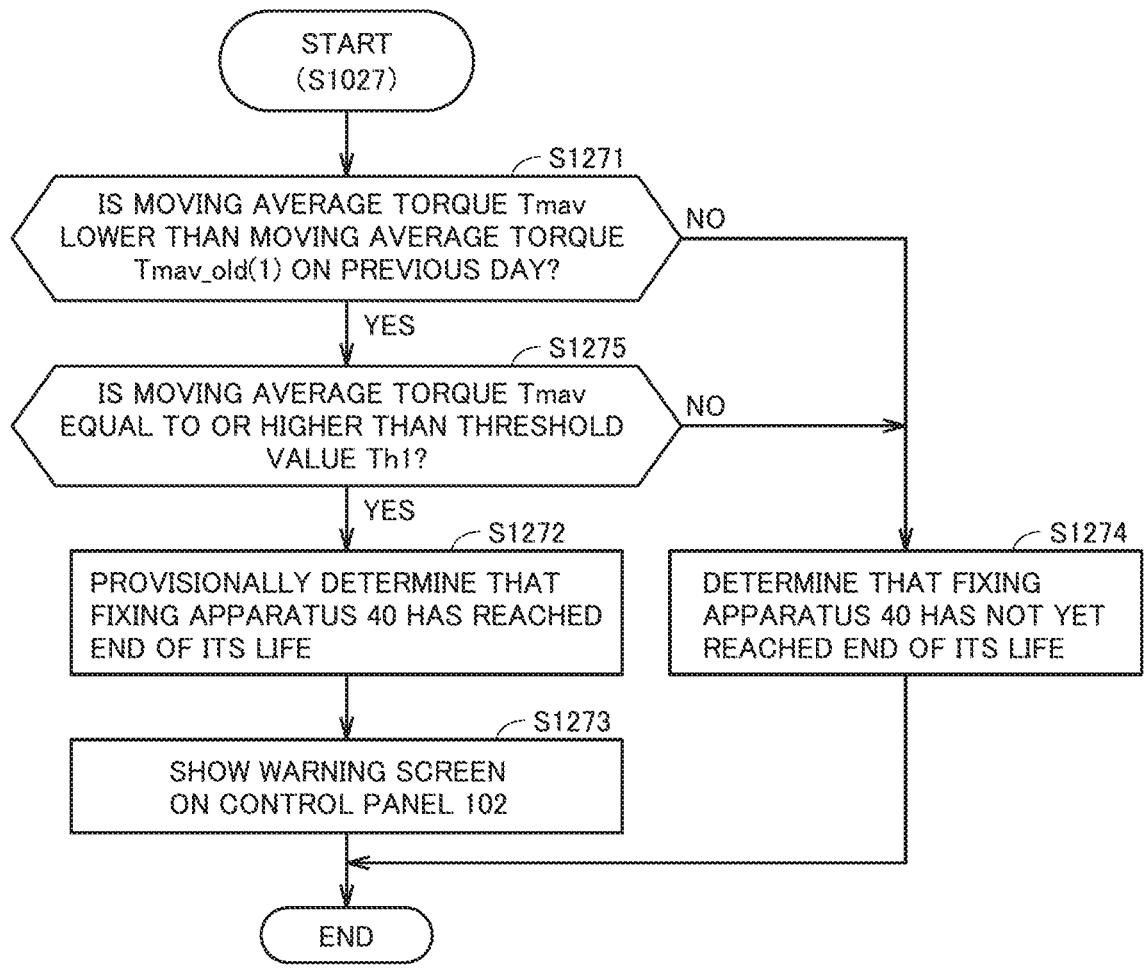
FIG. 41 is a flowchart for illustrating details of processing in step S1027 in FIG. 39 in the present modification.

FIG. 41 is a flowchart for illustrating details of processing in step S1027 in FIG. 39 in the present modification.

The flowchart in FIG. 41 is different from the flowchart shown in FIG. 40 in including step S1275. Specifically, when control device 101 determines in step S1271 that the moving average torque is lower than the moving average torque on the previous day (YES in step S1271), the control device determines in step S1275 whether or not moving average torque Tmav is equal to or higher than threshold value Th1. Threshold value Th1 is assumed as a positive value.

When control device 101 determines that moving average torque Tmav is equal to or higher than threshold value Th1 (YES in step S1275), the process proceeds to step S1272. When control device 101 determines that moving average torque Tmav is lower than threshold value Th1 (NO in step S1275), the process proceeds to step S1274.

(d2. Second Modification)

Figure 42:
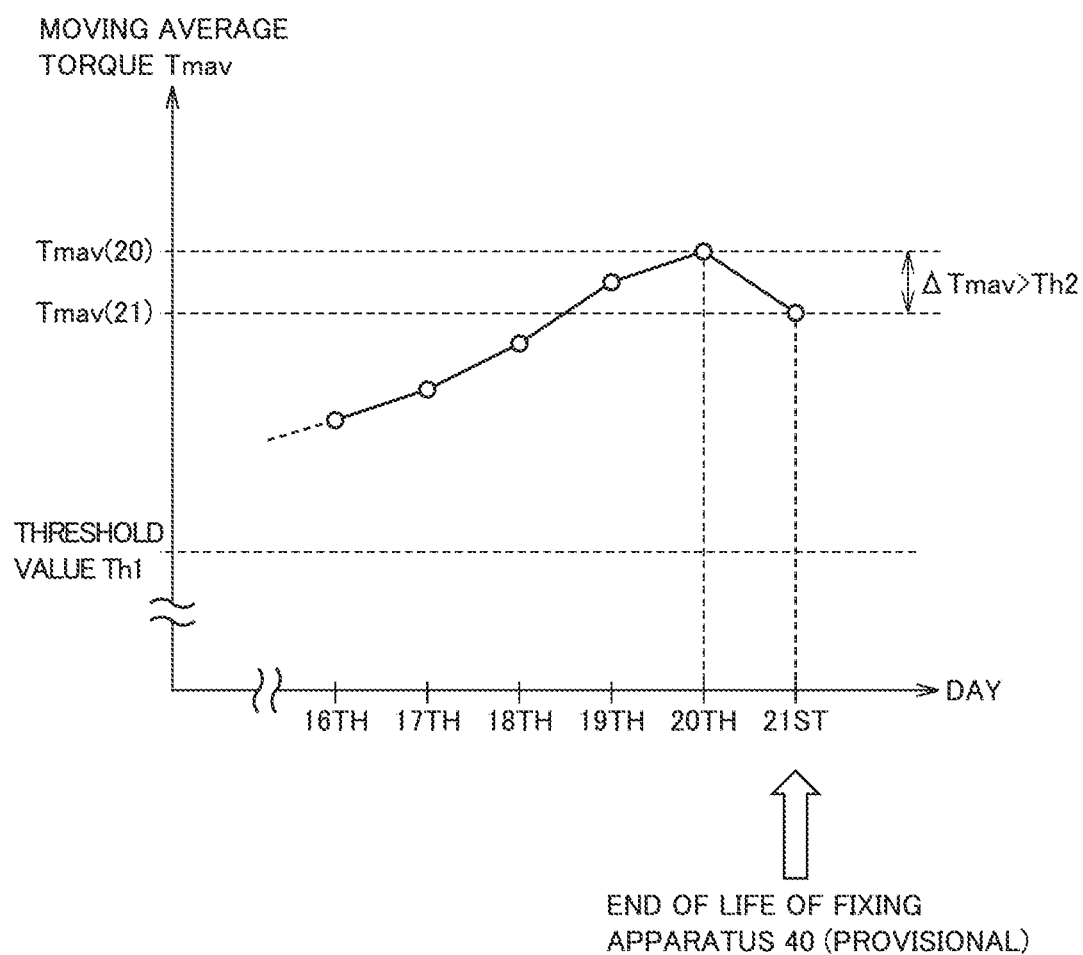
FIG. 42 is a diagram showing variation over time in moving average torque.

FIG. 42 is a diagram showing variation over time in moving average torque.

When variation over time in moving average torque Tmav turns from increase to decrease, control device 101 provisionally determines that fixing apparatus 40 has reached the end of its life on condition that amount of lowering ΔTmav is equal to or larger than threshold value Th2. Specifically, even though variation over time in moving average torque Tmav turns from increase to decrease, control device 101 does not determine that fixing apparatus 40 has reached the end of its life when amount of lowering ΔTmav is smaller than threshold value Th2.

The reason why determination above based on threshold value Th2 is made is because the value of moving average torque Tmav may turn to decrease due to noise or the like.

Figure 43:
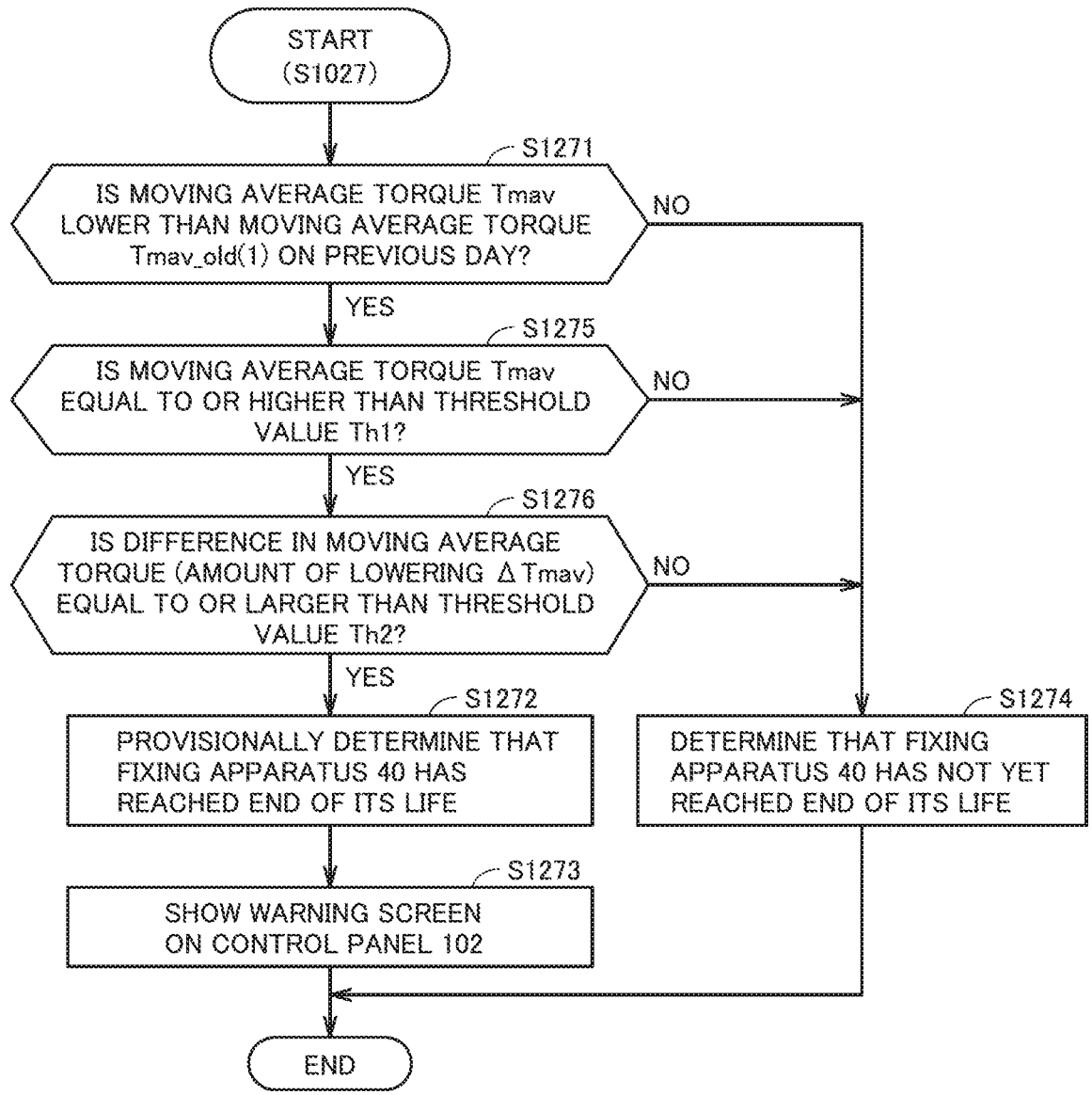
FIG. 43 is a flowchart for illustrating details of processing in step S1027 in FIG. 39.

FIG. 43 is a flowchart for illustrating details of processing in step S1027 in FIG. 39.

The flowchart in FIG. 43 is different from the flowchart shown in FIG. 41 in including step S1276. Specifically, when control device 101 determines in step S1275 that the moving average torque is equal to or higher than threshold value Th1 (YES in step S1275), the control device determines in step S1276 whether or not a difference between moving average torque Tmav and moving average torque Tmav_old(1) (that is, amount of lowering ΔTmav in moving average torque Tmav) is equal to or larger than threshold value Th2. The difference is expressed as an absolute value. Threshold value Th2 is assumed as a positive value.

When control device 101 determines that amount of lowering ΔTmav is equal to or larger than threshold value Th2 (YES in step S1276), the process proceeds to step S1272. When control device 101 determines that amount of lowering ΔTmav is smaller than threshold value Th2 (NO in step S1276), the process proceeds to step S1274.

Determination processing in step S1275 does not have to be performed. Specifically, when control device 101 determines in step S1271 that the moving average torque is lower than the moving average torque on the previous day (YES in step S1271), the process may directly proceed to step S1276.

(d3. Third Modification)

Figure 44:
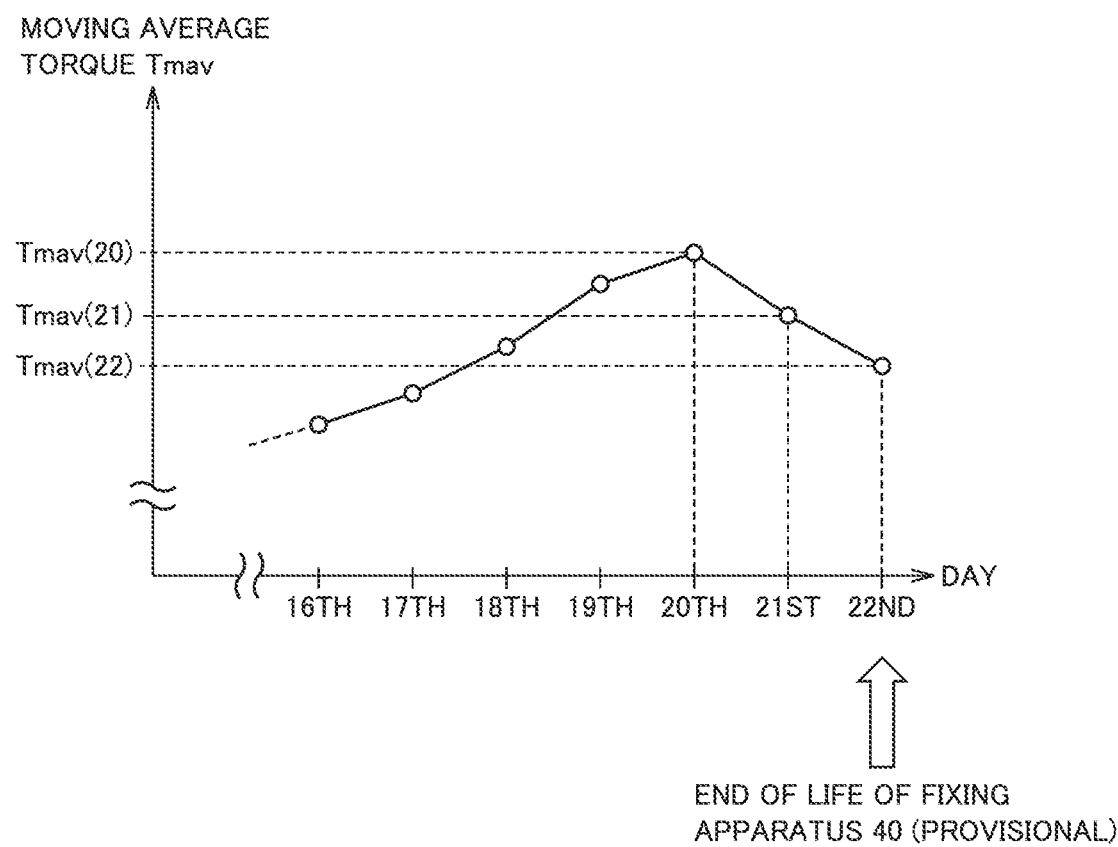
FIG. 44 is a diagram showing variation over time in moving average torque.

FIG. 44 is a diagram showing variation over time in moving average torque.

When variation over time in moving average torque Tmav turns from increase to decrease (that is, calculated moving average torque is lower than moving average torque calculated the previous time), control device 101 provisionally determines that fixing apparatus 40 has reached the end of its life on condition that moving average torque calculated the previous time is lower than moving average torque calculated the previous time but one. Specifically, control device 101 provisionally determines that fixing apparatus 40 has reached the end of its life on condition that moving average torque Tmav has lowered consecutively two times. According to such determination processing, accuracy in determination of the end of life of fixing apparatus 40 can be improved.

Figure 45:
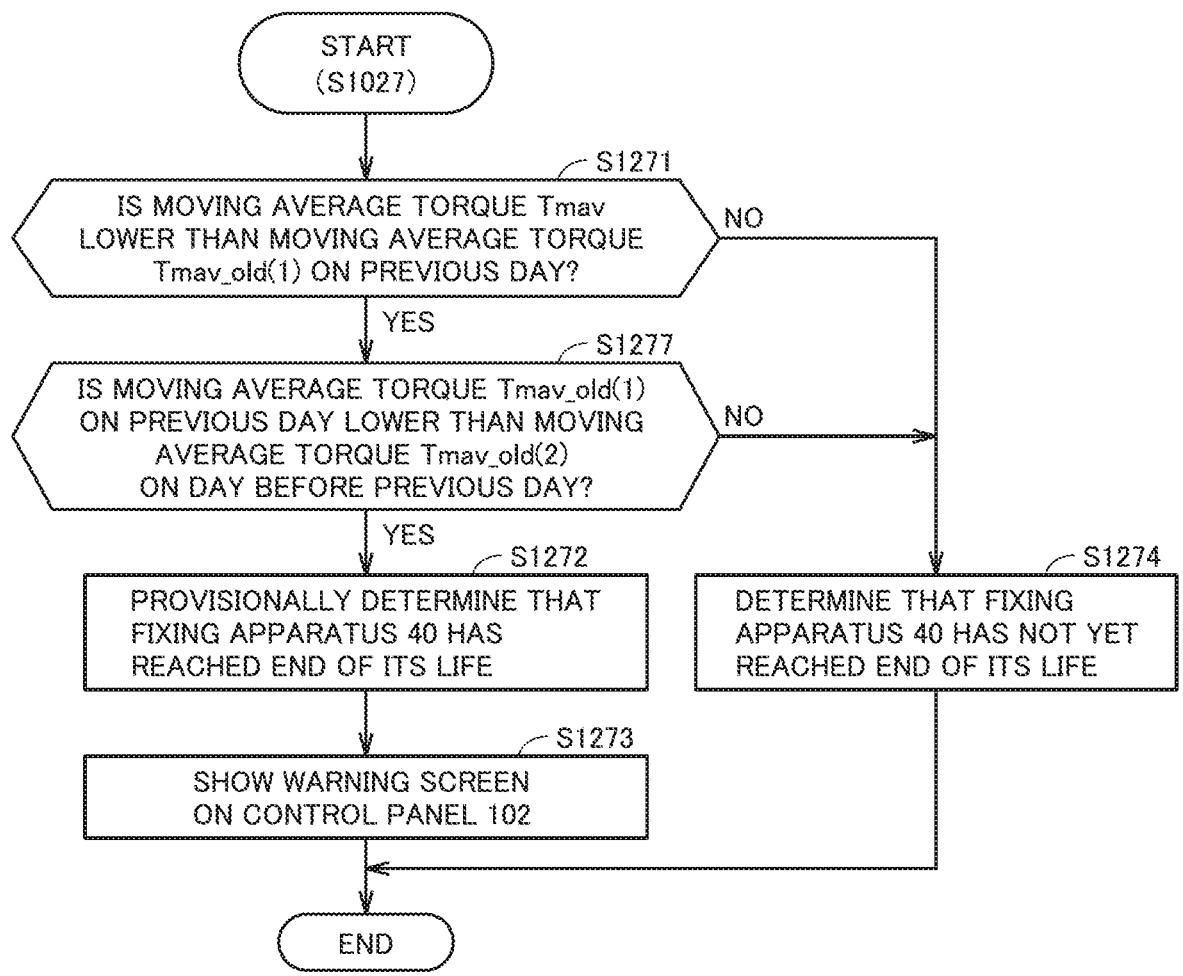
FIG. 45 is a flowchart for illustrating details of processing in step S1027 in FIG. 39.

FIG. 45 is a flowchart for illustrating details of processing in step S1027 in FIG. 39 in the present modification.

The flowchart in FIG. 45 is different from the flowchart shown in FIG. 40 in including step S1277. Specifically, when control device 101 determines in step S1271 that the moving average torque is lower than the moving average torque on the previous day (YES in step S1271), the control device determines in step S1277 whether or not moving average torque Tmav_old(1) on the previous day is lower than moving average torque Tmav_old(2) on the day before the previous day.

When control device 101 determines that moving average torque Tmav_old(1) is lower than moving average torque Tmav_old(2) (YES in step S1277), the process proceeds to step S1272. When control device 101 determines that moving average torque Tmav_old(1) is not lower than moving average torque Tmav_old(2) (NO in step S1277), the process proceeds to step S1274.

(d4. Fourth Modification)

In the example above, from a point of view of improvement in accuracy in determination of the end of life, attention is paid to variation over time in moving average torque Tmav. Specifically, control device 101 provisionally determines that fixing apparatus 40 has reached the end of its life based on variation over time in moving average torque Tmav turning from increase to decrease.

Torque used for provisional determination, however, is not limited to moving average torque Tmav. Average torque Tav may be employed instead of moving average torque Tmav. Alternatively, torque Tq may be employed instead of moving average torque Tmav.

(1) Determination of End of Life Based on Average Torque Tav

Average torque calculator 1152 of control device 101 calculates an average value (average torque Tav) of torque obtained five times in accordance with the expression (7) described above.

In the present modification, life determination unit 1154 of control device 101 provisionally determines whether or not fixing apparatus 40 has reached the end of its life based on torque Tg (average torque Tav in the present example). Specifically, life determination unit 1154 provisionally determines that fixing apparatus 40 has reached the end of its life based on variation over time in average torque Tav turning from increase to decrease.

More specifically, each time a prescribed period (for example, one day) elapses, control device 101 obtains torque from driving apparatus 410 a plurality of times and calculates an average value (average torque Tav) of torque obtained the plurality of times. When calculated average torque Tav is lower than average torque Tav calculated previously, control device 101 provisionally determines that fixing apparatus 40 has reached the end of its life.

Even though the end of life of fixing apparatus 40 is provisionally determined based on variation over time in average torque Tav as above, processing as in the first modification, the second modification, and the third modification as described above is applicable.

Application of the first modification to the present example is as below. When variation over time in average torque Tav turns from increase to decrease, control device 101 provisionally determines that fixing apparatus 40 has reached the end of its life on condition that average torque Tav is equal to or higher than predetermined threshold value Th1'.

Application of the second modification to the present example is as below. When variation over time in average torque Tav turns from increase to decrease, control device 101 provisionally determines that fixing apparatus 40 has reached the end of its life on condition that amount of lowering ΔTav is equal to or larger than threshold value Th2'. Amount of lowering ΔTav in this case refers to a difference between average torque Tav and average torque Tav_old(1) on the previous day.

Application of the third modification to the present example is as below. When variation over time in average torque Tav turns from increase to decrease (that is, calculated average torque Tav is lower than average torque Tav calculated the previous time), control device 101 provisionally determines that fixing apparatus 40 has reached the end of its life on condition that average torque Tav calculated the previous time is lower than average torque Tav calculated the previous time but one.

Since calculation of moving average torque Tmav is not necessary in the present example, control device 101 does not have to include moving average torque calculator 1153 shown in FIG. 36.

(2) Provisional Determination of End of Life Based on Torque Tq

In the present modification, life determination unit 1154 of control device 101 provisionally determines whether or not fixing apparatus 40 has reached the end of its life based on torque Tg (torque Tq in the present example). Specifically, life determination unit 1154 provisionally determines that fixing apparatus 40 has reached the end of its life based on variation over time in torque Tq turning from increase to decrease.

More specifically, control device 101 obtains torque once from driving apparatus 410 each time a prescribed period (for example, one day) elapses. When torque Tq is lower than previous torque Tq (torque Tq on the previous day), control device 101 provisionally determines that fixing apparatus 40 has reached the end of its life.

Even though the end of life of fixing apparatus 40 is provisionally determined based on variation over time in torque Tq as above, processing as in the first modification, the second modification, and the third modification as described above is applicable.

Application of the first modification to the present example is as below. When variation over time in torque Tq turns from increase to decrease, control device 101 provisionally determines that fixing apparatus 40 has reached the end of its life on condition that torque Tq is equal to or higher than predetermined threshold value Th1".

Application of the second modification to the present example is as below. When variation over time in torque Tq turns from increase to decrease, control device 101 provisionally determines that fixing apparatus 40 has reached the end of its life on condition that amount of lowering ΔTq is equal to or larger than threshold value Th2". Amount of lowering ΔTq in this case refers to a difference between torque Tq and torque Tq_old(1) on the previous day.

Application of the third modification to the present example is as below. When variation over time in torque Tq turns from increase to decrease (that is, detected torque Tq is lower than torque Tq detected the previous time), control device 101 provisionally determines that fixing apparatus 40 has reached the end of its life on condition that torque Tq obtained the previous time is lower than torque Tq detected the previous time but one.

Since calculation of average torque Tav and moving average torque Tmav is not necessary in the present example, control device 101 does not have to include average torque calculator 1152 and moving average torque calculator 1153 shown in FIG. 36.

(d5. Fifth Modification)

In order to extend the life of fixing apparatus 40, control device 101 may shorten set time period TC2 on condition that variation over time in obtained torque Tq turns from increase to decrease.

Embodiment 8

A difference of an image forming apparatus according to the present embodiment from Embodiment 7 will be described below. The image forming apparatus according to the present embodiment is similar in hardware configuration to image forming apparatus 100 in Embodiment 7. Data processing performed by control device 101 is different from data processing in Embodiment 7. Therefore, description will be given below with attention being paid to data processing performed by control device 101.

In Embodiment 7, each time a prescribed period (for example, one day) elapses, control device 101 obtains torque Tq a plurality of times from driving apparatus 410 and calculates an average value (average torque Tav) of torque Tq obtained the plurality of times.

In the present embodiment, each time a running distance of pressurization roller 408 increases by a prescribed distance, torque Tq is obtained from driving apparatus 410 a plurality of times and an average value (which is referred to as "average torque Tav" also in the present embodiment) of torque Tq obtained the plurality of times is calculated.

The running distance is calculated as below. Initially, control device 101 obtains information on a rotation speed of pressurization roller 408 from driving apparatus 410. Thereafter, control device 101 calculates the running distance by multiplying the rotation speed by a duration of rotation of pressurization roller 408.

<A. Functional Configuration>

Figure 46:
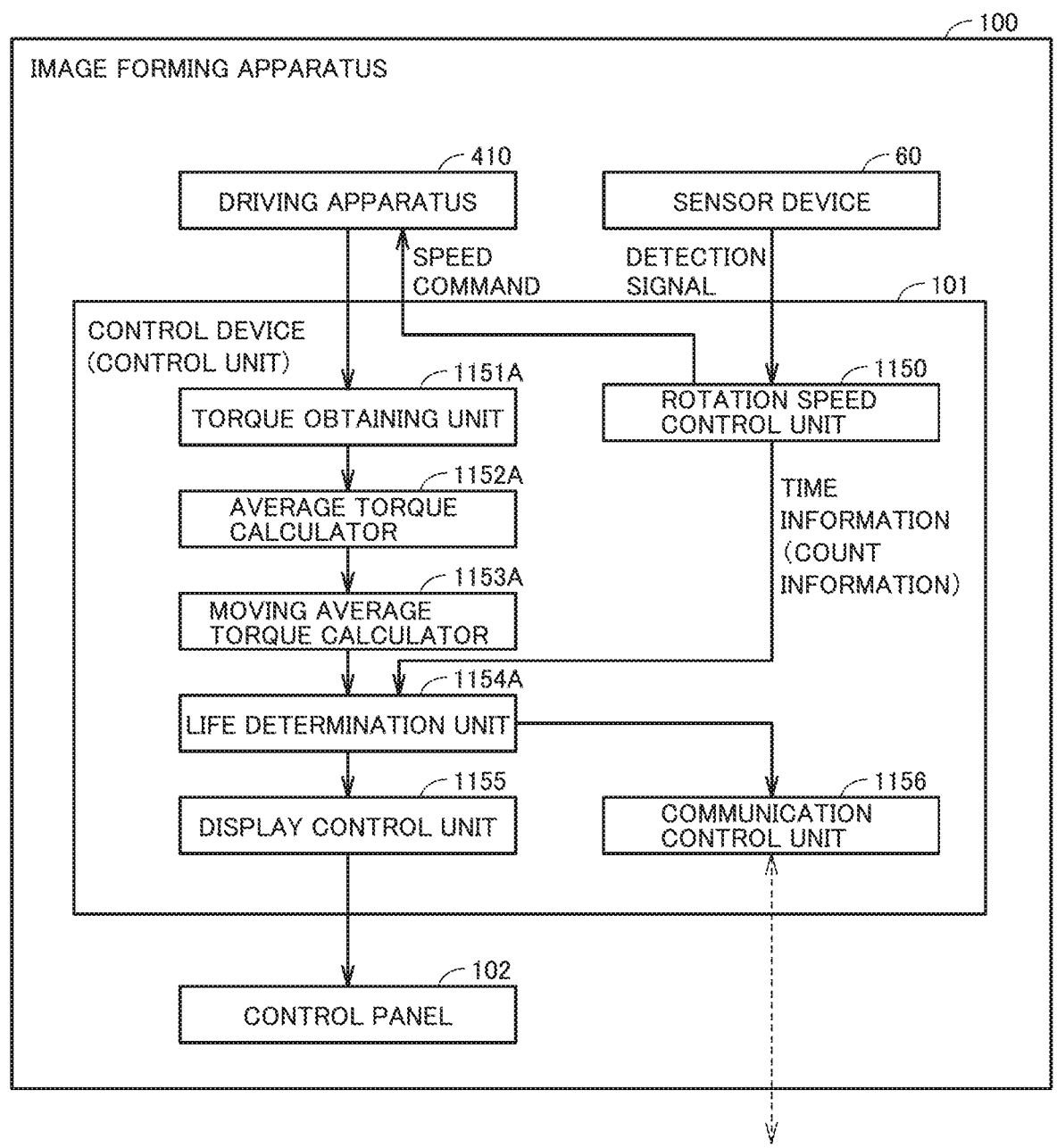
FIG. 46 is a functional block diagram representing a functional configuration of the control device.

FIG. 46 is a functional block diagram representing a functional configuration of control device 101.

Image forming apparatus 100 includes control device 101, driving apparatus 410, and control panel 102.

Control device 101 includes rotation speed control unit 1150, a torque obtaining unit 1151A, an average torque calculator 1152A, a moving average torque calculator 1153A, a life determination unit 1154A, display control unit 1155, and communication control unit 1156.

Torque obtaining unit 1151A obtains torque Tq (a value of torque) from driving apparatus 410. Specifically, torque obtaining unit 1151A obtains from driving apparatus 410, torque Tq detected by driving apparatus 410 each time a running distance of pressurization roller 408 increases by a prescribed distance. An example in which a prescribed distance is set to "10 km" will be described below.

Torque obtaining unit 1151A obtains torque Tq from driving apparatus 410 as being triggered by increase in running distance by 10 km. Typically, after increase in running distance by 10 km is detected, torque obtaining unit 1151A obtains from driving apparatus 410, torque five times at the maximum within the same day on which detection was conducted. Specifically, torque obtaining unit 1151A obtains torque from driving apparatus 410 during a period over which pressurization roller 408 is in contact with fixing belt 402 as shown in FIG. 3 in Disclosure I and no paper is passing.

More specifically, torque obtaining unit 1151A obtains from driving apparatus 410, torque Tq detected after warm-up of image forming apparatus 100, similarly to torque obtaining unit 1151 in Embodiment 7.

As set forth above, "increase in running distance by 10 km" and "after warm-up of image forming apparatus 100" are defined as the "predetermined condition" in the present example. As described also in Embodiment 7, control device 101 may obtain from driving apparatus 410, torque Tq detected after fixation onto paper S, instead of "after warm-up of image forming apparatus 100."

Torque (a value of torque) obtained five times from driving apparatus 410 by torque obtaining unit 1151A is referred to as Tq(m[1]), Tq(m[2.]), Tq(m[3]), Tq(m[4]), and Tq(m[5]). m is a variable for identifying every ten-kilometer distance. Each time the running distance increases by 10 km, the value of m increases by one.

Torque obtaining unit 1151A sends torque obtained five times to average torque calculator 1152A.

Average torque calculator 1152A calculates an average value of torque every prescribed distance. Specifically, average torque calculator 1152A calculates an average value (which is referred to as "average torque Tav" below) of torque obtained five times as shown with an expression (10) below. The expression (10) is the same as the expression (4) shown in Disclosure I.

$$Tav'(m)=(Tq(m[1])+Tq(m[2])+Tq(m[3])+Tq(m[4])+Tq(m[5]))\div 5 \quad (10)$$

Average torque calculator 1152A sends calculated average torque Tav'(m) to moving average torque calculator 1153A.

Moving average torque calculator 1153A calculates moving average torque Tmav' (a moving average value) by using average torque Tav' obtained five times. Specifically, moving average torque calculator 1153A calculates moving average torque Tmav'(m) by using average torque Tav'(m) on this day and average torque obtained four times most recently (Tav'(m−4), Tav'(m−3), Tav'(m−2), and Tav'(m−1)). Specifically, moving average torque calculator 1153A performs calculation shown in an expression (11) below. The expression (11) is the same as the expression (5) shown in Disclosure I.

$$Tmav'(m)=(Tav'(m-4)+Tav'(m-3)+Tav'(m-2)+Tav'(m-1)+Tav'(m))\div 5 \quad (11)$$

Moving average torque calculator 1153A sends calculated moving average torque Tmav'(m) to life determination unit 1154A. Though moving average torque Tmav' is calculated by using average torque Tav' obtained five times (five pieces), the number of pieces of average torque Tav' is not limited to five.

Life determination unit 1154A provisionally determines whether or not fixing apparatus 40 has reached the end of its life. Specifically, life determination unit 1154A provisionally determines whether or not fixing apparatus 40 has reached the end of its life based on time information (or count information) obtained from rotation speed control unit 1150 and moving average torque Tmav'. More specifically, life determination unit 1154A provisionally determines that fixing apparatus 40 has reached the end of its life based on variation over time in moving average torque Tmav' turning from increase to decrease. Life determination unit 1154A determines (finally determines in the present embodiment) whether or not fixing apparatus 40 has reached the end of its life based on time information (or count information) obtained from rotation speed control unit 1150 as described in Embodiment 6, on condition that the life determination unit has provisionally determined that fixing apparatus 40 had reached the end of its life.

Figure 47:
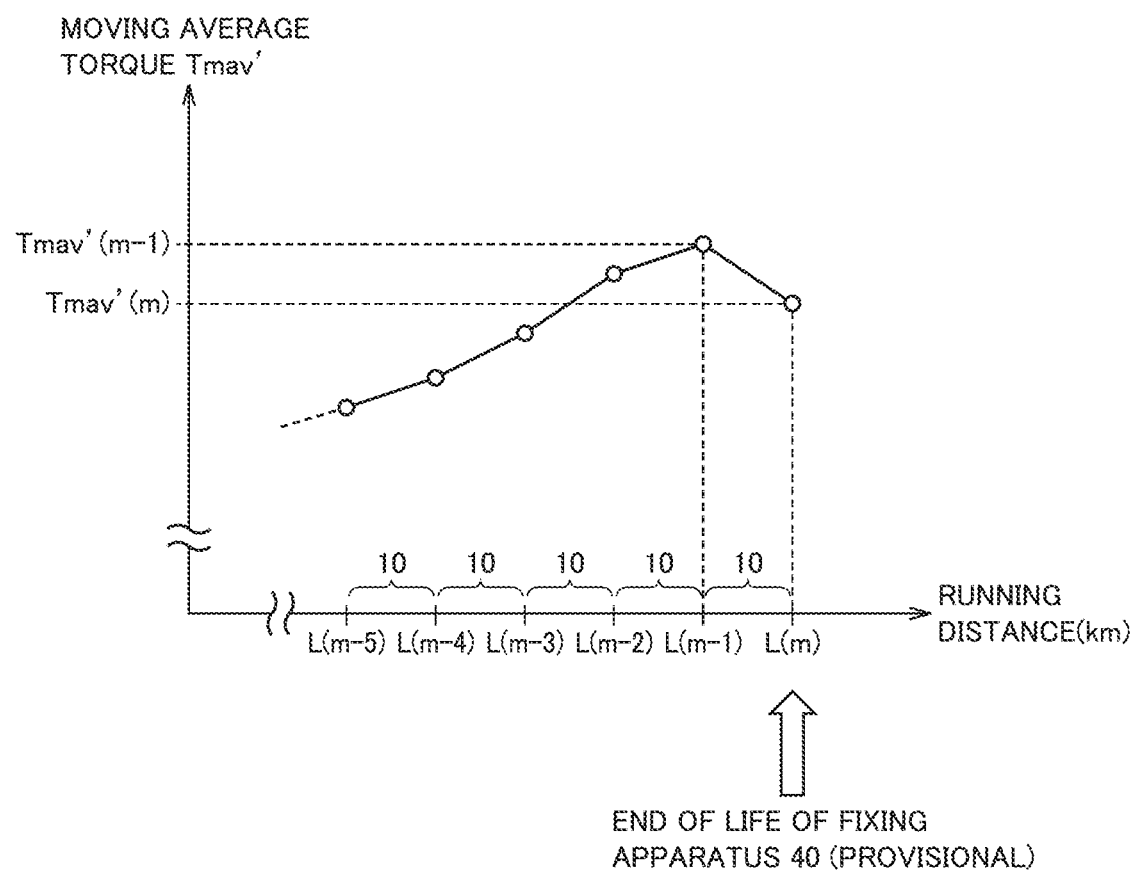
FIG. 47 is a diagram showing variation over time in moving average torque.

FIG. 47 is a diagram showing variation over time in moving average torque Tmav'.

The abscissa in the graph (figure) represents a running distance (km) and the ordinate in the graph represents moving average torque Tmav'.

Moving average torque Tmav' monotonously increases until distance L(m−1). Moving average torque Tmav'(m) at distance L(m) is lower than moving average torque Tmav'(m−1) at previous distance L(m−1). In other words, relation of "Tmav'(m−1)>Tmav'(m)" is satisfied.

Therefore, life determination unit 1154A provisionally determines that fixing apparatus 40 has reached the end of its life at the time point when distance L(m) is reached (specifically, the time point of calculation of Tmav'(m)). When life determination unit 1154A provisionally determines that the fixing apparatus has reached the end of its life, it gives a prescribed notification to display control unit 1155.

When display control unit 1155 accepts a prescribed notification from life determination unit 1154A, it controls control panel 102 to show a prescribed warning screen (see FIG. 7 in Disclosure I).

<B. Summary>

Driving apparatus 410 drives motor 409 so as to maintain the rotation speed of pressurization roller 408 constant based on a command from control device 101. Driving apparatus 410 detects torque at the time when it drives motor 409.

Control device 101 obtains detected torque Tq from driving apparatus 410. Control device 101 provisionally determines that fixing apparatus 40 has reached the end of its life based on variation over time in torque Tg (in the present example, moving average torque Tmav') turning from increase to decrease.

Specifically, each time the running distance of pressurization roller 408 increases by a prescribed distance (10 km in the present example), control device 101 obtains torque Tq from driving apparatus 410 a plurality of times and calculates an average value (average torque Tav') of torque Tq obtained the plurality of times. Control device 101 calculates a moving average value (moving average torque Tmav') by using calculated average torque Tav' and at least average torque Tav' calculated previously. When calculated moving average torque Tmav' is lower than moving average torque Tmav' calculated previously, control device 101 provisionally determines that fixing apparatus 40 has reached the end of its life.

According to such a configuration, an effect described in Embodiment 7 can be obtained also in the present embodiment.

<C. Control Structure>

Processing shown in FIG. 38 is performed also in the present embodiment as in Embodiment 7.

Figure 48:
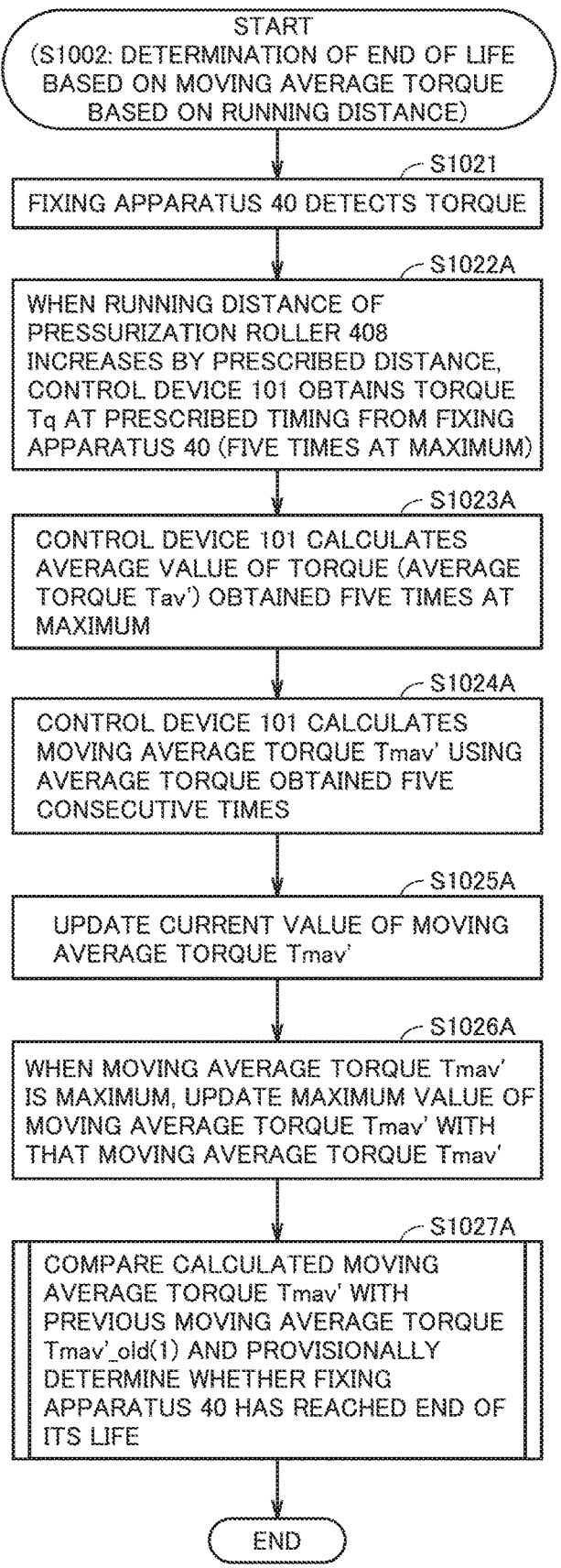
FIG. 48 is a flowchart for illustrating details of processing in step S1002 in FIG. 38.

FIG. 48 is a flowchart for illustrating details of processing in step S1002 in FIG. 38.

In step S1021, fixing apparatus 40 successively detects torque Tq of pressurization roller 408. In step S1022A, control device 101 obtains torque Tq at prescribed timing from fixing apparatus 40 each time the running distance of pressurization roller 408 increases by a prescribed distance. As described above, control device 101 obtains from driving apparatus 410, for example, torque Tq detected after warm-up of image forming apparatus 100.

In step S1023A, control device 101 calculates an average value (average torque Tav') of torque Tq obtained five times at the maximum on the same day. Specifically, control device 101 performs calculation in the expression (10) described above. In step S1024A, control device 101 calculates moving average torque Tmav' by using five consecutive average values.

In step S1025A, control device 101 updates a current value (a value of a variable) of moving average torque Tmav' with the value calculated in step S1024A. In step S1026A, when moving average torque Tmav' is maximum, control device 101 updates the maximum value (the value of the variable) of moving average torque Tmav' with that moving average torque Tmav'. The maximum value of moving average torque Tmav' is reset (typically, set to zero) after fixing apparatus 40 is replaced. Therefore, the maximum value is a maximum value after replacement of fixing apparatus 40.

In step S1027A, control device 101 compares calculated moving average torque Tmav' with previous moving average torque Tmav'_old(1) and provisionally determines whether or not fixing apparatus 40 has reached the end of its life.

Referring to the expression (11), previous moving average torque Tmav'_old(1) is calculated in an expression (12) below, with calculated moving average torque Tmav' being denoted as Tmav'(m). The expression (12) is the same as the expression (6) shown in Disclosure I.

$$Tmav'\_old(1)=Tmav'(m-1)=(Tav'(m-5)+Tav'(m-4)+Tav'(m-3)+Tav'(m-2)+Tav'(m-1))\div 5 \quad (12)$$

Figure 49:
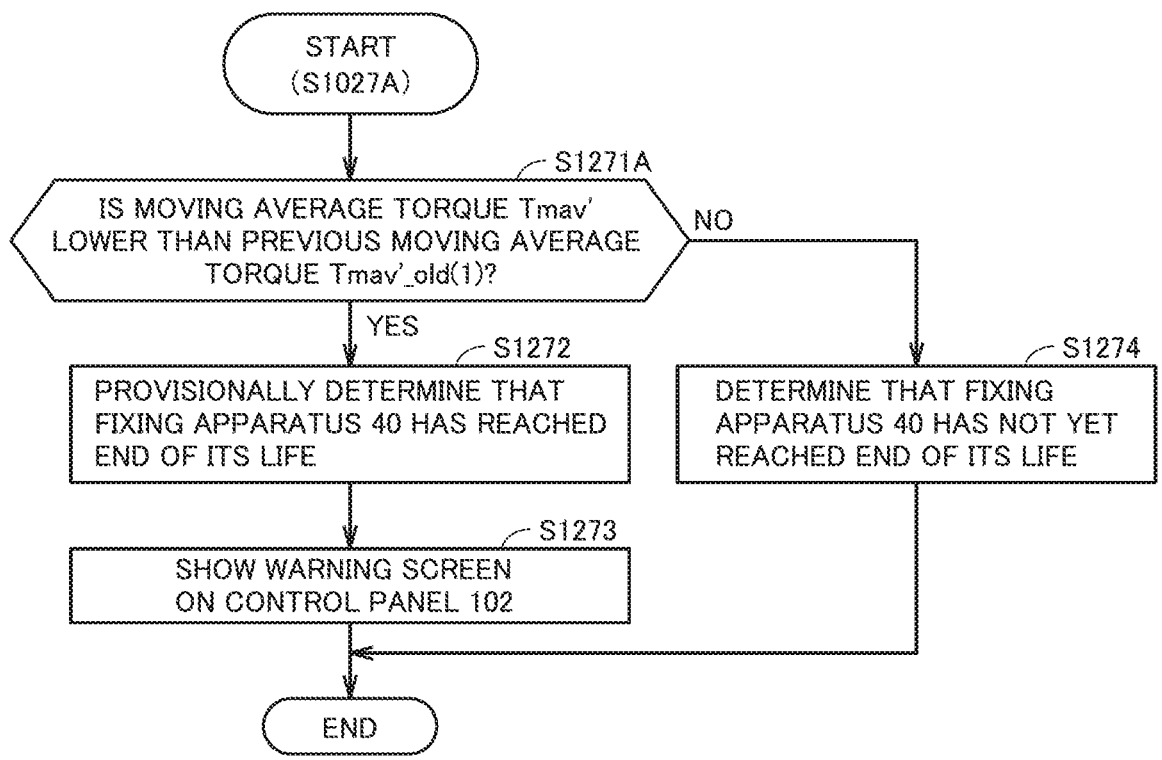
FIG. 49 is a flowchart for illustrating details of processing in step S1027A in FIG. 48.

FIG. 49 is a flowchart for illustrating details of processing in step S1027A in FIG. 48.

Control device 101 determines in step S1271A whether or not moving average torque Tmav' is lower than previous moving average torque Tmav'_old(1). When control device 101 determines that the moving average torque is lower than the previous moving average torque (YES in step S1271A), the control device provisionally determines in step S1272 that fixing apparatus 40 has reached the end of its life. As shown in FIG. 7 in Disclosure I, control device 101 controls control panel 102 to show the warning screen in step S1273.

When control device 101 determines that the moving average torque is not lower than the previous moving average torque (NO in step S1271A), control device 101 determines in step S1274 that fixing apparatus 40 has not yet reached the end of its life.

<D. Modification>

Each processing (the first modification to the fifth modification) shown in "<D. Modification>" in Embodiment 7 is applicable also in the present embodiment.

For example, application of "(d4. Fourth Modification)" is as below.

Control device 101 may provisionally determine that fixing apparatus 40 has reached the end of its life when the calculated average value (average torque Tav') is smaller than the average value calculated previously.

Alternatively, control device 101 may provisionally determine that fixing apparatus 40 has reached the end of its life when obtained torque Tq is lower than torque Tq obtained previously.

Embodiment 9

The present embodiment is different from Embodiment 7 and Embodiment 8 in determination of the end of life after it is determined that the torque determination permission mode has been set, which will be described below.

Figure 50:
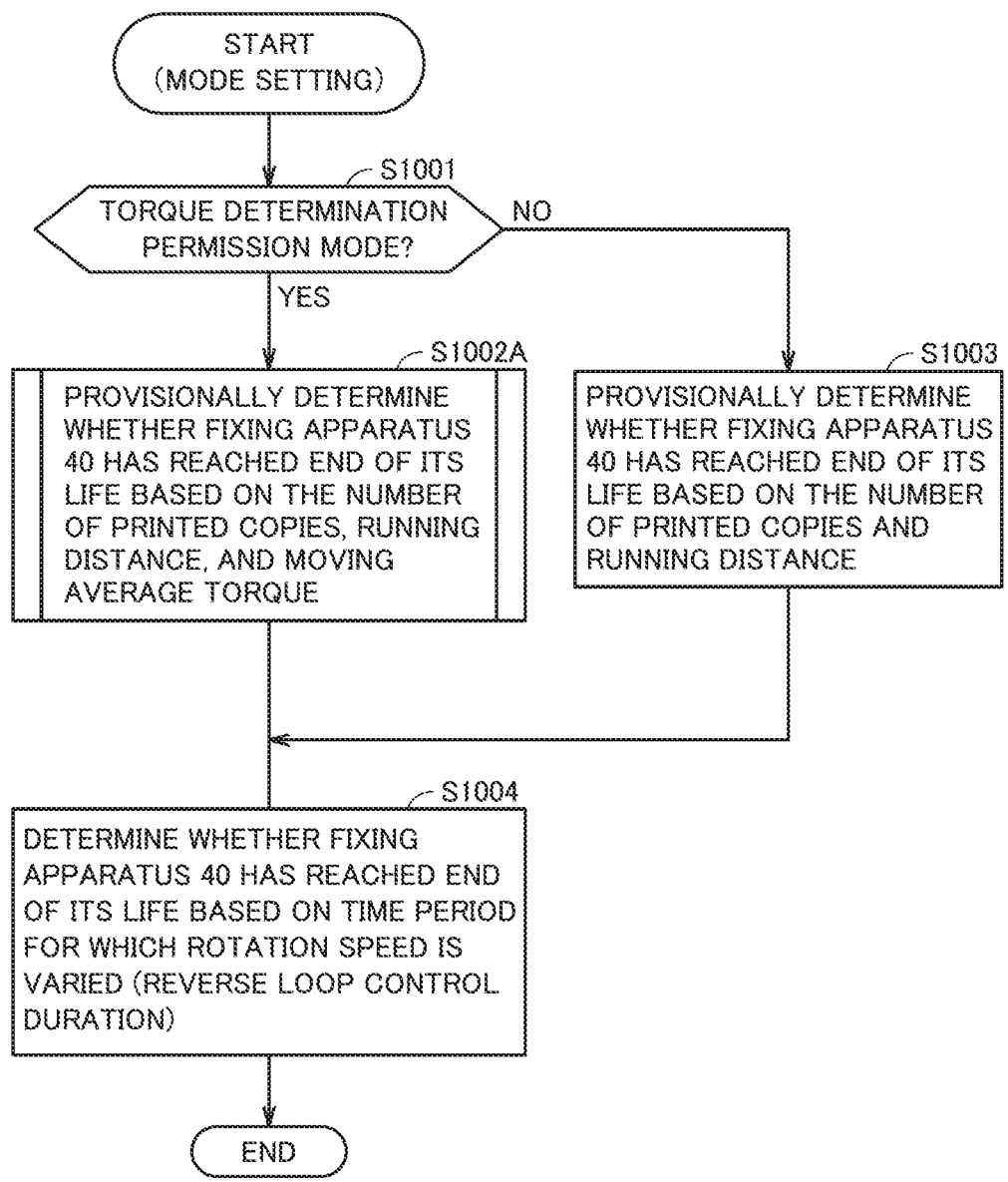
FIG. 50 is a flowchart for illustrating a flow of processing performed in the image forming apparatus.

FIG. 50 is a flowchart for illustrating a flow of processing performed in image forming apparatus 100.

Control device 101 determines in step S1001 whether or not the torque determination permission mode has been set as a mode of determining the end of life of fixing apparatus 40.

When control device 101 determines that the torque determination permission mode has been set (YES in step S1001), the control device provisionally determines in step S1002A whether or not fixing apparatus 40 has reached the end of its life based on the number of printed copies in image forming apparatus 100 and the running distance of pressurization roller 408 as well as on moving average torque Tmav'.

When control device 101 determines that the torque determination permission mode has not been set (NO in step S1001), the control device provisionally determines in step S1003 whether or not fixing apparatus 40 has reached the end of its life based on the number of printed copies in image forming apparatus 100 and the running distance of pressurization roller 408.

As shown in step S1002A, in the present embodiment, when the torque determination permission mode has been set, the end of life of fixing apparatus 40 is provisionally determined in consideration not only of moving average torque Tmav' but also the number of printed copies and the running distance of pressurization roller 408. Therefore, control device 101 can more accurately determine the end of life in the torque determination permission mode.

Embodiment 10

A configuration in which an image forming apparatus and a server apparatus (an information processing apparatus) cooperate to determine the end of life of fixing apparatus 40 will be described in the present embodiment. The configuration according to the present embodiment can be combined as appropriate with Embodiments 6 to 9.

As shown in FIG. 22 in Disclosure I, information processing system 1 includes image forming apparatus 100 and server apparatus 900. Image forming apparatus 100 and server apparatus 900 are communicatively connected to each other over network 901. Image forming apparatus 100 communicates with server apparatus 900 by means of communication control unit 1156 (see FIG. 36).

In information processing system 1, server apparatus 900 obtains torque Tq detected in driving apparatus 410 through network 901. Server apparatus 900 calculates average torque Tav (or Tav') and moving average torque Tmav (or Tmav'). Furthermore, server apparatus 900 determines the end of life of fixing apparatus 40 based on moving average torque Tmav (or Tmav').

According to such a configuration as well, an effect similar to the effect described in Embodiments 6 to 9 is obtained.

Information processing system 1 may be configured such that image forming apparatus 100 calculates moving average torque Tmav' (or Tmav) and server apparatus 900 determines the end of life.

Embodiment 11

Though driving apparatus 410 detects torque at the time when motor 409 is driven in each embodiment above, limitation thereto is not intended. For example, control device 101 may detect torque at the time when motor 409 is driven. Alternatively, a not-shown device within image forming apparatus 100 may detect torque at the time when motor 409 is driven.

Image forming apparatus 100 should only perform at least a function to detect torque at the time when motor 409 is driven. Specifically, torque detector 413 shown in FIG. 4 in Disclosure I should only be provided somewhere in image forming apparatus 100. Specifically, torque detector 413 may be located within or outside fixing apparatus 40. Such a function to detect torque can be implemented, for example, by at least one processor.

When image forming apparatus 100 determines the end of life of fixing apparatus 40, control device 101 should only obtain torque at the time when motor 409 is driven each time a predetermined condition is satisfied, and determine the end of life of fixing apparatus 40 based on a time period for which the rotation speed of pressurization roller 408 is varied, on condition that variation over time in obtained torque turns from increase to decrease.

Alternatively, when server apparatus 900 determines the end of life of fixing apparatus 40, server apparatus (information processing apparatus) 900 may obtain torque at the time when motor 409 is driven from image forming apparatus 100 each time a predetermined condition is satisfied, and determine the end of life of fixing apparatus 40 based on a time period for which the rotation speed of pressurization roller 408 is varied, on condition that variation over time in obtained torque turns from increase to decrease.

<Additional Aspect 1>

An image forming apparatus capable of enhancing accuracy in determination of the end of life of a fixing apparatus is provided. The image forming apparatus includes fixing apparatus 40 and a detector between a transfer unit and a rotatable pressurization member. The detector outputs a signal to a control unit when paper is deflected in a first direction and does not output a signal when paper is deflected in a second direction reverse to the first direction. While the control unit receives input of the signal, the control unit controls a rotation speed of the pressurization member to a first speed, and while the control unit does not receive input of the signal, the control unit controls the rotation speed of the pressurization member to a second speed lower than the first speed. While the control unit does not receive input of the signal for a first time period, the control unit varies the rotation speed of the pressurization member until it receives input of the signal. When a time period for which the rotation speed of the pressurization member is varied is equal to or longer than a second time period (TC2), the control unit determines that fixing apparatus 40 has reached the end of its life.

<Additional Aspect 2>

[Configuration 1]

An image forming apparatus including at least a fixing apparatus that fixes an unfixed image on a recording material onto the recording material and forms an image on the recording material, includes:

a transfer unit that transfers an image onto the recording material and transports the recording material downstream through a transportation path;

a pressurization member rotatable in a direction of transportation in the fixing apparatus, downstream in the transportation path, of the recording material transported from the transfer unit;

a detector that is provided between the transfer unit and the pressurization member and detects a state of the recording material; and a processor (control unit), when the recording material is deflected in a first direction, the detector outputs a predetermined signal to the processor, and when the recording material is deflected in a second direction reverse to the first direction, the detector does not output the signal to the processor, and the processor controls a rotation speed of the pressurization member to a first speed while the processor receives input of the signal, and controls the rotation speed of the pressurization member to a second speed lower than the first speed while the processor does not receive input of the signal, varies the rotation speed of the pressurization member until the processor receives input of the signal, while the processor does not receive the signal for a first time period, and determines that the fixing apparatus has reached the end of its life when a time period for which the processor varies the rotation speed of the pressurization member is equal to or longer than a second time period.

[Configuration 2]

The image forming apparatus described in configuration 1, wherein the processor varies the rotation speed of the pressurization member by switching the rotation speed of the pressurization member between the first speed and the second speed.

[Configuration 3]

The image forming apparatus described in configuration 2, wherein switching is made with a predetermined period, and when the number of times of switching of the rotation speed of the pressurization member is equal to or larger than the number of times determined by the period and the second time period, the processor determines that the fixing apparatus has reached the end of its life.

[Configuration 4]

The image forming apparatus described in any one of configurations 1 to 3, wherein the processor determines that the fixing apparatus has reached the end of its life on condition that a ratio of the number of times that a time period for which the rotation speed of the pressurization member is varied is equal to or longer than the second time period, of the number of times of control for varying the rotation speed of the pressurization member, is equal to or higher than a prescribed value.

[Configuration 5]

The image forming apparatus described in any one of configurations 1 to 4, wherein each time a prescribed period elapses or each time a running distance of the pressurization member increases by a prescribed distance, the processor makes determination as to the end of life of the fixing apparatus.

[Configuration 6]

The image forming apparatus described in any one of configurations 1 to 5, wherein the detector includes a lever and a photosensor, when the recording material is deflected in the second direction, the lever is located at a first position, and when the recording material is deflected in the first direction, the lever is moved from the first position to a second position by the recording material, and when the lever is located at the second position, the photosensor outputs the signal to the processor.

[Configuration 7]

The image forming apparatus described in any one of configurations 1 to 6, wherein on condition that a running distance of the pressurization member is equal to or longer than a predetermined distance, the processor makes determination as to the end of life of the fixing apparatus based on a time period for which the rotation speed of the pressurization member is varied.

[Configuration 8]

The image forming apparatus described in any one of configurations 1 to 7 further includes:

a fixing belt that forms, as being opposed to the pressurization member, a nip region where the unfixed image is fixed, and is rotated as following rotation of the pressurization member;

a support member that is arranged on an inner side of the fixing belt and slidably supports the fixing belt at a position opposed to the pressurization member against a pressure applied by the pressurization member;

a motor that rotates the pressurization member; and a driving unit that drives the motor, and the processor obtains torque of the motor at the time when the motor is driven each time a predetermined condition is satisfied, and makes determination as to the end of life of the fixing apparatus based on a time period for which a rotation speed of the pressurization member is varied, on condition that variation over time in obtained torque turns from increase to decrease.

[Configuration 9]

The image forming apparatus described in configuration 8, wherein the predetermined condition is increase in running distance of the pressurization member by a prescribed distance, and the processor obtains the torque a plurality of times each time the running distance of the pressurization member increases by the prescribed distance and calculates an average value of torque obtained the plurality of times, calculates a moving average value by using the calculated average value and at least the average value calculated previously, and makes determination as to the end of life of the fixing apparatus based on a time period for which a rotation speed of the pressurization member is varied, on condition that the calculated moving average value is smaller than the moving average value calculated previously.

[Configuration 10]

The image forming apparatus described in configuration 8, wherein the predetermined condition is lapse of a prescribed period, and the processor obtains the torque a plurality of times each time the prescribed period elapses and calculates an average value of torque obtained the plurality of times, calculates a moving average value by using the calculated average value and at least the average value calculated previously, and makes determination as to the end of life of the fixing apparatus based on a time period for which a rotation speed of the pressurization member is varied, on condition that the calculated moving average value is smaller than the moving average value calculated previously.

[Configuration 11]

The image forming apparatus described in configuration 9, wherein the processor obtains information on the rotation speed of the pressurization member, and calculates the running distance by multiplying the rotation speed by a duration of rotation of the pressurization member.

[Configuration 12]

The image forming apparatus described in configuration 9, wherein the processor obtains as the torque, idle torque during a period over which no paper is passing, each time the running distance of the pressurization member increases by the prescribed distance.

[Configuration 13]

The image forming apparatus described in configuration 10, wherein the processor obtains as the torque, idle torque during a period over which no paper is passing, each time the prescribed period elapses.

[Configuration 14]

The image forming apparatus described in configuration 12 or 13, wherein the processor obtains torque detected after warm-up of the image forming apparatus or after fixation onto the recording material, as idle torque during the period over which no paper is passing.

[Configuration 15]

The image forming apparatus described in configuration 9 or 10, wherein the processor determines that the fixing apparatus has reached the end of its life on condition that the calculated moving average value is equal to or larger than a predetermined threshold value.

[Configuration 16]

The image forming apparatus described in any one of configurations 1 to 15, wherein when the processor determines that the fixing apparatus has reached the end of its life, the processor permits formation of an image using paper of a first type and does not permit formation of an image using paper of a second type smaller in basis weight than the paper of the first type.

[Configuration 17]

The image forming apparatus described in any one of configurations 1 to 16 further includes a control panel, and when the processor determines that the fixing apparatus has reached the end of its life, the processor controls the control panel to show a prescribed image.

[Configuration 18]

The image forming apparatus described in configuration 8, wherein the processor shortens the second time period on condition that variation over time in obtained torque turns from increase to decrease.

[Configuration 19]

The image forming apparatus described in any one of configurations 1 to 18, wherein when a time period for which a rotation speed of the pressurization member is varied is longer, the processor increases the rotation speed of the pressurization member.

[Configuration 20]
The image forming apparatus described in configuration 8, wherein
the processor increases load imposed by the pressurization member onto the support member when a time period for which a rotation speed of the pressurization member is varied is longer.

[Configuration 21]
An information processing system includes an image forming apparatus that includes at least a fixing apparatus that fixes onto a recording material, an unfixed image on the recording material and forms an image on the recording material and an information processing apparatus,
the image forming apparatus includes
a transfer unit that transfers an image onto the recording material and transports the recording material downstream through a transportation path,
a pressurization member rotatable in a direction of transportation in the fixing apparatus, downstream in a transportation path, of the recording material transported from the transfer unit,
a fixing belt that forms, as being opposed to the pressurization member, a nip region where the unfixed image is fixed, and is rotated as following rotation of the pressurization member,
a detector that is provided between the transfer unit and the pressurization member and detects a state of the recording material, and
a processor,
when the recording material is deflected in a first direction, the detector outputs a predetermined signal to the processor, and when the recording material is deflected in a second direction reverse to the first direction, the detector does not output the signal to the processor,
the processor
controls a rotation speed of the pressurization member to a first speed while the processor receives input of the signal, and controls the rotation speed of the pressurization member to a second speed lower than the first speed while the processor does not receive input of the signal, and
varies the rotation speed of the pressurization member until the processor receives input of the signal, while the processor does not receive input of the signal for a first time period, and
the information processing apparatus
obtains information on a time period for which the rotation speed of the pressurization member is varied from the processor, and
determines that the fixing apparatus has reached the end of its life when a time period for which the rotation speed of the pressurization member is varied is equal to or longer than a second time period.

[Configuration 22]
An information processing method in an image forming apparatus that includes at least a fixing apparatus that fixes onto a recording material, an unfixed image on the recording material and forms an image on the recording material, the image forming apparatus including a transfer unit that transfers an image onto the recording material and transports the recording material downstream through a transportation path, a pressurization member rotatable in a direction of transportation in the fixing apparatus, downstream in the transportation path, of the recording material transported from the transfer unit, a fixing belt that forms, as being opposed to the pressurization member, a nip region where the unfixed image is fixed, and is rotated as following rotation of the pressurization member, a detector that is provided between the transfer unit and the pressurization member and detects a state of the recording material, and a processor, the detector outputting a predetermined signal to the processor when the recording material is deflected in a first direction, the detector not outputting the signal to the processor when the recording material is deflected in a second direction reverse to the first direction, the information processing method includes:
controlling, by the processor, a rotation speed of the pressurization member to a first speed while the processor receives input of the signal;
controlling, by the processor, the rotation speed of the pressurization member to a second speed lower than the first speed while the processor does not receive input of the signal;
varying, by the processor, the rotation speed of the pressurization member until the processor receives input of the signal, while the processor does not receive input of the signal for a first time period; and
determining, by the processor, that the fixing apparatus has reached the end of its life when a time period for which the processor varies the rotation speed of the pressurization member is equal to or longer than a second time period.

Although embodiments of the present disclosure have been described and illustrated in detail, the disclosed embodiments are made for the purposes of illustration and example only and not limitation. The scope of the present disclosure should be interpreted by terms of the appended claims.

As used herein, the words "can" and "may" are used in a permissive (i.e., meaning having the potential to), rather than mandatory sense (i.e., meaning must). The words "include," "includes," "including," and the like mean including, but not limited to. Similarly, the singular form of "a" and "the" include plural references unless the context clearly dictates otherwise. And the term "number" shall mean one or an integer greater than one (i.e., a plurality).

What is claimed is:
1. An image forming apparatus that includes at least a fixing apparatus that fixes onto a recording material, an unfixed image on the recording material and forms an image on the recording material, the image forming apparatus comprising:
a pressurization member that is circularly rotated by a motor in the fixing apparatus such that the recording material is transported downstream;
a fixing belt that forms, as being opposed to the pressurization member, a nip region where the unfixed image is fixed, and is rotated as following rotation of the pressurization member;
a support member that:
is arranged on an inner side of the fixing belt; and
slidably supports the fixing belt at a position opposed to the pressurization member against a pressure applied by the pressurization member; and
a processor that:
obtains a torque of the motor each of a plurality of times the motor is driven, each of the times being when a predetermined condition is satisfied; and
determines that the fixing apparatus has reached an end of life based on the most recently obtained torque indicating a transition from a period of time of increasing torque to a period of time of decreasing torque.
2. The image forming apparatus according to claim 1, wherein:

the predetermined condition is an increase in running distance of the pressurization member by a prescribed distance, the processor obtains the torque each time the running distance of the pressurization member increases by the prescribed distance, and the processor determines that the fixing apparatus has reached the end of life, when the most recently obtained torque is lower than the penultimately obtained torque.

3. The image forming apparatus according to claim 2, wherein the processor:

obtains information on a rotation speed of the pressurization member, and calculates the running distance by multiplying the rotation speed by a duration of rotation of the pressurization member.

4. The image forming apparatus according to claim 2, wherein each time the running distance of the pressurization member increases by the prescribed distance the processor obtains as the torque an idle torque during a period over which no paper is passing.

5. The image forming apparatus according to claim 4, wherein the processor obtains torque detected after warm-up of the image forming apparatus or after fixation onto the recording material, as the idle torque during the period over which no paper is passing.

6. The image forming apparatus according to claim 2, wherein the processor determines that the fixing apparatus has reached the end of life on a condition that the obtained torque is equal to or higher than a predetermined threshold value.

7. The image forming apparatus according to claim 2, wherein, when the most recently obtained torque is lower than the penultimately obtained torque, the processor determines that the fixing apparatus has reached the end of life on a condition that the most recently obtained torque is lower than both the penultimately obtained torque and the torque obtained the time the predetermined condition is satisfied most recently before the penultimately obtained torque.

8. The image forming apparatus according to claim 1, wherein:

the predetermined condition is an increase in running distance of the pressurization member by a prescribed distance, the processor obtains the torque a plurality of times each time the running distance of the pressurization member increases by the prescribed distance and calculates an average value of torque obtained the plurality of times, and the processor determines that the fixing apparatus has reached the end of life, when the calculated average value is smaller than the average value calculated previously.

9. The image forming apparatus according to claim 8, wherein the processor determines that the fixing apparatus has reached the end of life on a condition that the calculated average value is equal to or larger than a predetermined threshold value.

10. The image forming apparatus according to claim 1, wherein:

the predetermined condition is an increase in running distance of the pressurization member by a prescribed distance, the processor obtains the torque a plurality of times each time the running distance of the pressurization member increases by the prescribed distance and calculates an average value of torque obtained the plurality of times, the processor calculates a moving average value by using the calculated average value and at least the average value calculated previously, and the processor determines that the fixing apparatus has reached the end of life when the calculated moving average value is smaller than the moving average value calculated previously.

11. The image forming apparatus according to claim 10, wherein the processor determines that the fixing apparatus has reached the end of life on a condition that the calculated moving average value is equal to or larger than a predetermined threshold value.

12. The image forming apparatus according to claim 1, wherein:

the predetermined condition is a lapse of a prescribed period, the processor obtains the torque each time the prescribed period elapses, and the processor determines that the fixing apparatus has reached the end of life when the obtained torque is lower than torque obtained previously.

13. The image forming apparatus according to claim 12, wherein each time the prescribed period elapses, the processor obtains as the torque an idle torque during a period over which no paper is passing.

14. The image forming apparatus according to claim 1, wherein:

the predetermined condition is a lapse of a prescribed period, the processor obtains the torque a plurality of times each time the prescribed period elapses and calculates an average value of torque obtained the plurality of times, and the processor determines that the fixing apparatus has reached the end of life when the calculated average value is smaller than the average value calculated previously.

15. The image forming apparatus according to claim 1, wherein:

the predetermined condition is a lapse of a prescribed period, the processor obtains the torque a plurality of times each time the prescribed period elapses and calculates an average value of torque obtained the plurality of times, the processor calculates a moving average value by using the calculated average value and at least the average value calculated previously, and the processor determines that the fixing apparatus has reached the end of life when the calculated moving average value is smaller than the moving average value calculated previously.

16. The image forming apparatus according to claim 1, wherein, when the processor determines that the fixing apparatus has reached the end of life, the processor permits formation of an image using paper of a first type and does not permit formation of an image using paper of a second type smaller in basis weight than the paper of the first type.

17. The image forming apparatus according to claim 1, further comprising a control panel wherein, when the processor determines that the fixing apparatus has reached the end of life, the processor controls the control panel to show a prescribed image.

18. An information processing system, comprising:

an image forming apparatus that includes at least a fixing apparatus that fixes onto a recording material, an unfixed image on the recording material and forms an image on the recording material; and an information processing apparatus,
the image forming apparatus including:
- a pressurization member that is circularly rotated by a motor in the fixing apparatus such that the recording material is transported downstream,
- a fixing belt that forms, as being opposed to the pressurization member, a nip region where the unfixed image is fixed, and is rotated as following rotation of the pressurization member, and
- a support member that (i) arranged on an inner side of the fixing belt and (ii) slidably supports the fixing belt at a position opposed to the pressurization member against a pressure applied by the pressurization member, wherein the image forming apparatus detects a torque of the motor each of a plurality of times the motor is driven, each of the times being when a predetermined condition is satisfied, and wherein the information processing apparatus obtains, from the image forming apparatus, the torques and determines that the fixing apparatus has reached an end of life based on the most recently obtained torque indicating a transition from a period of time of increasing torque to a period of time of decreasing torque.

19. An information processing method in an image forming apparatus that includes at least a fixing apparatus that fixes onto a recording material, an unfixed image on the recording material and forms an image on the recording material, the image forming apparatus including a processor, a pressurization member that is circularly rotated by a motor in the fixing apparatus such that the recording material is transported downstream, a fixing belt that forms, as being opposed to the pressurization member, a nip region where the unfixed image is fixed, and is rotated as following rotation of the pressurization member, and a support member that is arranged on an inner side of the fixing belt and slidably supports the fixing belt at a position opposed to the pressurization member against a pressure applied by the pressurization member, the information processing method comprising:

- obtaining, by the processor, a torque of the motor each of a plurality of times the motor is driven, each of the times being when a predetermined condition is satisfied; and
- determining, by the processor, that the fixing apparatus has reached an end of life based on the most recently obtained torque turning from a period of time of increasing torque to a period of time of decreasing torque.

* * * * *